US010809121B2

(12) United States Patent
Weiss et al.

(10) Patent No.: US 10,809,121 B2
(45) Date of Patent: Oct. 20, 2020

(54) COMBINED INFANT CHANGING AND WEIGHING DEVICE AND METHODS OF OPERATION THEREOF

(71) Applicant: Hatch Baby, Inc., Menlo Park, CA (US)

(72) Inventors: David Weiss, Palo Alto, CA (US); Ann C. Weiss, Palo Alto, CA (US)

(73) Assignee: Hatch Baby, Inc., Menlo Park, CA (US)

( * ) Notice: Subject to any disclaimer, the term of this patent is extended or adjusted under 35 U.S.C. 154(b) by 155 days.

(21) Appl. No.: 15/811,499

(22) Filed: Nov. 13, 2017

(65) Prior Publication Data

US 2018/0080810 A1   Mar. 22, 2018

Related U.S. Application Data

(63) Continuation-in-part of application No. PCT/US2016/029044, filed on Apr. 22, 2016.

(60) Provisional application No. 62/161,723, filed on May 14, 2015.

(51) Int. Cl.
| | |
|---|---|
| *G01G 19/52* | (2006.01) |
| *A47D 5/00* | (2006.01) |
| *G01G 21/22* | (2006.01) |
| *G01G 19/44* | (2006.01) |
| *G01G 23/37* | (2006.01) |

(52) U.S. Cl.
CPC ............ *G01G 19/52* (2013.01); *A47D 5/00* (2013.01); *G01G 19/445* (2013.01); *G01G 21/22* (2013.01); *G01G 23/3735* (2013.01)

(58) Field of Classification Search
CPC ...... G01G 19/52; G01G 19/445; G01G 21/22; G01G 23/3735; A47D 5/00
USPC .......................................................... 73/144
See application file for complete search history.

(56) References Cited

U.S. PATENT DOCUMENTS

| | | | | |
|---|---|---|---|---|
| 4,339,012 | A | * | 7/1982 | Vogel ................. G01G 21/28 177/262 |
| 4,739,848 | A | | 4/1988 | Tulloch |
| 5,369,226 | A | | 11/1994 | Griffen et al. |
| 6,538,215 | B2 | | 3/2003 | Montagnino et al. |
| 8,332,975 | B2 | | 12/2012 | Brykalski et al. |
| 8,672,842 | B2 | | 3/2014 | Kenalty et al. |

(Continued)

FOREIGN PATENT DOCUMENTS

| | | |
|---|---|---|
| FR | 3025991 | 12/2016 |
| WO | WO 2006/134619 | 12/2006 |

(Continued)

*Primary Examiner* — Peter J Macchiarolo
*Assistant Examiner* — Monica S Young
(74) *Attorney, Agent, or Firm* — Levine Bagade Han LLP

(57) ABSTRACT

A weighing device for weighing a load, such as an infant, is disclosed. The weighing device can include a device casing having a placement side configured to retain the load and an underside. Four weight sensors can be coupled to the underside of the device casing. The four weight sensors can be configured to generate a signal corresponding to a weight of the load. A first foot assembly can be coupled to one of the four weight sensors. The first foot assembly can include a first assembly end coupled to the first weight sensor and a second assembly end extending beyond the device casing. The placement side can include at least two retaining walls and a receiving surface.

19 Claims, 29 Drawing Sheets

(56) References Cited

U.S. PATENT DOCUMENTS

| | | | |
|---|---|---|---|
| 9,332,791 B1 | 5/2016 | Bush et al. | |
| 9,494,459 B2* | 11/2016 | Oneid | G01G 3/1402 |
| 2002/0029911 A1* | 3/2002 | Richards | G01G 19/445 |
| | | | 177/144 |
| 2005/0103535 A1* | 5/2005 | Honda | G01G 21/23 |
| | | | 177/187 |
| 2005/0172411 A1* | 8/2005 | Snedeker | A47D 13/02 |
| | | | 5/655 |
| 2006/0065450 A1* | 3/2006 | Germanton | G01G 21/23 |
| | | | 177/238 |
| 2006/0219690 A1* | 10/2006 | Grinstead | A47C 21/048 |
| | | | 219/217 |
| 2009/0107207 A1* | 4/2009 | Yamazaki | G01G 19/44 |
| | | | 73/1.13 |
| 2009/0173550 A1* | 7/2009 | Gerster | G01G 19/445 |
| | | | 177/126 |
| 2012/0232801 A1 | 9/2012 | Kaplan et al. | |
| 2014/0291042 A1* | 10/2014 | Tsutaya | G01G 3/1402 |
| | | | 177/211 |
| 2015/0101870 A1* | 4/2015 | Gough | G01G 3/141 |
| | | | 177/211 |
| 2015/0168205 A1* | 6/2015 | Lee | H04M 1/0254 |
| | | | 177/1 |
| 2018/0106664 A1* | 4/2018 | Bottomly | G01G 19/44 |

FOREIGN PATENT DOCUMENTS

| | | |
|---|---|---|
| WO | WO 2016/182714 | 11/2016 |
| WO | WO 2019/094960 | 5/2019 |

* cited by examiner

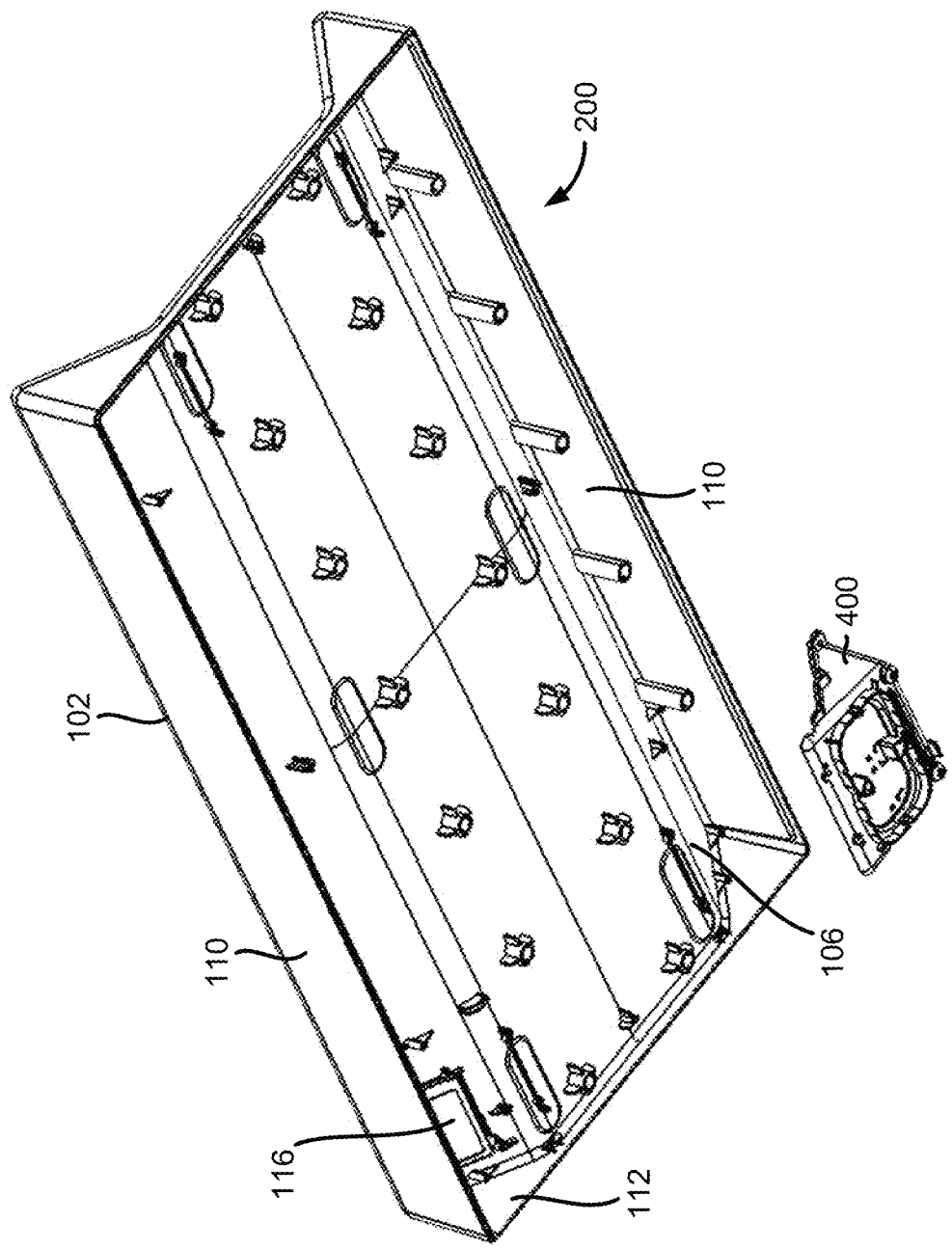

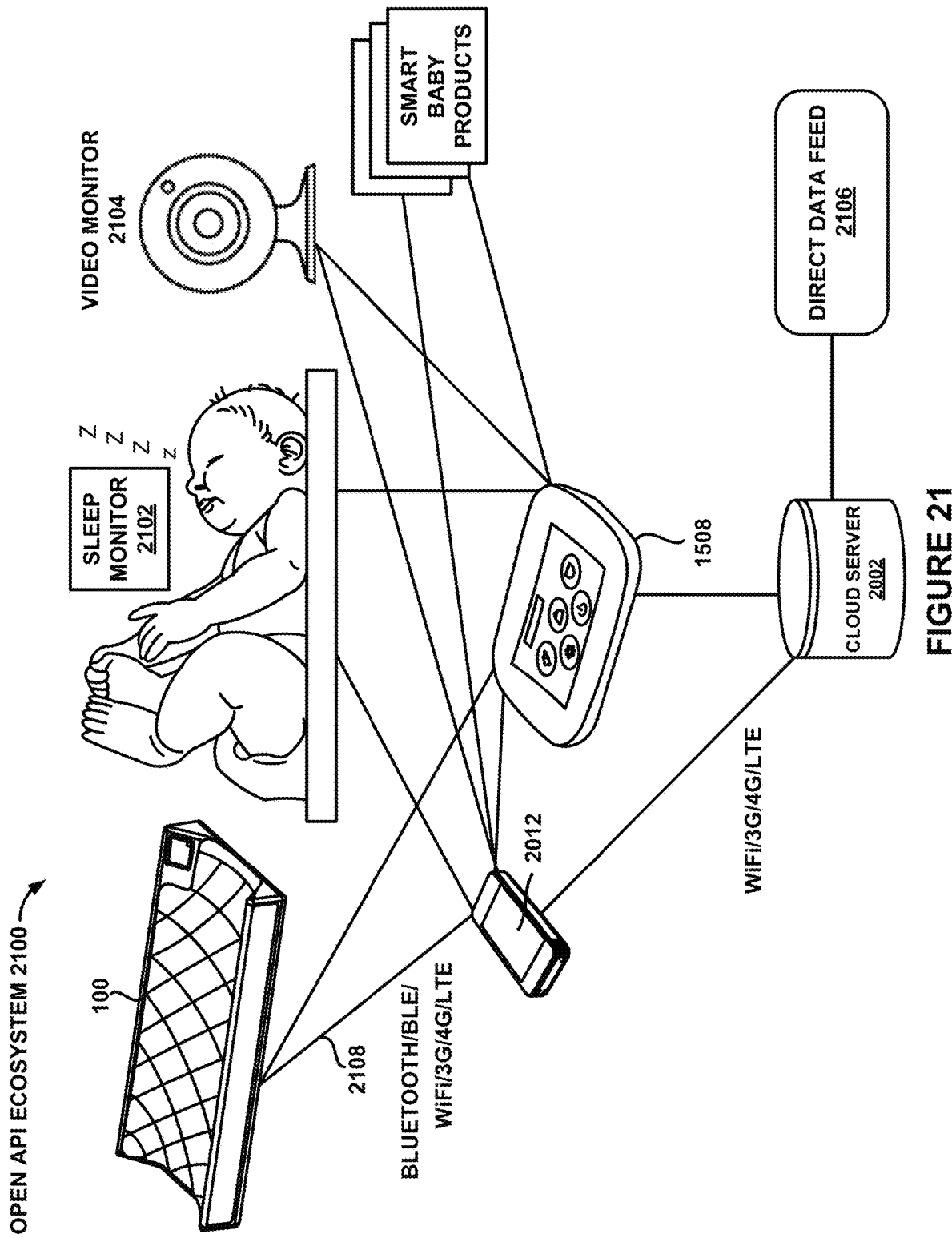

COMBINED INFANT CHANGING AND WEIGHING DEVICE AND METHODS OF OPERATION THEREOF

CROSS-REFERENCE TO RELATED APPLICATIONS

The present application is a continuation-in-part (CIP) of International Patent Application No. PCT/US2016/29044 filed on Apr. 22, 2016, which claims the benefit of U.S. Provisional Application No. 62/161,723, filed May 14, 2015, the contents of which are hereby incorporated by reference in their entireties.

FIELD OF TECHNOLOGY

The present disclosure relates generally to the field of infant care products, and, more specifically, to a combined infant changing and weighing device and methods of operation thereof.

BACKGROUND

Parents of newborns often experience high levels of anxiety concerning whether their newborns are eating enough or gaining enough weight. While parents are usually encouraged by their healthcare providers to keep track of the time and length of feedings, such metrics are usually poor proxies for how much the baby has actually taken in after each feeding session. In addition, for moms who prefer to breastfeed their babies, determining how much the baby has fed is a challenge that adds to the stress and anxiety of this difficult period.

One way to determine an infant's feeding amount is to weigh the infant before and after each feeding. This often necessitates that a parent place the infant on a changing pad to undress the infant, carry the infant to a weighing apparatus, place the infant on the weighing apparatus, manually record the weight of the infant in a journal or mobile application, and carry the infant back to the changing pad to dress the infant.

Moreover, traditional baby weighing apparatus are often made of metal or cold hard plastic which can agitate or startle an infant. In addition, such a baby weighing apparatus often competes with other baby products such as changing pads, bottle warmers, or wipe warmers for valuable table top or shelf space in a nursery. Also, a sleep-deprived or distracted parent may forget to write down or manually enter a baby's weight, diaper change, or feeding time in a journal or mobile application which may make keeping track of such metrics even more difficult. Furthermore, traditional baby weighing apparatus do not provide parents the capability to automatically compare their baby's weight and other health information with those of their cohorts.

Therefore, a solution is needed that can quickly and accurately determine the weight of an infant and automatically record and track that weight information. In addition, such a solution should provide a comfortable weighing experience for the infant. Furthermore, the solution should not be overly complex and be cost-effective to manufacture.

SUMMARY

A weighing device is disclosed. The weighing device can include an enclosure or device casing having a placement side and an underside. The placement side can be configured to retain a load. The weighing device can include four weight sensors including a first weight sensor, a second weight sensor, a third weight sensor, and a fourth weight sensor coupled to the underside of the enclosure or device casing. The four weight sensors can be configured to generate a signal corresponding to a weight of the load. A first foot assembly can be coupled to the first weight sensor. The first foot assembly can include a first assembly end coupled to the first weight sensor and a second assembly end extending beyond the enclosure or device casing. The weighing device can include a retaining wall inclined with respect to a receiving surface of the placement side.

When the load is an infant, the placement side of the weighing device can be used as a changing pad or changing device for holding or securing the infant while the infant gets his or her diaper changed. The weighing device can serve as a combination changing pad and weighing apparatus.

The weighing device can include a second foot assembly coupled to the enclosure or device casing via the second weight sensor and a third foot assembly coupled to the enclosure or device casing via the third weight sensor. The second foot assembly can be the furthest foot assembly from the first foot assembly. The third foot assembly can be the closest foot assembly to the first foot assembly. A ratio between a first distance separating the first foot assembly from the second foot assembly and a second distance separating the first foot assembly from the third foot assembly can be equal to or greater than 2.0.

The weighing device can include a second foot assembly coupled to the enclosure or device casing via the second weight sensor and a third foot assembly coupled to the enclosure or device casing via the third weight sensor. The second foot assembly can be the furthest foot assembly from the first foot assembly. The third foot assembly can be the closest foot assembly to the first foot assembly. A ratio between a first distance separating the first foot assembly from the second foot assembly and a second distance separating the first foot assembly from the third foot assembly can be between 2.0 and 3.0.

The weighing device can include a second foot assembly coupled to the enclosure or device casing via the second weight sensor and a third foot assembly coupled to the enclosure or device casing via the third weight sensor. The second foot assembly can be the furthest foot assembly from the first foot assembly. The third foot assembly can be the closest foot assembly to the first foot assembly. A ratio between a first distance separating the first foot assembly from the second foot assembly and a second distance separating the first foot assembly from the third foot assembly can be between 2.1 and 2.5.

The weighing device can include a cushioning layer removably attached to the placement side via a cushion securement member. The cushioning layer can be configured to be disposed in between the placement side and the load. The weighing device can also include a cushioning layer fixedly attached to the placement side of the enclosure or device casing. The enclosure or device casing can include or be composed of a polymer having a Shore D hardness of between 80 and 100.

The weighing device can include another retaining wall separated by the receiving surface from the retaining wall. The other retaining wall can be inclined with respect to the receiving surface and the two retaining walls can define a trapezoidal-shaped furrow on the placement side.

Each of the four weight sensors can be coupled to the enclosure or device casing via a sensor mount coupled to the underside of the retaining wall. The sensor mount can include a mount edge inclined with respect to an enclosure or casing facing surface of the sensor mount. The mount edge can be coupled to a portion of the underside of the retaining wall. Each of the four weight sensors can comprise a half-bridge load cell.

A foot assembly, including any of the first foot assembly, the second foot assembly, the third foot assembly, or the fourth foot assembly, can include a foot housing, a webbed indenter coupled to the first weight sensor and partially housed in the foot housing, a thread pin disposed in a pin channel of the webbed indenter, and a foot limiter fitted around a portion of the webbed indenter. The webbed indenter can comprise at least one sigmoid shaped arm connected to an outer rim and an indenter barrel of the webbed indenter.

The weighing device can include a portable power supply. The weighing device can include a communication unit configured to transmit data corresponding to the weight of the load to another device. The communication unit can include a short range radio antenna, such as a Bluetooth® antenna, a WiFi antenna, or a combination thereof.

The weighing device can include an analog-to-digital converter (ADC) coupled to the four weight sensors, a memory device configured to store data concerning the weight of the load, and a processor coupled to the memory device and the ADC. The weighing device can include a display component. The enclosure or device casing can include a display window. The display component can be coupled to the underside of the enclosure or device casing. The display component can be visible through the display window. Only one side of a frame of the display component can be coupled to an exterior surface of the enclosure or device casing.

In addition, another variation of the weighing device can include a device casing having a placement side and an underside. The placement side can comprise at least two retaining walls and a receiving surface configured to retain a load. The receiving surface can be located between the at least two retaining walls and the at least two retaining walls and the receiving surface can form a U-shaped trough.

The weighing device can also comprise four weight sensors including a first weight sensor, a second weight sensor, a third weight sensor, and a fourth weight sensor coupled to the underside of the device casing. The four weight sensors can be configured to generate a signal corresponding to a weight of the load. The weight sensors can comprise or be half-bridge load cells.

The weighing device can also comprise a first foot assembly coupled to the first weight sensor. The first foot assembly can comprise a first assembly end coupled to the first weight sensor and a second assembly end extending beyond the device casing. The weighing device can also comprise a second foot assembly coupled to the device casing via the second weight sensor and a third foot assembly coupled to the device casing via the third weight sensor. The second foot assembly can be the furthest foot assembly from the first foot assembly and the third foot assembly can be the closest foot assembly to the first foot assembly. A ratio between a first distance separating the first foot assembly from the second foot assembly and a second distance separating the first foot assembly from the third foot assembly can be between approximately 2.0 and 3.0. Moreover, the ratio between the first distance and the second distance can be between approximately 2.1 and 2.5.

The foot assembly can include a webbed indenter coupled to the weight sensor and partially housed within a foot housing structure on the underside of the device casing. The foot assembly can also include a thread pin disposed in a pin channel of the webbed indenter and a foot pad coupled to the webbed indenter. The webbed indenter can comprise a sigmoid shaped arm connected to an outer rim and an indenter barrel. The weighing device can also comprise a device base coupled to the device casing. At least part of the device base can be shaped as an annular disk configured to secure the foot assembly to the device casing.

The weighing device can further comprise a cushioning layer coupled to the device casing. The cushioning layer can cover the at least two retaining walls and the receiving surface. The cushioning layer can comprise or be composed of a foam material such as polyurethane foam. The device casing can comprise a casing side wall and the cushioning layer can cover at least part of the casing side wall. The device casing can further comprise a casing brim and a raised brim wall extending beyond the casing side wall. A part of the cushioning layer can fill a gap in between the raised brim wall and the casing side wall.

The weighing device can further comprise an analog-to-digital converter (ADC) coupled to the four weight sensors, a processor configured to calculate a weight of the load based on signals generated by the ADC, a memory device configured to store data concerning the weight of the load, and a communication unit configured to wirelessly transmit data corresponding to a weight of the load to another device. The communication unit can comprise or be a Bluetooth® communication unit. The weighing device can also comprise a portable power supply configured to supply power to the ADC, the four weight sensors, the processor, the memory device, and the communication unit.

Also disclosed is a combination changing pad and weighing device. The combination changing pad and weighing device can include a device casing having a changing pad side and an underside. The device casing can comprise two curved retaining walls and a receiving surface in between the two curved retaining walls. The combination changing pad and weighing device can also include a cushioning layer, four weight sensors, and at least one foot assembly coupled to each of the four weight sensors. The cushioning layer can cover the at least two retaining walls and the receiving surface. The four weight sensors can be configured to generate a signal corresponding to a weight measurement. The foot assembly can have a first assembly end coupled to the weight sensor and a second assembly end extending beyond the device casing.

A method of determining a weight of a load is disclosed. The method comprises receiving the load on a placement side of a weighing device having a device casing covered by a cushioning layer. The method can further comprise converting one or more analog signals received from four weight sensors to one or more digital signals at an analog-to-digital converter (ADC) coupled to the device casing. The four weight sensors can be coupled to an underside of the device casing. The method can further comprise calculating, using a processor coupled to the ADC, the weight of the load using the one or more digital signals. The method can also comprise wirelessly transmitting, using a communication unit coupled to the processor, data corresponding to the weight of the load to another device.

Another method of determining a weight of a load is also disclosed. The method can include receiving the load on a placement side of an enclosure or device casing, converting one or more analog signals received from four weight sensors to one or more digital signals at an ADC, wherein the four weight sensors are coupled to an underside of the enclosure or device casing, and calculating, by a processor coupled to the ADC, the weight of the load using at least the one or more digital signals.

The method can include transmitting data corresponding to the weight of the load to a server using a communication unit coupled to the processor. The method can include transmitting data corresponding to the weight of the load to a portable device using a communication unit coupled to the processor. The method can also include transmitting data corresponding to the weight of the load to a server using a communication unit coupled to the processor. The method can include storing the weight of the load in a memory device coupled to the processor.

The method can include placing a cushioning layer on the placement side of the enclosure or device casing and receiving the load on the cushioning layer. The cushioning layer can be fixedly attached to the placement side of the enclosure or device casing.

The method can include powering at least one of the ADC, the four weight sensors, and the processor using a portable power supply coupled to the enclosure or device casing.

A weighing system is disclosed. The weighing system can include a weighing device having an enclosure or device casing with a placement side configured to retain a load, four weight sensors including a first weight sensor, a second weight sensor, a third weight sensor, and a fourth weight sensor coupled to the enclosure or device casing, and an ADC coupled to the four weight sensors and configured to convert one or more analog signals from the four weight sensors to one or more digital signals. The weighing device of the weighing system can also include a first communication unit coupled to the enclosure or device casing and the ADC and configured to transmit the one or more digital signals. The weighing system can include a portable device having a second communication unit configured to receive the one or more digital signals from the first communication unit. The portable device can also include a processor coupled to the second communication unit wherein the processor can be configured to calculate a weight of the load based on the one or more digital signals, and a display component, coupled to the processor, configured to display the weight of the load.

The portable device can be a console. The portable device can also be at least one of a computing device, a tablet device, and a smartphone. The first communication unit can include a Bluetooth® antenna. The weighing system can include a server configured to receive data from the second communication unit corresponding to the weight of the load.

The weighing device can include a first foot assembly having a first assembly end and a second assembly end. The first assembly end can be coupled to the first weight sensor and the second assembly end extends beyond the enclosure or device casing. The weighing device can also include a second foot assembly coupled to the enclosure or device casing via the second weight sensor and a third foot assembly coupled to the enclosure or device casing via the third weight sensor. The second foot assembly can be the furthest foot assembly from the first foot assembly. The third foot assembly can be the closest foot assembly to the first foot assembly. A ratio between a first distance separating the first foot assembly from the second foot assembly and a second distance separating the first foot assembly from the third foot assembly can be equal to or greater than 2.0.

The weighing device can also include a first foot assembly having a first assembly end and a second assembly end. The first assembly end can be coupled to the first weight sensor and the second assembly end extends beyond the enclosure or device casing. The weighing device can also include a second foot assembly coupled to the enclosure or device casing via the second weight sensor and a third foot assembly coupled to the enclosure or device casing via the third weight sensor. The second foot assembly can be the furthest foot assembly from the first foot assembly. The third foot assembly can be the closest foot assembly to the first foot assembly. A ratio between a first distance separating the first foot assembly from the second foot assembly and a second distance separating the first foot assembly from the third foot assembly can be between 2.0 and 3.0.

The weighing device can also include a first foot assembly having a first assembly end and a second assembly end. The first assembly end can be coupled to the first weight sensor and the second assembly end extends beyond the enclosure or device casing. The weighing device can also include a second foot assembly coupled to the enclosure or device casing via the second weight sensor and a third foot assembly coupled to the enclosure or device casing via the third weight sensor. The second foot assembly can be the furthest foot assembly from the first foot assembly. The third foot assembly can be the closest foot assembly to the first foot assembly. A ratio between a first distance separating the first foot assembly from the second foot assembly and a second distance separating the first foot assembly from the third foot assembly can be between 2.1 and 2.5.

The first foot assembly can include a foot housing, a webbed indenter coupled to one of the four weight sensors and partially housed in the foot housing, a thread pin disposed in a pin channel of the webbed indenter, and a foot limiter fitted around a portion of the webbed indenter. The webbed indenter can include a sigmoid shaped arm connected to an outer rim and an indenter barrel of the webbed indenter. The weighing device of the weighing system can include a cushioning layer attached to the placement side and configured to be disposed in between the placement side and the load. The enclosure or device casing can be composed of a polymer having a Shore D hardness of between 80 and 100. The placement side of the weighing device can include a retaining wall. The retaining wall can be inclined with respect to a receiving surface.

Each of the four weights sensors can be coupled to the enclosure or device casing via a sensor mount coupled to the underside of the retaining wall. The sensor mount can also include a mount edge. The mount edge can be inclined with respect to and can be configured to couple to a portion of the retaining wall. Each of the four weight sensors can comprise a half-bridge load cell.

The placement side can be substantially planar. The enclosure or device casing can be foldable into a tri-fold configuration, a bi-fold configuration, or a combination thereof.

The weighing device of the weighing system can include a portable power supply to power the four weight sensors, the ADC, and the first communication unit.

A method of determining a weight of a load can include receiving the load on a placement side of an enclosure or device casing, converting one or more analog signals received from four weight sensors to one or more digital signals at an ADC. The four weight sensors can include a first weight sensor, a second weight sensor, a third weight sensor, and a fourth weight sensor. The method can also include transmitting the one or more digital signals to a portable device using a first communication unit coupled to the enclosure or device casing and the ADC and calculating, using a processor of the portable device, a weight of the load using the one more digital signals. The method can also include displaying, at a display component of the portable device, the weight of the load. The portable device can be a console. The portable device can also be at least one of a computing device, a tablet device, and a smartphone. The first communication unit can include a Bluetooth® antenna.

The method can include receiving, at a second communication unit of the portable device the one or more digital signals from the first communication unit of the weighing device. The method can also include transmitting data corresponding to the weight of the load to a server using the second communication unit coupled to the processor.

BRIEF DESCRIPTION OF THE DRAWINGS

FIG. 4 illustrates a perspective bottom view of a device casing and a sensor mount of a weighing device.
FIG. 21 illustrates an open API ecosystem involving the weighing system.

DETAILED DESCRIPTION

Figure 1A:
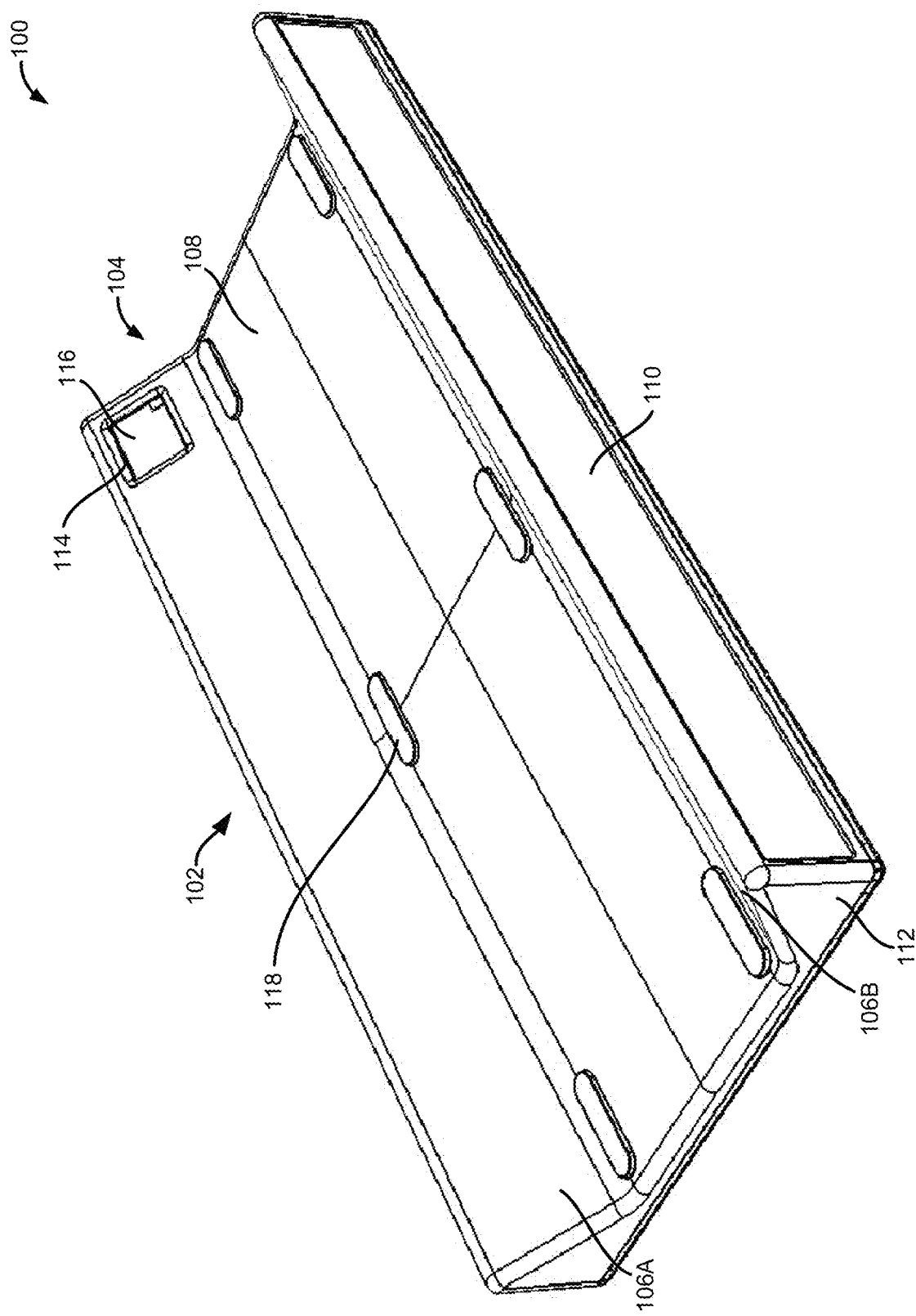
FIG. 1A illustrates a weighing device.

FIG. 1A illustrates that a weighing device 100 can have an enclosure or device casing 102. The enclosure or device casing 102 can have a placement side 104 including a receiving surface 108 and at least one retaining wall 106.

The receiving surface 108 can be a substantially flat or planar surface. The receiving surface 108 can also be a concave surface, a sloped surface, a parabolic surface, or a combination thereof. When the receiving surface 108 is substantially flat or planar or has a substantially flat or planar portion, the retaining wall 106 can be inclined with respect to the receiving surface 108 or a flat portion thereof.

The placement side 104 can be configured to retain a load 300. The load 300 can include an infant, a toddler, a diaper such as a clean or soiled diaper, an article of clothing, a bottle containing a fluid, or a pet or other animal. The load 300 can also include any object or entity having a weight within a weight tolerance range of the weighing device. The weighing device 100 can be configured to measure a load 300 of between 1.00 kg and 40.0 kg. The weighing device 100 can also be configured to measure a load 300 of between 1.00 kg and 25.0 kg.

The placement side 104 of the enclosure or device casing 102 can retain the load 300 by supporting the load 300 or preventing the load 300 from moving off the weighing device 100. For example, when the load 300 is an infant, the retaining walls 106 can be configured to prevent the infant from turning or falling off the weighing device 100.

When the load 300 is an infant, the placement side 104 of the weighing device 100 can be used as a changing pad or changing device for holding or securing the infant while the infant gets his or her diaper changed. In this case, the weighing device 100 can serve as a combination changing pad and weighing apparatus.

The placement side 104 can have two retaining walls 106 including a first retaining wall 106A and a second retaining wall 106B. In other variations, the weighing device 100 can have three or four retaining walls 106. The weighing device 100 can also have five or more retaining walls 106.

The receiving surface 108 can be substantially rectangular. The receiving surface 108 can also be substantially oval, circular, triangular, diamond-shaped, or a combination thereof. When the weighing device 100 has two retaining walls 106, the first retaining wall 106A can be separated from the second retaining wall 106B by the receiving surface 108. For example, the receiving surface 108 and the two retaining walls 106 can define a trapezoidal-shaped furrow or channel on the placement side 104. In other variations, the receiving surface 108 and the two retaining walls 106 can define a rectangular-shaped furrow or channel, a half-cylinder-shaped furrow or channel, a half ovoid-shaped furrow or channel, or a combination thereof.

When the weighing device 100 has three retaining walls 106, one of the retaining walls 106 can be an extension of or coupled to an enclosure or casing end wall 112. When the weighing device 100 has four retaining walls 106, two of the retaining walls 106 can be extensions of or coupled to the two enclosure or casing end walls 112 and each of the retaining walls 106 can be adjacent or coupled to two other retaining walls 106. For example, when the weighing device 100 has four retaining walls 106, the four retaining walls 106 can form an enclosed barrier around the receiving surface 108 and the placement side 104 of the enclosure or device casing 102 can be shaped as a rectangular box or a trough having sloped walls.

The retaining walls 106 can be substantially flat or planar. In other variations, the retaining walls 106 can be curved or parabolic. When the retaining walls 106 are curved, one or more retaining walls 106 can partially or fully surround or circumscribe the receiving surface 108.

The enclosure or device casing 102 can also have two enclosure or casing side walls 110 and two enclosure or casing end walls 112. The enclosure or casing side walls 110 can be rectangular, ovoid, trapezoidal, or a combination thereof. In addition, the enclosure or casing side walls 110 can be curved or rounded. Each of the enclosure or casing side walls 110 can be coupled to a retaining wall 106 along one edge or side of the enclosure or casing side wall 110. Each of the enclosure or casing side walls 110 can also be coupled to the two enclosure or casing end walls 112 along two edges or sides of the enclosure or casing side wall 110.

When the enclosure or device casing 102 has two retaining walls 106, the enclosure or casing end walls 112 can be shaped as two triangular portions connected by a narrow rectangular portion. When the enclosure or device casing 102 has three retaining walls 106, one of the enclosure or casing end walls 112 can be shaped as two triangular portions connected by a narrow rectangular portion and the other enclosure or casing end wall 112 can be substantially similar to the other retaining walls 106. When the enclosure or device casing 102 has four retaining walls 106, two retaining walls 106 can take the place of the two enclosure or casing end walls 112.

The enclosure or device casing 102 can be composed of or comprise a polymer. The enclosure or device casing 102 can be composed of or comprise a thermoplastic. The enclosure or device casing 102 can be composed of or comprise an injection molded polymer. The enclosure or device casing 102 can be composed of or comprise acrylonitrile butadiene styrene (ABS) plastic, polylactic acid (PLA), polycarbonate, polypropylene (PP), or a combination thereof.

The enclosure or device casing 102 can be composed of a material with a Shore D hardness of between 80 and 100. The enclosure or device casing 102 can also be composed of a material with a Shore D hardness of between 90 and 100. The enclosure or device casing can also have a Shore D hardness of between 80 and 90.

The enclosure or device casing 102 can also be composed of or comprise wood or metal. The enclosure or device casing 102 can also be composed of or comprise a ceramic material. The enclosure or device casing 102 can also be composed of or comprise a rubber or synthetic rubber.

The enclosure or device casing 102 can be manufactured as one piece of injection molded plastic such as ABS plastic. The enclosure or device casing 102 can also be assembled from multiple parts or panels. For example, the enclosure or device casing 102 can also be assembled from two retaining walls 106, a retaining surface 108, two enclosure or casing side walls 110, and two enclosure or casing end walls 112. The enclosure or device casing 102 can have rounded or beveled edges where the different walls or ends meet one another.

The enclosure or device casing 102 can have one or more cushion securement members 118. The cushion securement members 118 can be configured to secure a cushioning layer 1200 (see FIG. 12) to the receiving surface 108. The cushion securement members 118 can include a hook and loop fastener such as a Velcro® fastener, a magnetic component, a clip fastener, a snap fastener, an adhesive, or a combination thereof. One side or surface of the cushion securement member 118 can be coupled to the receiving surface 108 and the other side or surface can be configured to engage with a reciprocal or corresponding securement member coupled or attached to the cushioning layer 1200. Multiple cushion securement members 118 can be arranged in rows or columns along a length of the receiving surface 108. The cushion securement members 118 can also be arranged in a circular pattern, a spiral pattern, a zig-zag pattern, a triangular pattern, or a combination thereof.

The enclosure or device casing 102 can have a display window 114. The display window 114 can be an opening or cutout along one of the retaining walls 106. In another variation, the display window 114 can be an opening or cutout along the receiving surface 108, an enclosure or casing side wall 110, an enclosure or casing end wall 112, or a combination thereof. A display component 116 can be visible through the display window 114. The display component 116 can be an electronic touchscreen such as a capacitive or resistive touchscreen. The display component 116 can be a liquid crystal display (LCD) touchscreen, a lighting-emitting diode (LED) touchscreen, an active-matrix organic light-emitting diode (AMOLED) touchscreen, a super AMOLED touchscreen, or a combination thereof.

Figure 1B:
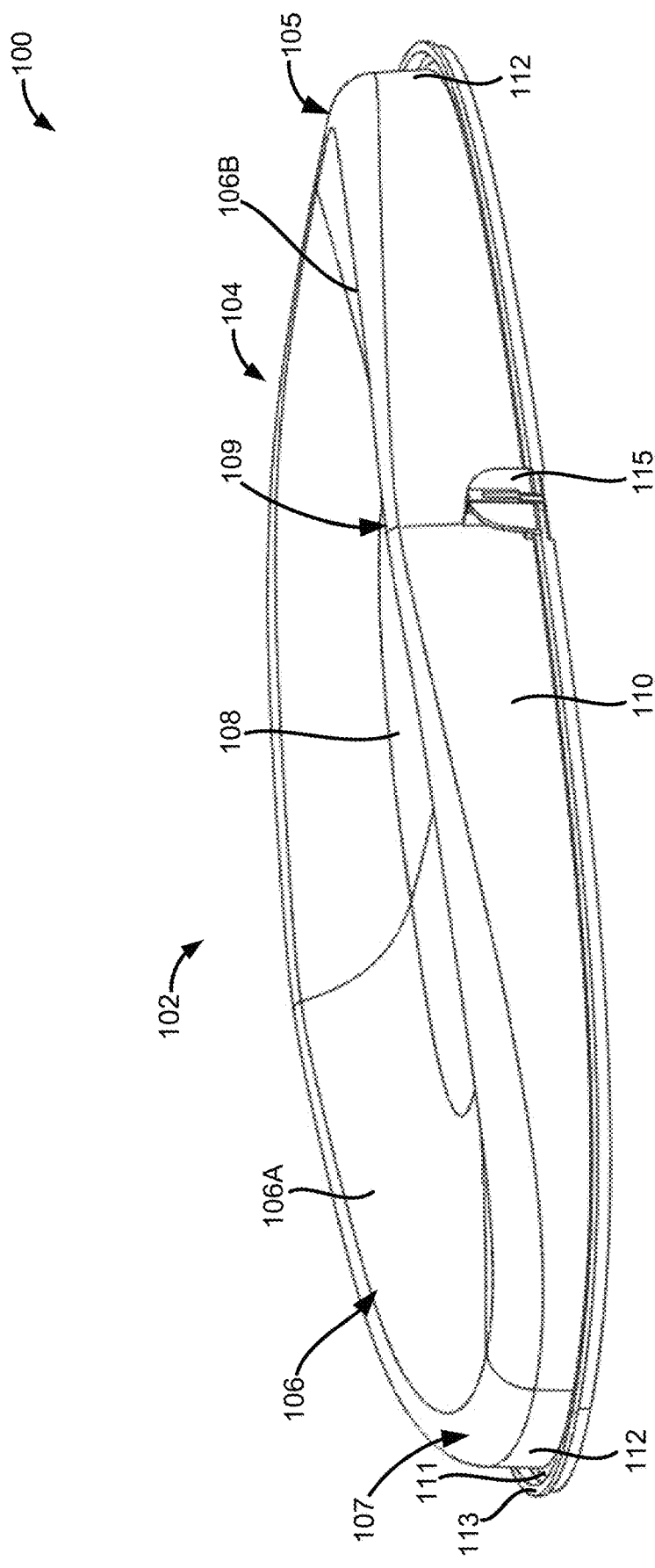
FIG. 1B illustrates a device casing of a variation of a weighing device.

FIG. 1B illustrates another variation of the device casing 102 having a placement side 104 and at least two curved retaining walls 106. As shown in FIG. 1B, a device footprint of the device casing 102 can be substantially oval-shaped, ellipse-shaped, stadium-shaped, or a combination thereof. The receiving surface 108 can be a substantially flat or planar surface. The receiving surface 108 can also be a concave surface, a sloped surface, a parabolic surface, a U-shaped surface, or a combination thereof. The receiving surface 108 can be substantially stadium-shaped, oval-shaped, circle-shaped, ellipse-shaped, rectangular-shaped, or a combination thereof.

The receiving surface 108 can be located or bounded between the at least two retaining walls 106 (e.g., the first retaining wall 106A and the second retaining wall 106B). The at least two retaining walls 106 can be upwardly sloping with respect to the receiving surface 108. In other variations, the weighing device 100 can have three or four retaining walls 106.

The device casing 102 can have a first longitudinal end 105 and a second longitudinal end 107. The device casing 102 can also have a casing end wall 112 at the first longitudinal end 105 and another casing end wall 112 at the second longitudinal end 107. The casing end walls 112 can be extensions of or contiguous portions of the retaining walls 106.

As shown in FIG. 1B, the casing end walls 112 can be lower in height than the retaining walls 106. As depicted in FIG. 1B, the retaining walls 106 can have a wall mid-portion 109 in between the first longitudinal end 105 and the second longitudinal end 107. For example, the wall mid-portion 109 can be a segment of the retaining walls 106 at a longitudinal midpoint in between the first longitudinal end 105 and the second longitudinal end 107. The retaining walls 106 can be the highest at the wall mid-portion 109 or have a maximum height dimension at the wall mid-portion 109. The retaining walls 106 can also gradually decrease in height in both longitudinal directions from the wall mid-portion 109 toward the casing end walls 112. For example, the retaining walls 106 can have a parabolic or arched side profile.

The device casing 102 can also have a casing brim 111 extending beyond the casing side walls 110 and the casing end walls 112. The device casing 102 can also have a raised brim wall 113 extending vertically from the casing brim 111. The raised brim wall 113 can be shorter than the casing side walls 110 and the casing end walls 112. The raised brim wall 113 can be separated from the casing side walls 110 and the casing end walls 112 by a gap. The gap between the raised brim wall 113 and the casing side walls 110 and the casing end walls 112 can be filled or otherwise taken up by a cushioning layer 1200 (see FIGS. 13C and 13D) such as a foam layer or material. The casing brim 111 and the raised brim wall 113 can allow the cushioning layer 1200 or foam material to cover more of the placement side 104 of the device casing 102 including the retaining walls 106, casing side wall 110. The casing brim 111 and the raised brim wall 113 can also provide rigidity and support to the perimeter of the device casing 102.

The devise casing 102 can have two or more safety strap connectors 115 positioned laterally along the sides of the device casing 102. For example, two safety strap connectors 115 can be positioned on opposite lateral sides of the receiving surface 108. As shown in FIG. 1B, at least part of each of the safety strap connectors 115 can extend beyond the raised brim wall 113. The safety strap connectors 115 can be configured to act as anchors or linkages for a safety strap (not shown). The safety strap can be used to secure a load 300 (see FIG. 3A) on the placement side 104. For example, when the load 300 is an infant or baby, the safety strap can be used to secure the infant or baby to the weighing device 100.

The device casing 102 can be composed of or comprise a polymer. The device casing 102 can be composed of or comprise a thermoplastic. The device casing 102 can be composed of or comprise an injection molded polymer. The device casing 102 can be composed of or comprise acrylonitrile butadiene styrene (ABS) plastic, polylactic acid (PLA), polycarbonate, polypropylene (PP), or a combination thereof.

The device casing 102 can be composed of a material with a Shore D hardness of between 80 and 100. The device casing 102 can also be composed of a material with a Shore D hardness of between 90 and 100. The device casing can also have a Shore D hardness of between 80 and 90.

The device casing 102 can also be composed of or comprise wood or metal. The device casing 102 can also be composed of or comprise a ceramic material. The device casing 102 can also be composed of or comprise a rubber or synthetic rubber.

The device casing 102 can be manufactured as one piece of injection molded plastic such as ABS plastic. The device casing 102 can also be assembled from multiple parts or panels. For example, the device casing 102 can also be assembled from two retaining walls 106, a retaining surface 108, two casing side walls 110, and two casing end walls 112. The device casing 102 can have rounded or beveled edges where the different walls or ends meet one another.

Figure 2A:
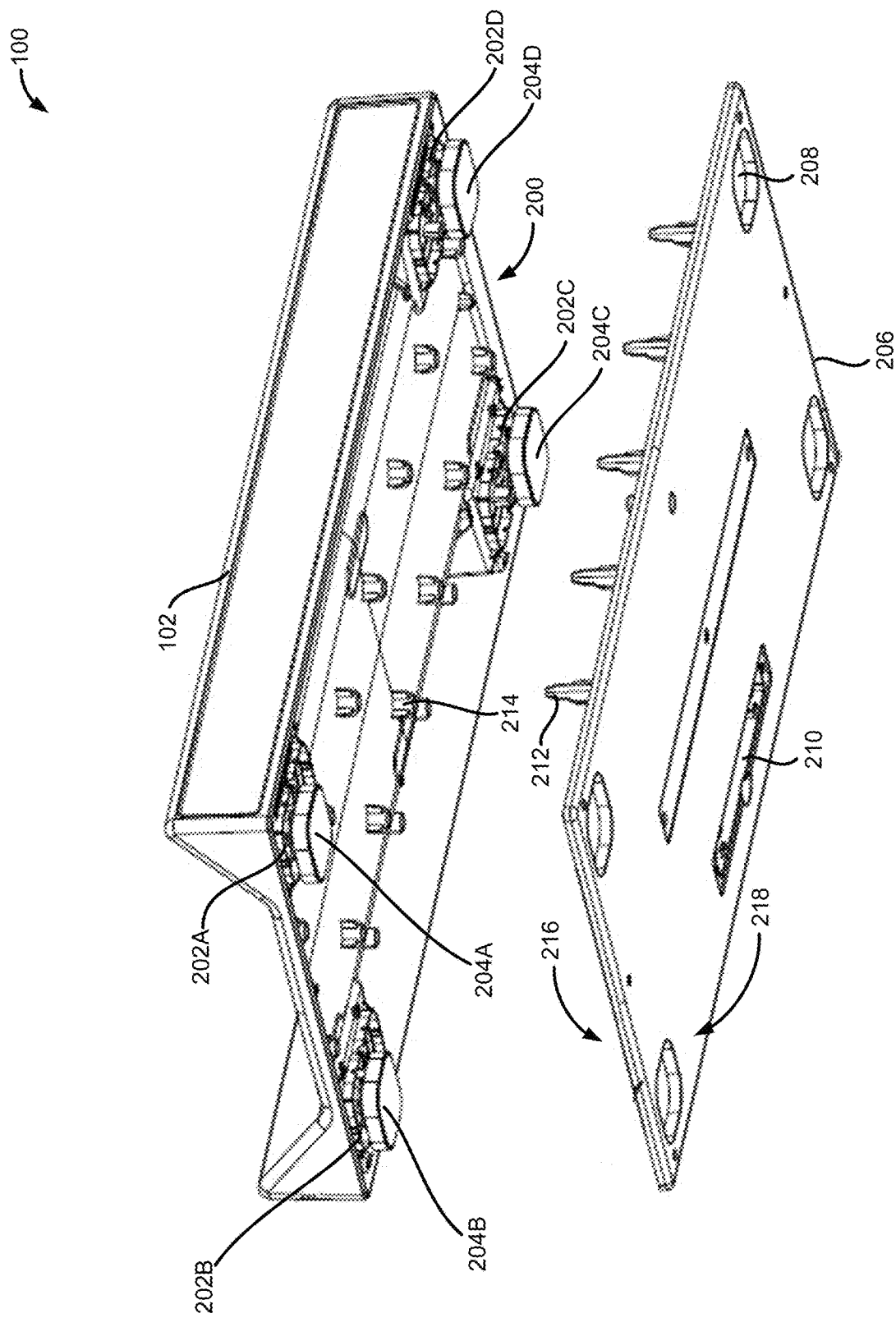
FIG. 2A illustrates a weighing device with a device base removed.

FIG. 2A illustrates that one or more weight sensors 202 can be coupled to an underside 200 of the enclosure or device casing 102. The underside 200 of the enclosure or device casing 102 can be the side of the enclosure or device casing 102 opposite the placement side 104. For example, the underside 200 of the enclosure or device casing 102 can be the sides of the receiving surface 108, the retaining walls 106, the enclosure or casing side walls 110, the enclosure or casing end walls 112, or a combination thereof opposite the sides shown in FIG. 1A.

FIG. 2A illustrates that four weight sensors 202 including a first weight sensor 202A, a second weight sensor 202B, a third weight sensor 202C, and a fourth weight sensor 202D can be coupled to the underside 200 of the enclosure or device casing 102. In other variations, the weighing device 100 can have a singular weight sensor 202, two weight sensors 202, three weight sensors 202, or five or more weight sensors 202. The weight sensors 202 can be coupled or attached to the underside 200 of the enclosure or device casing 102 via one or more sensor mounts 400 (see FIG. 4).

Each of the weight sensors 200 can be coupled or attached to a sensor mount 400 at one end and coupled or attached to a foot assembly 204 at the other end. For example, the weighing device 100 can have four feet assembly 204 including a first foot assembly 204A, a second foot assembly 204B, a third foot assembly 204C, and a fourth foot assembly 204D. The first foot assembly 204A can be coupled to the first weight sensor 202A, the second foot assembly 204B can be coupled to the second weight sensor 202B, the third foot assembly 204C can be coupled to the third weight sensor 202C, and the fourth foot assembly 204D can be coupled to the fourth weight sensor 202D.

FIG. 2A also illustrates that a device base 206 can couple or attach to the underside 200 of the enclosure or device casing 102. The device base 206 can be substantially flat or planar. In other variations, the device base 206 can be curved or have a concavity. The device base 206 can be shaped as a rectangle, an ovoid, a triangle, a circle, a square, or any other shape matching an overall footprint area of the underside 200. The device base 206 can attach to the underside 200 of the enclosure or device casing 102 via screws, adhesives, interference fit, or a combination thereof. For example, the device base 206 can attach or be coupled to a perimeter of the underside 200 of the enclosure or device casing 102.

The device base 206 can have an enclosure or casing facing side 216 and an exterior bottom side 218. The device base 206 can have one or more support pillars 212 coupled to or extending from the enclosure or casing facing side 216. The support pillars 212 can include dowels, pins, screws, or a combination thereof for stabilizing or securing the device base 206 against the underside 200 of the enclosure or device casing 102. Each of the support pillars 212 can be configured to fit within a pillar port 214 coupled to or defined along the underside 200 of the enclosure or device casing 102. The one or more pillar ports 214 can have a port opening sized to provide an interference fit with the support pillars 212. For example, the device base 206 can have ten support pillars 212 configured to fit tightly within ten pillar ports 214 on the underside 200 of the enclosure or device casing 102.

The device base 206 can have one or more feet openings 208. The feet openings 208 are windows or cutouts arranged along the device base 206 that allow a portion of a foot assembly 204 to protrude or extend through the device base 206. In another variation, the one or more weight sensors 202 can be coupled directly to the device base 206.

The device base 206 can also have a receptacle or housing coupled to or defined by the enclosure or casing facing side 216 configured to receive a portable power supply 210. The portable power supply 210 can include one or more batteries, inductive charge receivers, power connectors, or a combination thereof. For example, the portable power supply 210 can include four C size alkaline batteries. The portable power supply 210 can also include one or more lithium ion batteries, nickel cadmium batteries, or nickel metal hydride batteries. The device base 206, the enclosure or device casing 102, or a combination thereof can have conduits, ducts, or tracks along the enclosure or casing facing side 216, the exterior bottom side 218, or the underside 200 for housing electrical wires or circuitry connecting the portable power supply 210 with other electrical components of the weighing device 100.

The enclosure or casing facing side 216 can be separated from the underside 200 of the receiving surface 108 or the retaining walls 106 by a space gap or void when the device base 206 is coupled or attached to the perimeter of the enclosure or device casing 102. For example, the enclosure or casing facing side 216 of the device base 206 can be separated from the underside 200 of the receiving surface 108 or the retaining walls 106 when the device base 206 is attached or coupled to the enclosure or device casing 102. In other variations, the enclosure or casing facing side 216 touches or contacts at least portion of the underside 200 of the receiving surface 108 when the device base 206 is attached or coupled to the enclosure or device casing 102.

Figure 2B:
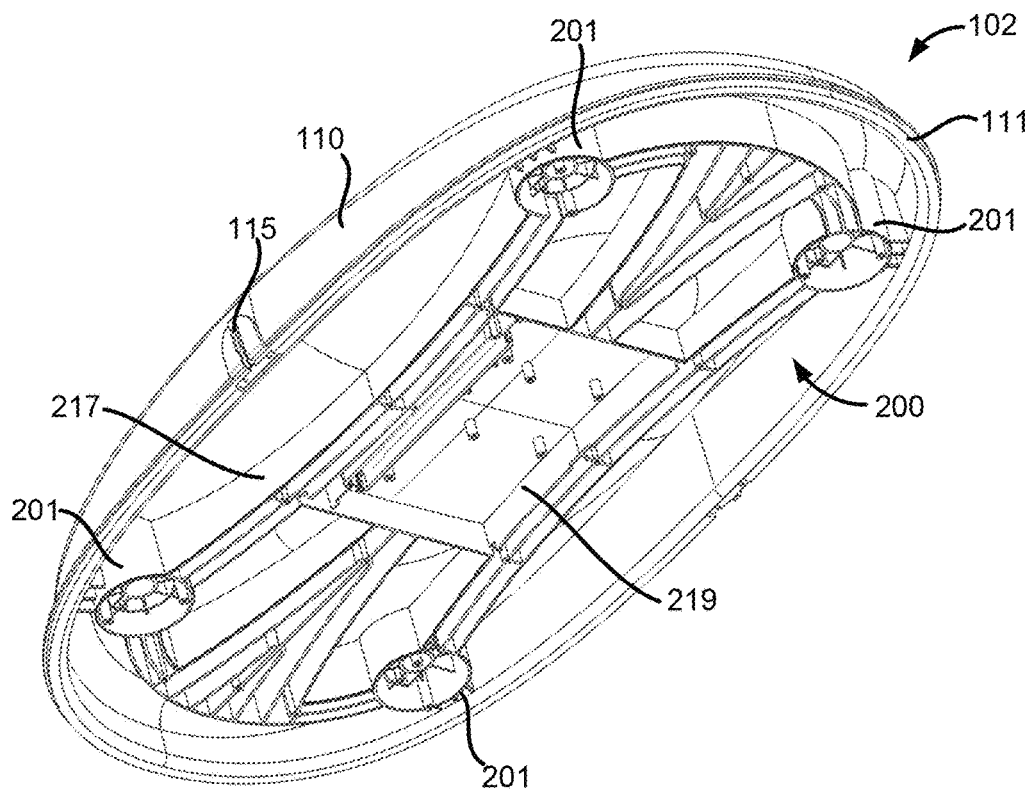
FIG. 2B illustrates a perspective view of an underside of a device casing of a weighing device.

FIG. 2B illustrates a perspective view of the underside 200 of the variation of the device casing 102 depicted in FIG. 1B. The device casing 102 can have four foot housing structures 201 defined on the underside 200 of the device casing 102. As shown in FIG. 2B, each foot housing structure 201 can be substantially cylindrical. The foot housing structure 201 can be configured to house or partially house a weight sensor 202, a foot assembly 204, or a combination thereof. In other variations, the foot housing structure 201 can be substantially rectangular-shaped, square-shaped, triangular-shaped, oval-shaped, or a combination thereof. The foot housing structure 201 can be surface features defined along the underside 200 of the device casing 102.

The device casing 102 can also be defined by curved struts 217 extending longitudinally, laterally, or a combination thereof along the underside 200 of the device casing 102. As shown in FIG. 2B, the curved struts 217 can connect one foot housing structure 201 with other foot housing structures 201. The curved struts 217 can be used to reinforce or support the device casing 102.

The underside 200 of the device casing 102 can also be defined by an electronics housing 219. The electronics housing 219 can be used to house the electronic system 1800 (see FIG. 18) of the weighing device 100, a portable power supply 210, or a combination thereof.

As shown in FIG. 2B, a number of void spaces or gaps can separate the foot housing structures 201 from the casing side walls 110 and the casing end walls 112. In addition, a number of void spaces or gaps can separate each of the curved struts 217 from other curves struts 217 and separate the curved struts 217 from the casing side walls 110 and the casing end walls 112.

Figure 2C:
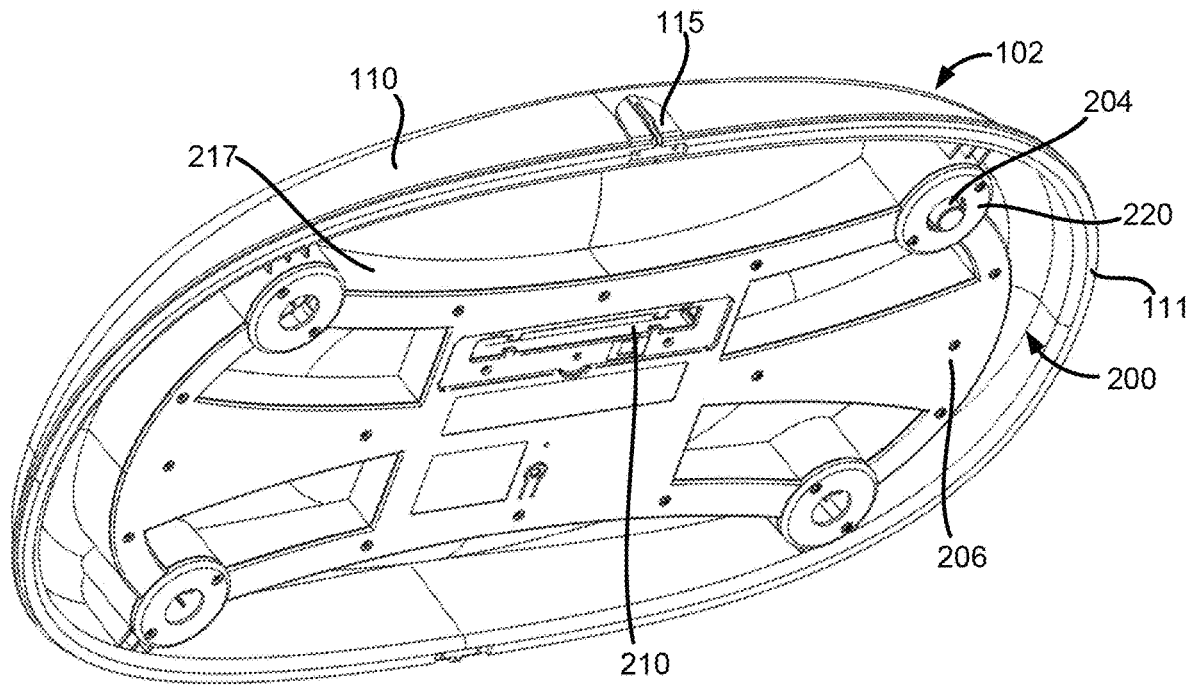
FIG. 2C illustrates a device casing with a device base coupled to the underside of the device casing.

FIG. 2C illustrates that a device base 206 can couple or attach to the underside 200 of the device casing 102. The device base 206 can be designed to conform to at least part of the underside 200 of the device casing 102. In addition, at least part of the device base 206 can be shaped as an annular disk 220 used to secure part of a foot assembly 204 to the device casing 102. For example, the device base 206 can have four corner regions and each of the corner regions can be shaped as an annular disk 220. The annular disks 220 can be used, in part, to secure the foot assembly 204 to a foot housing structure 201 defined on the underside 200 of the device casing 102. In one variation, the annular disk 200 can serve as a type of foot limiter 608 (see FIG. 6).

Although only one foot assembly 204 is shown in FIG. 2C, it should be understood by one of ordinary skill in the art that each of the four foot housing structures 201 can house a weight sensor 202 and a foot assembly 204. FIG. 2C also illustrates that at least part of the foot assembly 204 can extend beyond the device casing 102 and the device base 206 when the weighing device 100 is in the assembled state. For example, an end of the foot assembly 204 not coupled to the weight sensor 202 can extend beyond the device casing 102 and the device base 206.

Figure 3A:
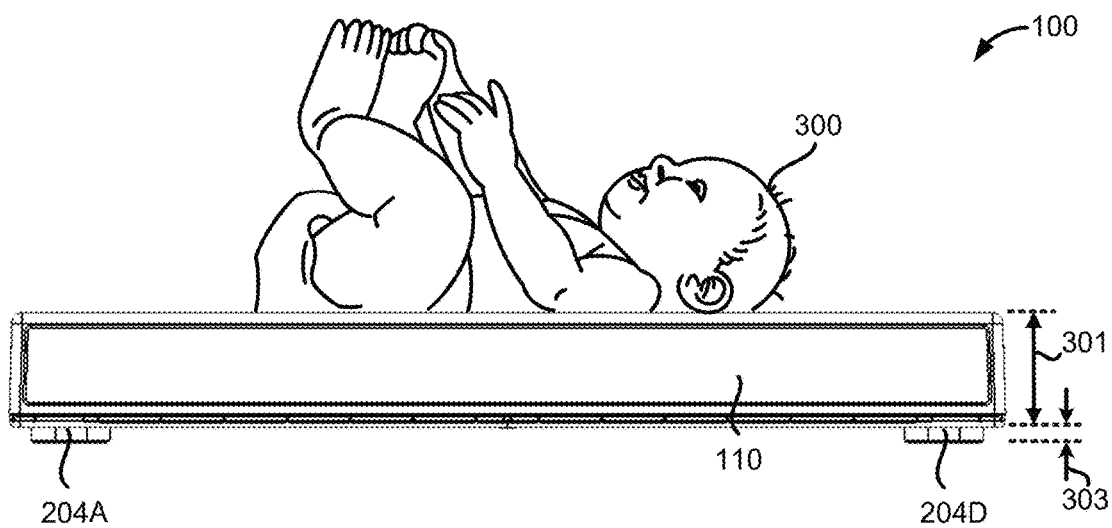
FIG. 3A illustrates a side view of a weighing device.

FIG. 3A illustrates that the casing side walls 110 of the enclosure or device casing 102 can be sized to retain or prevent the load 300 from falling or rolling off the receiving surface 108. For example, the load 300 can be an infant and the enclosure or casing side walls 110 and the retaining walls 106 can confine or prevent the infant from rolling off the weighing device 100 while the infant is being weighed or having its diaper changed while lying supine on the receiving surface 108.

The casing side walls 110 can have a height dimension 301. The height dimension 301 can be between 85.00 mm and 100.0 mm. For example, the height dimension 301 can be approximately 90.50 mm.

FIG. 3A also illustrates that a portion of the foot assembly 204 can extend beyond or past the device casing 102 and the device base 206. For example, the portion of the foot assembly 204 extending beyond or past the enclosure or device casing 102 can be a portion of the foot housing 600 (see FIG. 6). The portion of the foot assembly 204 extending beyond or past the enclosure or device casing 102 or the device base 206 can have a height dimension 303. This height dimension 303 can be between approximately 8.00 mm and 10.00 mm. For example, the height dimension 303 can be approximately 9.60 mm.

When the weighing device 100 has four feet assembly 204, the four feet assembly 204 can support or carry the full weight of the remainder of the weighing device 100 and the load 300 including the device casing 102, any components of the weighing device 100 coupled to the device casing 102, or a combination thereof.

Figure 3B:
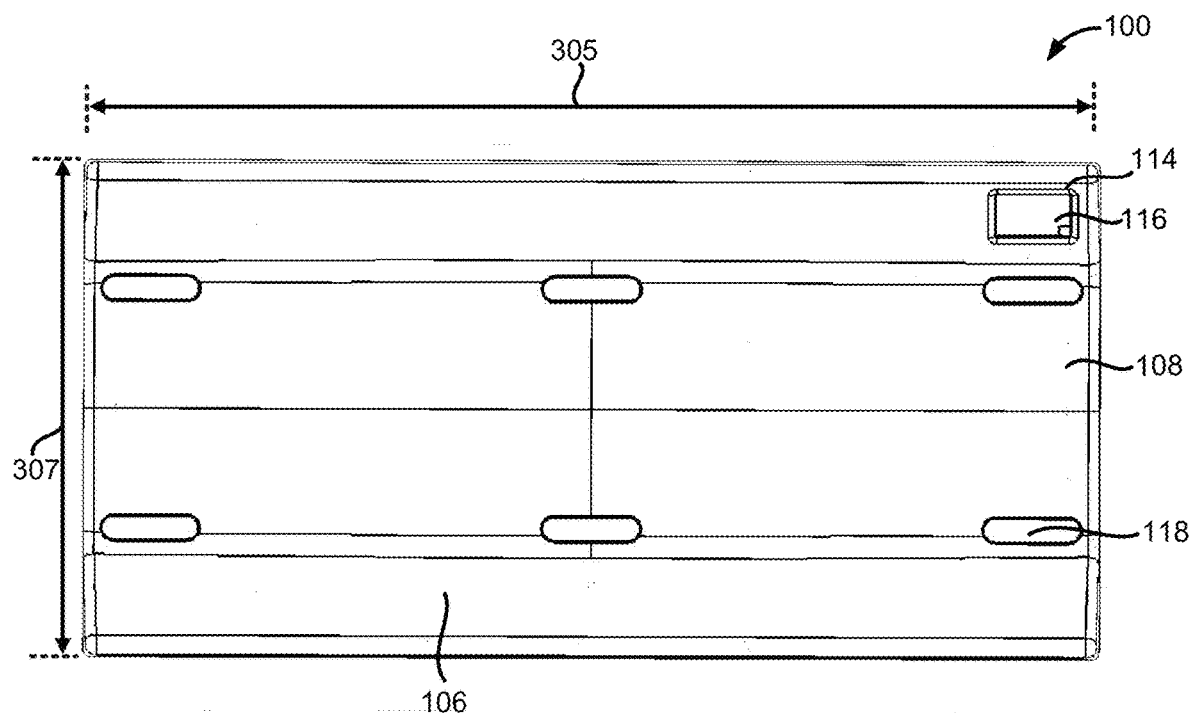
FIG. 3B illustrates a top plan view of a weighing device.

FIG. 3B illustrates that the enclosure or device casing 102 can have a length dimension 305 and a width dimension 307. The length dimension 305 can be between 650.0 mm to 800.0 mm. For example, the length dimension 305 can be approximately 790.6 mm. The width dimension 307 can be between 300.0 mm to 400.0 mm. For example, the width dimension 307 can be approximately 387.4 mm. The length dimension 305 and the width dimension 307 can define a device footprint of the weighing device 100.

Figure 3C:
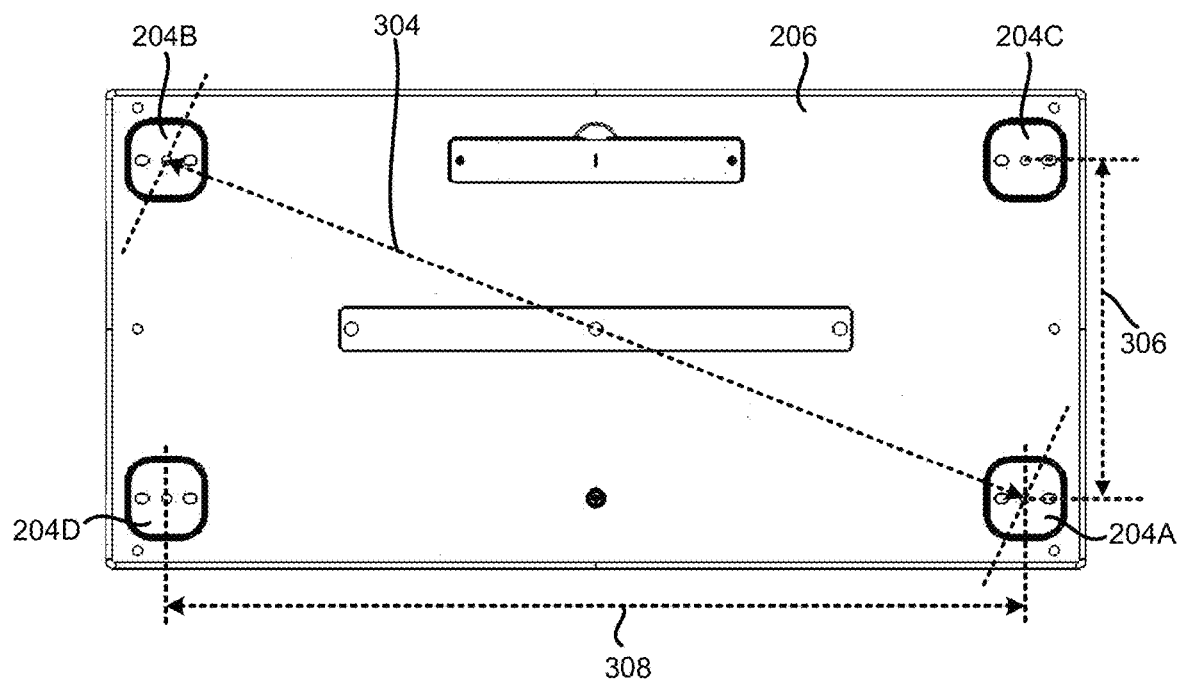
FIG. 3C illustrates a bottom plan view of a weighing device.
Figure 3D:
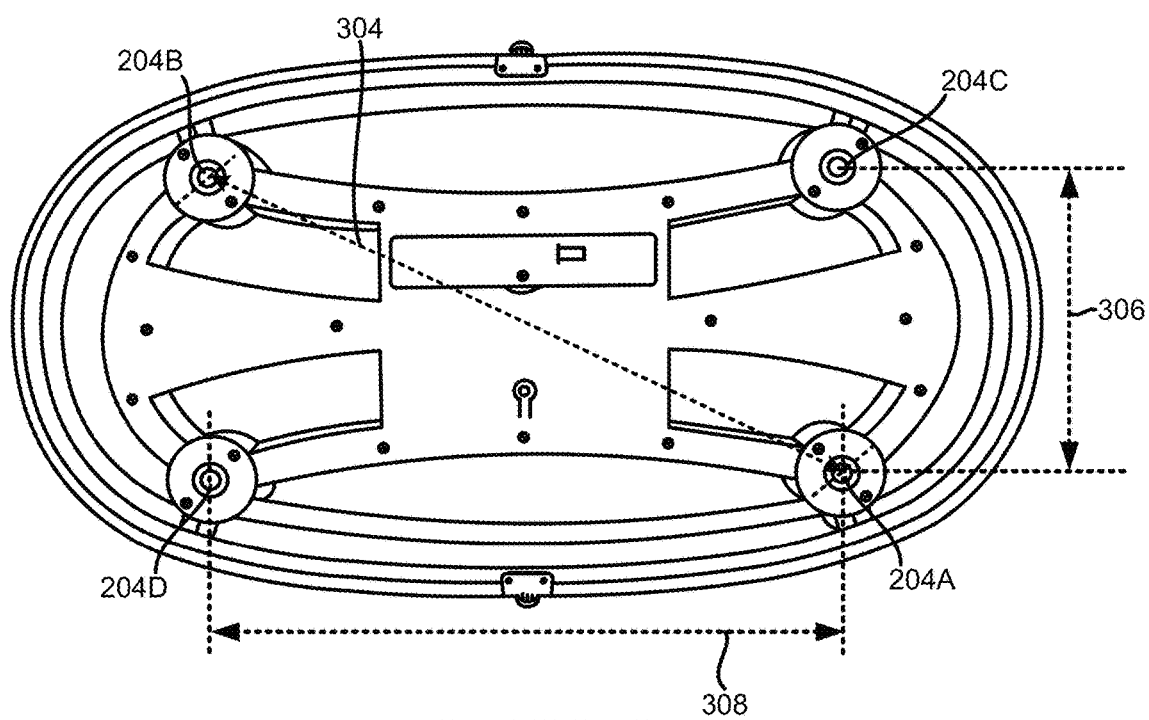
FIG. 3D illustrates a bottom plan view of a variation of a weighing device.

FIGS. 3C and 3D illustrate that the weighing device 100 can have four feet assembly 204 including a first foot assembly 204A, a second foot assembly 204B, a third foot assembly 204C, and a fourth foot assembly 204D. In other variations, the weighing device 100 can have one foot assembly, two feet assembly, three feet assembly, or five or more feet assembly.

The first foot assembly 204A can be coupled to the device casing 102 via the first weight sensor 202A, the second foot assembly 204B can be coupled to the device casing 102 via the second weight sensor 202B, the third foot assembly 204C can be coupled to the device casing 102 via the third weight sensor 202C, and the fourth foot assembly 204D can be coupled to the device casing 102 via the fourth weight sensor 202D. As illustrated in FIGS. 3C and 3D, the second foot assembly 204B can be the furthest foot assembly from the first foot assembly 204A, the fourth foot assembly 204D can be the next furthest foot assembly from the first foot assembly 204A, and the third foot assembly 204C can be the closest foot assembly from the first foot assembly 204A.

The first foot assembly 204A can be separated from the second foot assembly 204B by a first distance 304. The first foot assembly 204A can be separated from the third foot assembly 204C by a second distance 306. The first foot assembly 204A can be separated from the fourth foot assembly 204D by a third distance 308.

The first distance 304, the second distance 306, and the third distance 308 can each be a straight line distance between a point on one foot assembly 204 and another point on another foot assembly 204. For example, the first distance 304, the second distance 306, and the third distance 308 can each be measured from a center point or midpoint of one foot assembly 204 to the center point or midpoint of another foot assembly 204. Additionally, the first distance 304, the second distance 306, and the third distance 308 can each be measured from a specific corner or vertex of a foot housing 600 of one foot assembly 204 to the corresponding corner or vertex of the foot housing 600 of another foot assembly 204. Moreover, the first distance 304, the second distance 306, and the third distance 308 can each be measured from a midpoint along a specific side or edge of the foot housing 600 of one foot assembly 204 to a midpoint along a corresponding side or edge of the foot housing 600 of another foot assembly 204.

For example, the first distance 304 separating the first foot assembly 204A from the second foot assembly 204B can be between 490.0 mm and 660.0 mm. Also, for example, the first distance 304 can be between 660.0 mm and 750.0 mm. As a more specific example, the first distance 304 can be approximately 495.0 mm. In addition, the second distance 306 separating the first foot assembly 204A from the third foot assembly 204C can be between 210.0 mm and 250.0 mm. Also, for example, the second distance 306 can be between 250.0 mm and 300.0 mm. As a more specific example, the second distance 306 can be approximately 217.8 mm. The third distance 308 separating the first foot assembly 204A from the fourth foot assembly 204D can be between 442.7 mm and 610.8 mm. Also, for example, the third distance 308 can be between 610.8.00 mm and 687.4 mm. As a more specific example, the third distance 308 can be approximately 444.5 mm.

A ratio between the first distance 304 separating the first foot assembly 204A from the second foot assembly 204B and the second distance 306 separating the first foot assembly 204A from the third foot assembly 204C (e.g., first distance 304 divided by second distance 306) can be between approximately 2.0 and 3.0. In addition, a ratio between the first distance 304 separating the first foot assembly 204A from the second foot assembly 204B and the second distance 306 separating the first foot assembly 204A from the third foot assembly 204C can be between approximately 2.1 and 2.5. Furthermore, a ratio between the first distance 304 separating the first foot assembly 204A from the second foot assembly 204B and the second distance 306 separating the first foot assembly 204A from the third foot assembly 204C can be between approximately 2.2 and 2.3. Such ratios allow the feet assembly 204 to be spaced apart in such a way that the weighing device 100 can be used to accurately and precisely measure the weight of an infant or baby while the infant or baby is lying supine on the placement side 104 of the weighing device 100. For example, when the ratio between the first distance 304 separating the first foot assembly 204A from the second foot assembly 204B and the second distance 306 separating the first foot assembly 204A from the third foot assembly 204C is between 2.0 and 3.0, the four weight sensors 202 coupled to the four feet assembly 204 can provide signals which more accurately reflect the weight of the infant or toddler.

A ratio between the first distance 304 separating the first foot assembly 204A from the second foot assembly 204B and the third distance 308 separating the first foot assembly 204A from the fourth foot assembly 204D (e.g., first distance 304 divided by third distance 308) can be between approximately 1.05 and 1.20. In addition, a ratio between the first distance 304 separating the first foot assembly 204A from the second foot assembly 204B and the third distance 308 separating the first foot assembly 204A from the fourth foot assembly 204D can be between approximately 1.09 and 1.15. Furthermore, a ratio between the first distance 304 separating the first foot assembly 204A from the second foot assembly 204B and the third distance 308 separating the first foot assembly 204A from the fourth foot assembly 204D can be between approximately 1.10 and 1.13.

Although not shown in FIG. 3D, the first foot assembly 204A can be coupled directly or indirectly to a first weight sensor 202A, the second foot assembly 204B can be coupled directly or indirectly to a second weight sensor 202B, the third foot assembly 204C can be coupled directly or indirectly to a third weight sensor 202C, and the fourth foot assembly 204D can be coupled directly or indirectly to a fourth weight sensor 202D.

In one variation, each of the four weight sensors 202 (for example, any of the first weight sensor 202A, the second weight sensor 202B, the third weight sensor 202C, or the fourth weight sensor 202D) can measure a load 300 of up to 10 kg and the four weight sensors 202 combined can measure a load 300 of up to 40 kg. The four weight sensors 202 can measure the load 300 with a full scale accuracy of ±0.05%. Each of the weight sensors 202 can have an internal resistance of 1000±10 Ohms, an excitation voltage of 10V DC, or a combination thereof. Each of the weight sensors 202 can have a rated output of 1.00±0.2 mv/v, a zero balance of ±0.50 mv/v, or a combination thereof. Each of the weight sensors 202 can also tolerate one or more measurement errors including a thermal zero drift at 10° C. of ±0.20%, a sensitivity drift at 10° C. of ±0.05%, a non-linearity error of ±0.05%, a hysteresis of ±0.05%, a repeatability error of ±0.05%, creep of ±0.10% per 3 minutes, four corner error of ±0.20%, or a combination thereof. Each of the four weight sensors 202 can also have a maximum overload threshold of 150%.

Figure 3E:
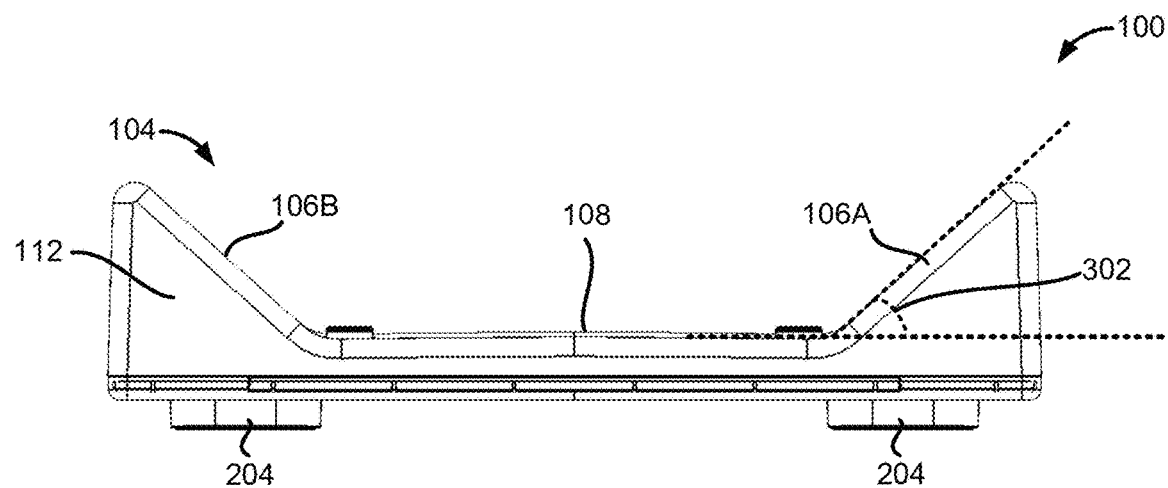
FIG. 3E illustrates a front view of a weighing device.

FIG. 3E illustrates that the retaining walls 106 can be inclined with respect to the receiving surface 108. For example, the weighing device 100 can have two retaining walls 106 and the two retaining walls 106 can be inclined in opposing directions with respect to the receiving surface 108. Each of the retaining walls 106 can be inclined at an angle 302 with respect to the receiving surface 108. The angle 302 can be between 25 degrees and 60 degrees. For example, the angle 302 can be between 30 degrees and 40 degrees. The angle 302 can be approximately 35 degrees. The angle 302 can also be between 60 degrees and 90 degrees.

When the weighing device 100 has two retaining walls 106, the first retaining wall 106A can be coupled to or contact one side of the receiving surface 108 and the second retaining wall 106B can be coupled to or contact another side of the receiving surface 108. When the receiving surface 108 is a substantially flat or planar surface, the two inclined walls 106 can form a trapezoidal-shaped furrow or channel for retaining or holding the load 300.

Figure 3F:
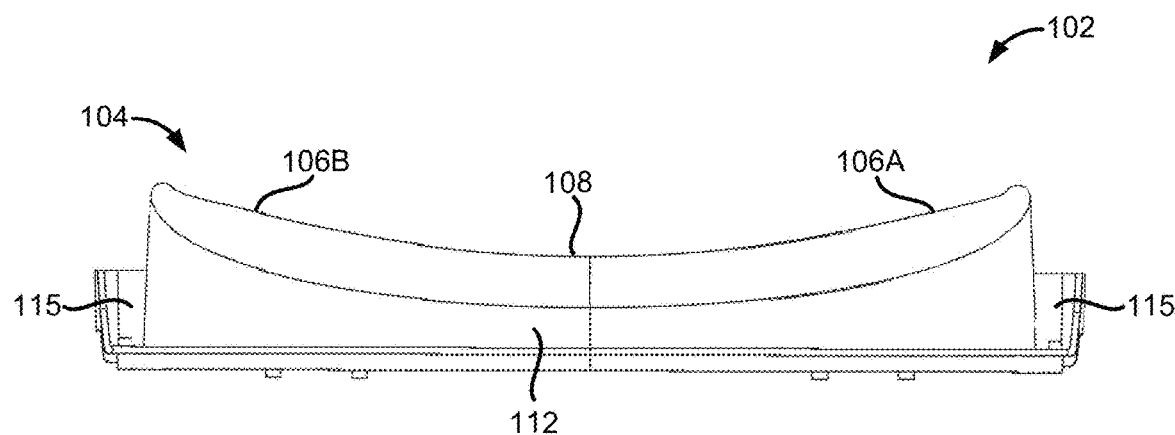
FIG. 3F illustrates a front view of another variation of a weighing device.

FIG. 3F illustrates that the retaining walls 106 (for example, retaining walls 106A and 106B) can also be curved or rounded. The retaining walls 106 can slope upwards with respect to the receiving surface 108. For example, the two retaining walls 106 and the receiving surface 108 can form a U-shaped trough or furrow for retaining the load 300. The device casing 102 of FIG. 3F can be the same device casing 102 as that shown in FIGS. 1B, 2B, 2C, and 3D. In one variation, the receiving surface 108 can have a substantially flat or planar portion.

The curvature of the retaining walls 106 can provide an unexpected benefit when the weighing device 100 is being used to measure a moving load 300 such as a wiggly or squirming infant or toddler.

FIG. 4 illustrates that one or more sensor mounts 400 can be coupled to the underside 200 of the enclosure or device casing 102. The sensor mount 400 can be coupled to a portion of the underside 200 of one of the retaining walls 106. The sensor mount 400 can also be coupled to a portion of the underside 200 of the receiving surface 108, the enclosure or casing side wall 110, the enclosure or casing end wall 112, or a combination thereof.

The sensor mount 400 can be coupled to the underside of the enclosure or device casing 102 by screws, adhesives, or interference fittings. The sensor mount 400 can be positioned in a corner or vertex of the underside 200 of the enclosure or device casing 102. For example, the sensor mount 400 can be coupled to a corner formed by a meeting of one of the casing side walls 110 and one of the casing end walls 112. Four sensor mounts 400 can be coupled to the underside 200 of the enclosure or device casing 102 where each sensor mount 400 is coupled to a corner of the underside 200 of the enclosure or device casing 102. One such sensor mount 400 can also be coupled to a backside of the display component 116 and serve as a support for the display component 116.

Figure 5A:
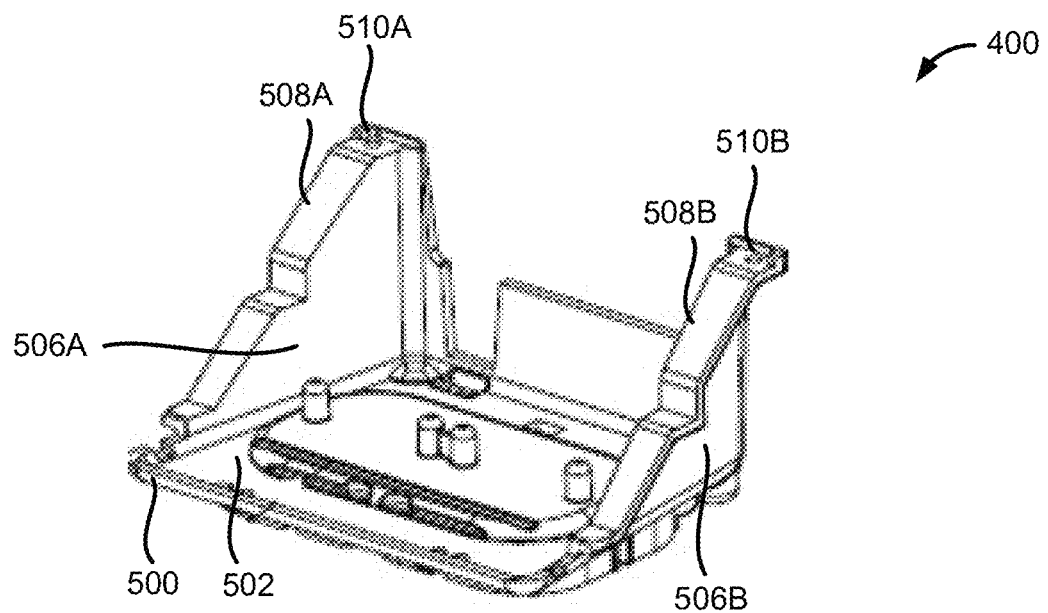
FIG. 5A illustrates a perspective view of a casing facing surface of a sensor mount.

FIG. 5A illustrates that the sensor mount 400 can have a mount base 500, a first mount wall 506A, a second mount wall 506B, a first mount edge 508A, a second mount edge 508B, a first planar mount face 510A, a second planar mount face 510B, or a combination thereof. The first mount wall 506A can be coupled to or extend from an edge of the mount base 500 and the second mount 506B can be coupled to or extend from a non-adjoining or parallel edge of the mount base 500.

The mount base 500 can have an enclosure or casing facing surface 502 and a sensor facing surface 504. The enclosure or casing facing surface 502 can be the side of the mount base 500 configured to face the underside 200 of the enclosure or device casing 102 when the sensor mount 400 is coupled to the enclosure or device casing 102. The mount base 500 can be generally rectangular with a planar portion and raised portions or convexities extending from the enclosure or casing facing surface 502.

The mount base 500 can have a length dimension of between 120.0 mm and 140.0 mm. For example, the mount base 500 can have a length dimension of approximately 135.3 mm. The mount base 500 can have a width dimension of between 85.0 mm and 100.0 mm. For example, the mount base 500 can have a width dimension of approximately 98.10 mm.

The first mount wall 506A and the second mount wall 506B can be substantially triangle-shaped. The first mount wall 506A can have a first mount edge 508A coupled to or extending from a sloped side of the first mount wall 506A. For example, the first mount edge 508A can be orthogonal to the first mount wall 506A. The first mount edge 508A can be inclined with respect to the planar or flat portion of the mount base 500. The first mount edge 508A can be inclined at an angle substantially equivalent to angle 302. For example, the first mount edge 508A can be inclined at an angle between 25 degrees and 60 degrees. The first mount edge 508A can also be inclined at an angle between 30 degrees and 40 degrees. The first mount edge 508A can be inclined at an angle of approximately 35 degrees.

When the first mount wall 506A and the second mount wall 506B are shaped as congruent triangles, a side of each of the first mount wall 506A and the second mount wall 506B can be approximately the width of the mount base 500 and another side of each of the first mount wall 506A and the second mount wall 506B can have a height dimension of between 60.0 mm and 70.0 mm. For example, the first mount wall 506A or the second mount wall 506B can have a height dimension of approximately 67.9 mm.

The second mount wall 506B can have a second mount edge 508B coupled to or extending from a sloped side of the second mount wall 506B. The second mount edge 508B can be inclined with respect to the planar or flat portion of the mount base 500. The second mount edge 508B can be inclined at an angle substantially equivalent to angle 302. For example, the second mount edge 508B can be inclined at an angle between 25 degrees and 60 degrees. The second mount edge 508B can also be inclined at an angle between 30 degrees and 40 degrees. The second mount edge 508B can be inclined at an angle of approximately 35 degrees. The second mount edge 508B can be orthogonal to the second mount wall 506B.

The sensor mount 400 can have a first planar mount face 510A coupled to an end of the first mount edge 508A. The mount base 500 can have a second planar mount face 510B coupled to an end of the second mount edge 508B. The first planar mount face 510A, the second planar mount face 510B, or a combination thereof can be substantially parallel to the planar or flat portion of the enclosure or casing facing surface 502. The first mount edge 508A and the second mount edge 508B can be coupled or attached to at least one retaining wall 106 of the enclosure or device casing 102. The first planar mount face 510A and the second planar mount face 510B can be coupled to a higher or more inclined region of the same retaining wall 106. In some variations, a portion of the mount base 500 can be coupled to the underside of the receiving surface 108.

When the weighing device 100 has four sensor mounts 400, two sensor mounts 400 can be coupled or attached to opposite longitudinal ends of the same retaining wall 106. For example, two sensor mounts 400 can be coupled or attached to the first retaining wall 106A and two sensor mounts 400 can be coupled or attached to the second retaining wall 106B.

Figure 5B:
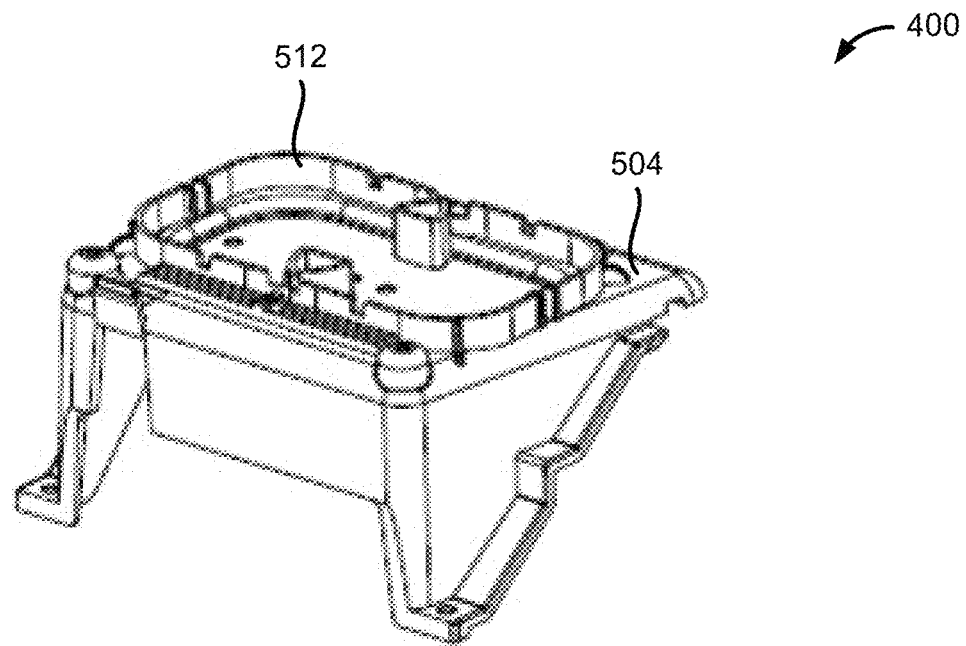
FIG. 5B illustrates a perspective view of a sensor facing surface of a sensor mount.

FIG. 5B illustrates that the sensor mount 400 can have a sensor facing surface 504. The sensor facing surface 504 can be a side of the sensor mount opposite the enclosure or casing facing surface 502 and configured to face or contact the weight sensor 202. The sensor mount 400 can have a sensor housing 512 coupled to or extending from the sensor facing surface 504. The sensor housing 512 can be a raised or protruding perimeter positioned orthogonal to the sensor facing surface 504. The sensor housing 512 can be sized so as to house or secure a weight sensor 202. The sensor housing 512 can have a perimeter height of between 10.0 mm and 12.0 mm. The sensor housing 512 can have a perimeter height of approximately 11.75 mm. The sensor housing 512 can surround or define a substantially rectangular-shaped portion of the sensor facing surface 504. In other variations, the sensor housing 512 can surround or define a substantially oval-shaped portion, circle-shaped portion, triangular-shaped portion, or a combination thereof of the sensor facing surface 504.

The weight sensor 202 can be coupled to the sensor housing 512 by screws, adhesives, an interference fit, or a combination thereof. The sensor mount 400 can first be coupled to the underside 200 of the enclosure or device casing 102 and then coupled to the weight sensor 202. In other variations, the weight sensor 202 can first be coupled to the sensor 400 and then the sensor mount 400 can be coupled to the underside 200 of the enclosure or device casing 102.

The sensor mount 400 can be composed of or comprise a polymer. The sensor mount 400 can be composed of or comprise a thermoplastic. The sensor mount 400 can be composed of or comprise an injection molded polymer. The sensor mount 400 can be composed of or comprise ABS plastic, PLA, polycarbonate, PP, or a combination thereof.

The sensor mount 400 can be composed of a material with a Shore D hardness of between 90 and 100. The sensor mount 400 can be manufactured as one molded piece of ABS plastic.

Figure 6:
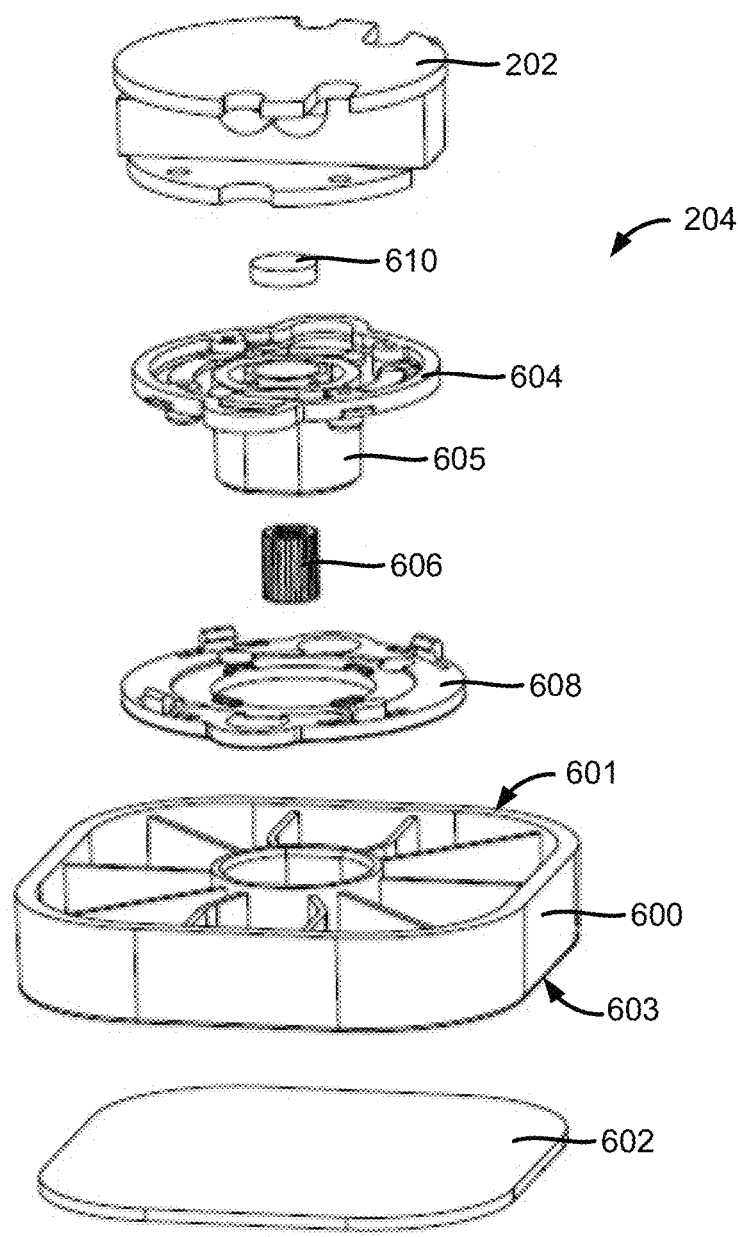
FIG. 6 is an exploded view of a weight sensor and foot assembly.

FIG. 6 illustrates that the foot assembly 204 can include a foot housing 600, a friction pad 602, a webbed indenter 604 including an indenter barrel 605, a thread pin 606, a foot limiter 608, a foot contact disk 610, or a combination thereof. The foot housing 600 can be a support structure for the foot assembly 204. Each of the friction pad 602, the foot housing 600, the webbed indenter 604, the thread pin 606, the foot limiter 608, or the foot contact disk 610 can have a sensor end 601 and a contact surface end 603. The sensor end 601 can be a surface or end of a part of the foot assembly 204 proximal to the weight sensor 202 or facing the weight sensor 202. The contact surface end 603 can be a surface or end of a part of the foot assembly 204 distal to the weight sensor 202 or facing a contact surface such as a tabletop surface, a counter surface, a shelf surface, or the ground.

The friction pad 602 can be coupled or affixed to the foot housing 600. The friction pad 602 can include or be composed of rubber, synthetic rubber, a polymer having a high friction coefficient, or a combination thereof. The contact surface end 603 of the friction pad 602 can have a friction inducing pattern such as a waffled pattern, a pock-marked pattern, a grooved pattern, a lined indentation pattern, or a combination thereof. The sensor end 601 of the friction pad 602 can be coated with an adhesive for affixing the friction pad 602 to the contact surface end 603 of the foot housing 600. The friction pad 602 can have a thickness or height dimension between 1.00 mm to 2.00 mm. For example, the friction pad 602 can have a thickness or height dimension of approximately 1.50 mm.

FIG. 6 also illustrates that the foot limiter 608 can be positioned or placed in between the foot housing 600 and the webbed indenter 604. The foot limiter 608 can be a component of the foot assembly 204 for limiting or restraining a compressive strain or force applied to the webbed indenter 604, the weight sensor 202, or a combination thereof. The foot limiter 608 can also limit or restrain a lateral movement of the webbed indenter 604, the weight sensor 202, or a combination thereof relative to the foot housing 600. The contact surface end 603 of the foot limiter 608 can be placed on the sensor end 601 of the foot housing 600. The sensor end 601 of the foot limiter 608 can be affixed or coupled to the contact surface end 603 of the webbed indenter 604.

As illustrated in FIG. 6, the thread pin 606 can be inserted or positioned inside a portion of the webbed indenter 606. The thread pin 606 can be a component of the foot assembly 204 configured to apply a compressive force to a part of the webbed indenter 604, the weight sensor 202, or a combination thereof. The thread pin 606 can be shaped as a cylinder, a prism, a polyhedron, a rectangular cuboid, or a combination thereof. The thread pin 606 can have a hollow core or center.

The foot assembly 204 can also have a foot contact disk 610 positioned or placed in between the webbed indenter 604 and the weight sensor 202. The foot contact disk 610 can dampen or cushion the impact or the force exerted on the weight sensor 202 by the rest of the foot assembly 204 including the webbed indenter 604. The foot contact disk 610 can be shaped as a substantially cylindrical disc. In other variations, the foot contact disk 610 can be shaped as a rectangle or triangle having a height or depth dimension. The foot contact disk 610 can be made of or comprise a metal or metal alloy. The foot contact disk 610 can be a cylindrical disc with a diameter between 6.00 mm and 9.00 mm. For example, the foot contact disk 610 can have a diameter of approximately 8.00 mm. The foot contact disk 610 can have a height dimension of between 1.00 mm and 3.00 mm. For example, the foot contact disk 610 can have a height of approximately 2.00 mm.

FIG. 6 also illustrates that the foot assembly 204 can be coupled to the weight sensor 202. The contact surface end 603 of the weight sensor 202 can contact or be attached to the foot contact disk 610, the webbed indenter 604, or a combination thereof. The weight sensor 202 can be attached to the webbed indenter 604 via screws, clips, interference fit, or a combination thereof. For example, the weight sensor 202 can be attached to the webbed indenter 604 via four screws.

The weight sensor 202 can be attached to the underside 200 of the enclosure or device casing 102 via the sensor mount 400. The weight sensor 202 can be coupled or attached to the sensor housing 512 of the sensor mount 400.

Each of the weight sensors 202 can include a strain gauge load cell. For example, the weight sensor 202 can include or be a bending strain gauge, a tension strain gauge, a compression strain gauge, or a combination thereof. Each of the weight sensors 202 can include or be an E-shaped strain gauge beam. For example, each of the weight sensors 202 can also include or be an aluminum alloy strain gauge load cell, a steel strain gauge load cell, or a combination thereof. Each of the weight sensors 202 can have at least two strain gauges and three lead wires including one for the excitation voltage, one for the signal voltage, and a common ground. In this variation, the three lead wires from each weight sensor 202 can connect to an ADC 1806 (see FIG. 18) and contribute to a signal 1812 (see FIG. 18) corresponding to a weight of the load 300.

The weighing device 100 can comprise four weight sensors 202 including a first weight sensor 202A, a second weight sensor 202B, a third weight sensor 202C, and a fourth weight sensor 202D. In this variation, each of the four weight sensors 202 including the first weight sensor 202A, the second weight sensor 202B, the third weight sensor 202C, and the fourth weight sensor 202D can include or be a half-bridge load cell. In other variations, each of the four weight sensors 202 can include or be a quarter-bridge load cell or a full-bridge load cell.

Each of the weight sensors 202 can measure a load 300 of up to 10 kg and the four weight sensors 202 combined can measure a load 300 of up to 40 kg. The four weight sensors 202 can measure the load 300 with a full scale accuracy of ±0.05%. Each of the weight sensors 202 can have an internal resistance of 1000±10 Ohms, an excitation voltage of 10V DC, or a combination thereof. Each of the weight sensors 202 can have a rated output of 1.00±0.2 mv/v, a zero balance of ±0.50 mv/v, or a combination thereof. Each of the weight sensors 202 can also tolerate one or more measurement errors including a thermal zero drift at 10° C. of ±0.20%, a sensitivity drift at 10° C. of ±0.05%, a non-linearity error of ±0.05%, a hysteresis of ±0.05%, a repeatability error of ±0.05%, creep of ±0.10% per 3 minutes, four corner error of ±0.20%, or a combination thereof. Each of the four weight sensors 202 can also have a maximum overload threshold of 150%.

The manner in which the four feet assembly 204 are coupled to the enclosure or device casing 102 can provide an unexpected benefit when measuring a particular type of load such as an infant or toddler lying supine on the placement side 104. For example, when the ratio between the first distance 304 separating the first foot assembly 204A from the second foot assembly 204B and the second distance 306 separating the first foot assembly 204A from the third foot assembly 204C is between 2.0 and 3.5, the four weight sensors 202 coupled to the four feet assembly 204 can provide signals which more accurately reflect the weight of the infant or toddler.

In addition, the incline of the retaining walls 106 with respect to the receiving surface 108 and the shape of the sensor mount 400 coupled to the underside 102 of the retaining walls 106 can provide an unexpected benefit when measuring a moving load 300 such as a wiggly or squirming infant or toddler.

Moreover, the components of the foot assembly 204 and the manner in which the components of the foot assembly including the foot housing 600, the webbed indenter 604 having an indenter barrel 605 partially positioned inside the foot housing 600, the thread pin 606, the foot limiter 608, and the foot contact disk 610 are assembled in the assembled state 1100 can provide an unexpected benefit when the weighing device 100 is used to measure a non-stationary load 300 that can exhibit motion at both ends of the load 300 (e.g., the head and feet of the infant or toddler).

Figure 7:
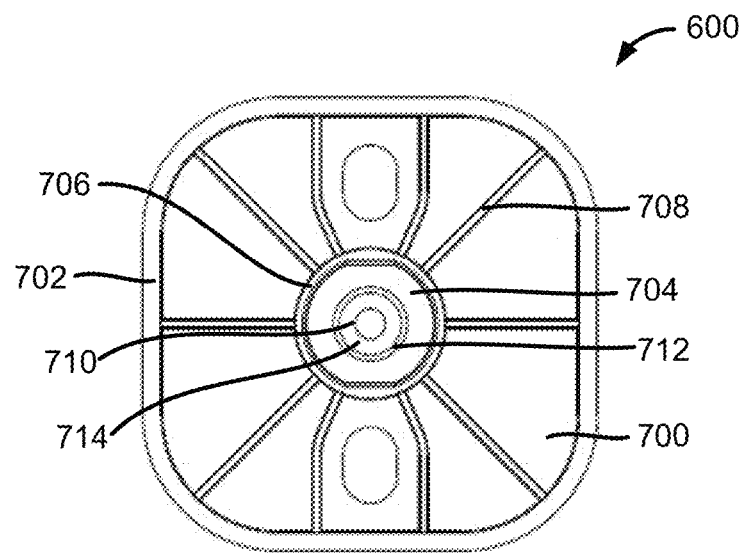
FIG. 7 illustrates a foot housing of a foot assembly.

FIG. 7 illustrates that the foot housing 600 of the foot assembly 204 can have a foot base 700 surrounded by a housing wall 702. The foot base 700 can be shaped as a rectangle, circle, oval, triangle or other polygon, or a combination thereof. The foot base 700 can have rounded corners or vertices. For example, the foot base 700 can be shaped as a square having rounded corners. The foot base 700 can have a length dimension of between 50.0 and 70.0 mm and a width dimension of between 50.0 and 70.0 mm. For example, the foot base 700 can have a length dimension of approximately 62.68 mm and a width dimension of approximately 62.68 mm.

The housing wall 702 can surround the perimeter of the foot base 700. The housing wall 702 can have a height dimension of between 10.0 mm and 15.0 mm. For example, the housing wall 702 can have a height dimension of approximately 12.0 mm.

The foot housing 600 can include a housing channel wall 706 extending orthogonally from the foot base 700. The housing channel wall 700 can be a substantially cylindrical structure circumscribing or defining a housing channel 704. The housing channel 704 can be a cavity or space sized to receive and hold a portion of the thread pin 606, the indenter barrel 605, or a combination thereof. A portion of the indenter barrel 605 can be positioned in the housing channel 704 when the foot assembly 204 is in an assembled state 1100 (see FIGS. 11A and 11B). The housing channel 704 can prevent the lateral displacement of the webbed indenter 604 when at least a part of the indenter barrel 605 is positioned in the housing channel 704.

The foot housing 600 can have a first annular border 710 extending orthogonally from the foot base 700 and partially into the housing channel 704. The first annular border 710 can be a substantially circular border surrounding a center point of the foot housing 600. The first annular border 710 can extend out or be a contiguous portion of the foot base 700. The foot housing 600 can also have a second annular border 712 extending orthogonally from the foot base 700 and partially into the housing channel 704. The second annular border 712 can encircle and be substantially concentric with the first annular border 710. The second annular border 712 can be a contiguous portion of the foot base 700.

The first annular border 710 and the second annular border 712 can define a pin receiving space 714 for the thread pin 606. The pin receiving space 714 can be an annular depression or void in between the first annular border 710 and the second annular border 712 for holding or constricting the thread pin 606.

The foot housing 600 can include one or more housing buttresses 708 configured to support the housing channel wall 706. The housing buttresses 708 can be vertical supports extending orthogonally from the foot base 700. The housing buttresses 708 can be configured to support or reinforce the radial strength or integrity of the housing channel wall 706. Each of the housing buttresses 708 can be coupled to the housing channel wall 706 at one end and the housing wall 702 at the other end. The housing buttresses 708 can be inclined or sloped with respect to the foot base 700. For example, each of the housing buttresses 708 can be a substantially triangular panel orthogonal to the foot base 700 and coupled to the housing channel wall 706 at one end and the housing wall 702 at the other end.

The foot housing 600 can be composed of or comprise ABS, PLA, polycarbonate, PP, or a combination thereof. The foot housing 600 can be composed of a material with a Shore D hardness of between 90 and 100. The foot housing 600 can be manufactured as one molded piece or assembled from separate parts or components.

Figure 8:
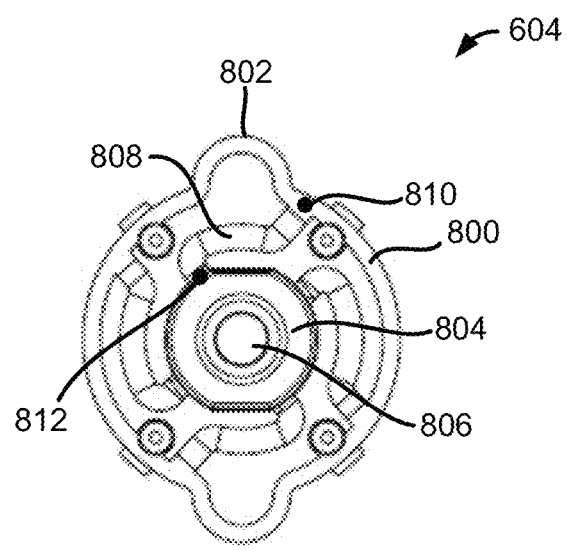
FIG. 8 illustrates a webbed indenter of a foot assembly.

FIG. 8 illustrates that the webbed indenter 604 can include an outer rim 800 coupled to a barrel wall 804 of the indenter barrel 605 by one or more sigmoid shaped arms 808. The barrel wall 804 can surround or define a pin channel 806 within the indenter barrel 605. For example, the pin channel 806 can be a cavity or hollow located substantially in the center of the indenter barrel 605. The webbed indenter 604 can be coupled to the weight sensor 202 via the outer rim 800. The webbed indenter 604 can be coupled to the weight sensor 202 via screws, clips, pins, adhesives, interference fits, or a combination thereof.

The outer rim 800 can also include one or more parabolic segments 802. The one or more parabolic segments 804 can refer to portions of the outer rim 800 that curve out or extend beyond the outer rim 800 in a parabolic shape. For example, the outer rim 800 can have two parabolic segments 802 located diametrically opposed to one another. The parabolic segments 802 can constrain the lateral movement or rotational twisting of the webbed indenter 604 when the foot assembly 204 is in the assembled state 1100. The outer rim 800 can have a diameter of between 30.0 mm to 40.0 mm along a segment of the outer rim 800 other than the parabolic segments 802. For example, the outer rim 800 can have a diameter of approximately 36.92 mm along any segment of the outer rim 800 other than the parabolic segments 802. The outer rim 800 can have a diameter of between 40.0 mm to 50.0 mm when measured from one apex or peak of a parabolic segment 802 to another apex or peak of a diametrically opposed parabolic segment 802. For example, the outer rim 800 can have a diameter of approximately 47.37 mm when measured from one apex or peak of a parabolic segment 802 to another apex or peak of a diametrically opposed parabolic segment 802.

The indenter barrel 605 can have a height of between 10.0 mm to 15.0 mm. For example, the indenter barrel 605 can be a substantially cylindrical structure with a height of approximately 14.05 mm. The indenter barrel 605 can be positioned inside the housing channel 704 when the foot assembly 204 is in the assembled state 1100.

The pin channel 806 can house or contain the thread pin 606. The pin channel 806, the indenter barrel 605, or a combination thereof can prevent the lateral displacement of the thread pin 606. The pin channel 806, the thread pin 606, or a combination thereof can translate or apply a force to the weight sensor 202.

The indenter barrel 605 can be coupled or connected to the outer rim 800 by one or more sigmoid shaped arms 808. The sigmoid shaped arm 808 can be curved segments connecting the outer rim 800 with the barrel wall 804. The sigmoid shaped arms 808 can be S-shaped arms. The sigmoid shaped arms 808 can have at least two protuberances or two local minima/maxima along a length of the sigmoid shaped arm 808. The sigmoid shaped arms 808 can create a web-like structure connecting the outer rim 800 with the barrel wall 804. In some variations, the webbed indenter 604 can have three sigmoid shaped arms 808, four sigmoid shaped arms 808, or five sigmoid shaped arms 808. In other variations, the webbed indenter 604 can have six or more sigmoid shaped arms 808.

FIG. 8 illustrates that each of the sigmoid shaped arms 808 can be connected or coupled to the outer rim 800 at a rim location 810 and connected coupled to the barrel wall 804 at a barrel location 812. The rim location 810 can be radially offset from the barrel location 812. The rim location 810 can be radially offset from the barrel location 812 when a line connecting the rim location 810 and the barrel location 812 does not intersect a center-point or mid-point of the pin channel 806. When the webbed indenter 604 has multiple sigmoid shaped arms 808, each of the sigmoid shaped arms 808 can be connected to the outer rim 800 at a different rim location 810 and each of the sigmoid shaped arms 808 can also be connected to the barrel wall 804 at a different barrel location 812.

The webbed indenter 604 can translate a force, including a compressive force, a bending force, a shear force, or a combination thereof to the weight sensor 202. For example, the webbed indenter 604 can translate a normal force exerted by a tabletop or countertop on which the weighing device 100 is placed through the rest of the foot assembly 204 to the weight sensor 202. The sigmoid shaped arms 808 of the webbed indenter 604 can reduce the lateral or rotational movement or motion of the indenter barrel 605 and facilitate the longitudinal (upward or downward) movement of the indenter barrel 605. The sigmoid shaped arms 808 of the webbed indenter 604 can also absorb small lateral or rotational forces exerted on the indenter barrel 605 by the rest of the foot assembly 204 when the load 300 is in motion on the placement side 104.

The webbed indenter 604 can be composed of or comprise ABS, PLA, polycarbonate, PP, or a combination thereof. The webbed indenter 604 can be composed of a material with a Shore D hardness of between 90 and 100. The webbed indenter 604 can be manufactured as one molded piece or assembled from separate parts or components.

Figure 9:
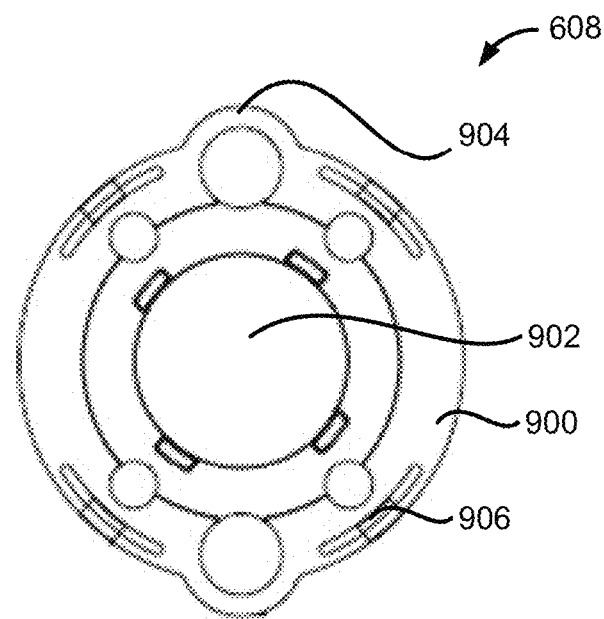
FIG. 9 illustrates a foot limiter of a foot assembly.

FIG. 9 illustrates that the foot limiter 608 can include a limiter body 900 defining a limiter channel 902, one or more parabolic protuberances 904, one or more grasping arms 906, or a combination thereof. The foot limiter 608 can be positioned in between the webbed indenter 604 and the foot housing 600 when the foot assembly 204 is in the assembled state 1100. The foot limiter 608 can dampen or reduce the impact or the force exerted on the weight sensor 202, the webbed indenter 604, or a combination thereof by or through the foot housing 600. For example, the foot limiter 608 can dampen or reduce a normal force exerted by a tabletop or countertop on which the weighing device 100 is placed through the foot housing 600 to the webbed indenter 604, the weight sensor 202, or a combination thereof.

The limiter body 900 can be a substantially annular-shaped disc. The limiter body 900 can have a height dimension of between 1.00 mm and 3.50 mm. The limiter body 900 can surround or define a limiter channel 902. The limiter channel 902 can be sized to fit, encircle, circumscribe, or surround the indenter barrel 605. The limiter channel 902 can surround or circumscribe a cross-sectional segment of the indenter barrel 605 when the foot assembly 204 is in the assembled state 1100. The limiter channel 902 can be a cavity or hollow located substantially in the center of the limiter body 900. The limiter body 900 can also be shaped as a rectangle, oval, triangle or other polygon, or a combination thereof.

The limiter body 900 can also include one or more parabolic protuberances 904. The one or more parabolic protuberances 904 can refer to portions of the limiter body 900 that curve out or extend beyond the circular perimeter of the limiter body 900 in a parabolic shape. For example, the limiter body 900 can have two parabolic protuberances 904 located diametrically opposed to one another. The parabolic protuberances 904 can restrict or constrain the lateral movement or rotational twisting of the foot limiter 608 when the foot assembly 204 is in the assembled state 1100. The limiter body 900 can have a diameter of between 35.0 mm to 45.0 mm along a segment of the limiter body 900 other than at the parabolic protuberances 904. For example, the limiter body 900 can have a diameter of approximately 41.34 mm along any segment of the limiter body 900 other than along the parabolic protuberances 904. The limiter body 900 can have a diameter of between 40.0 mm to 50.0 mm when measured from one apex or peak of a parabolic protuberance 904 to another apex or peak of a diametrically opposed parabolic protuberance 904. For example, the limiter body 900 can have a diameter of approximately 47.45 mm when measured from one apex or peak of a parabolic protuberance 904 to another apex or peak of a diametrically opposed parabolic protuberance 904.

The foot limiter 608 can be coupled to the webbed indenter 604 by the one or more grasping arms 906. The grasping arms 906 can be structures extending out of the limiter body 900 configured to couple or attach the foot limiter 608 to the webbed indenter 604. For example, the grasping arms 90 can include hooks, clips, snaps, or a combination thereof for grasping on to the outer rim 800 of the webbed indenter 604. The grasping arms 906 can be arranged around the perimeter of the limiter body 900. The foot limiter 608 can include three, four, five, or more grasping arms 906. The grasping arms 906 can have a height dimension between 1.00 mm to 2.50 mm. The foot limiter 608 can have a combined height of approximately 4.33 mm when measured from the base of the limiter body 900 to the tip of the grasping arms 906.

The foot limiter 608 can be composed of or comprise ABS, PLA, polycarbonate, PP, or a combination thereof. The foot limiter 608 can be composed of a material with a Shore D hardness of between 90 and 100. The foot limiter 608 can be manufactured as one molded piece or assembled from separate parts or components.

Figure 10:
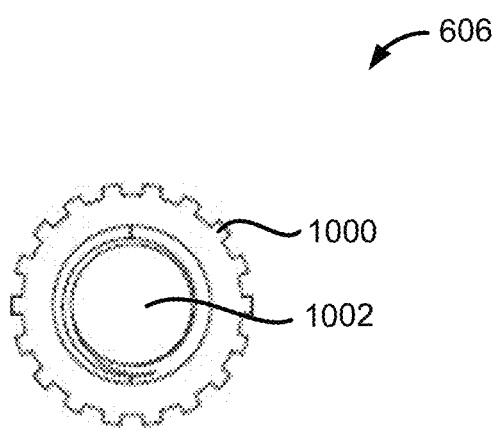
FIG. 10 illustrates a thread pin of a foot assembly.

FIG. 10 illustrates that the thread pin 606 can have a number of threads 1000 or longitudinal ridges circumscribing the perimeter of the thread pin 606. The thread pin 606 can have a diameter between 5.00 mm and 7.00 mm when measured from the top of one thread 1000 to the top of a diametrically opposed thread 1000. For example, the thread pin 606 can have a diameter of approximately 6.58 mm when measured from the top of one thread 1000 to the top of a diametrically opposed thread 1000. The thread pin 606 can also have a height dimension of between 7.00 mm and 9.00 mm. For example, the thread pin 606 can have a height dimension of approximately 8.00 mm.

The thread pin 606 can be a substantially cylindrical shaped structure having a hollow core 1002. The thread pin 606 can be positioned in the indenter barrel 605 when the foot assembly 204 is in the assembled state 1100. The thread pin 606 can provide rigidity or structural support for the indenter barrel 605 when the thread pin 606 is positioned in the indenter barrel 605. The threads 1000 of the thread pin 606 can restrict or reduce the rotational movement of the thread pin 606 inside the indenter barrel 605. The thread pin 606 can also impart or exert a force on the weight sensor 202 via the webbed indenter 604, the foot contact disk 610, or a combination thereof. For example, the thread pin 606 can translate or impart at least part of a force exerted by a tabletop or countertop on which the weighing device 100 to the webbed indenter 604, the foot contact disk 610, the weight sensor 202, or a combination thereof.

Figure 11A:
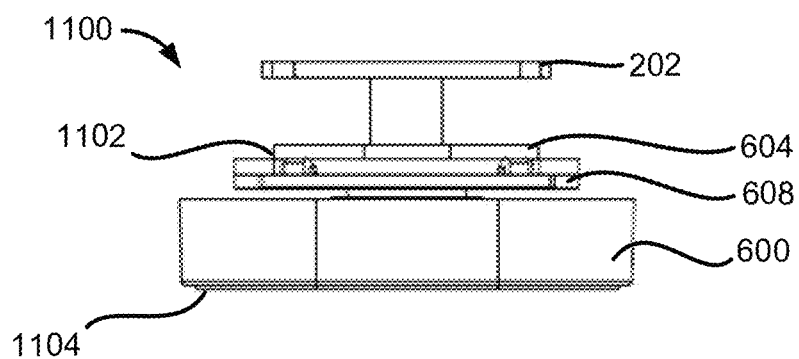
FIG. 11A illustrates a side view of a weight sensor and a foot assembly in an assembled configuration.

FIG. 11A illustrates that the foot assembly 204 can have a first assembly end 1102 and a second assembly end 1104 in the assembled state 1100. The first assembly end 1102 can be an end or portion of the foot assembly 204 coupled directly to the weight sensor 202. For example, the first assembly end 1102 can refer to the end of or the portion of the webbed indenter 604 coupled to the weight sensor 202. The second assembly end 1104 can be an end or portion of the foot assembly 204 distal to the first assembly end 1102 and proximal to the tabletop or countertop on which the weighing device 100 is placed. For example, the second assembly end 1104 can include a portion of the friction pad 602, the contact surface end 603 of the foot housing 600, or a combination thereof.

The first assembly end 1102 can be within or covered by the enclosure or device casing 102 when the foot assembly 204 is in the assembled state 1100 and coupled to the rest of the weighing device 100. For example, the first assembly end 1102 can be within the enclosure or device casing 102 when the foot assembly 204 is in the assembled state 1100 and coupled to the underside of the enclosure or device casing 102 via the weight sensor 202 and the sensor mount 400.

The second assembly end 1104 can extend beyond the enclosure or device casing 102 when the foot assembly 204 is in the assembled state 1100 and coupled to the rest of the weighing device 100. The second assembly end 1104 can extend beyond the enclosure or device casing 102 when the foot assembly 204 is in the assembled state 1100 and coupled to the underside of the enclosure or device casing 102 via the weight sensor 202 and the sensor mount 400. The second assembly end 1104 can extend beyond the enclosure or device casing 102 when the second assembly end 1104 emerges out of the foot opening 208 and past the device base 206.

Figure 11B:
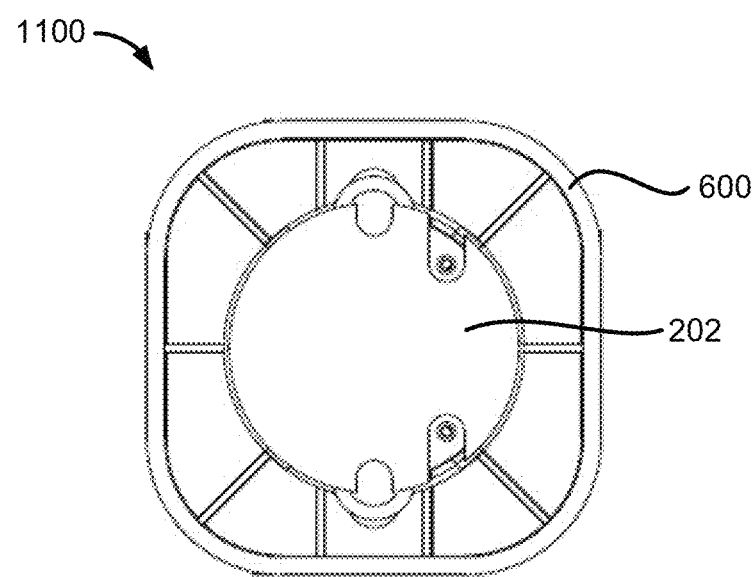
FIG. 11B illustrates a top plan view of a weight sensor and a foot assembly in an assembled configuration.

FIG. 11B illustrates that the foot housing 600 of the foot assembly 204 can be the widest segment or cross-section of the foot assembly 204. For example, when the foot housing 600 is substantially a square, the length dimension of a side of the foot housing 600 can be greater than the diameter of the outer rim 800 of the webbed indenter 604, the diameter of the limiter body 900 of the foot limiter 608, or a combination thereof.

The second assembly end 1104 of the foot assembly 204 can be directly placed on a tabletop, countertop, floor surface, or any other planar or leveled surface. The first assembly end 1102 of the foot assembly 204 can be coupled to or contact a part of the weight sensor 202 such as a beam or arm of a load cell.

The foot assembly 204, or a portion therein, can swivel, actuate radially, or otherwise be freely moveable when the first assembly end 1102 of the foot assembly 204 is coupled or attached to the weight sensor 202. For example, the foot housing 600 can swivel, actuate radially, or otherwise be freely moveable relative to the weight sensor 202, the sensor mount 400, or a combination thereof when the foot assembly 204 is coupled to the underside 200 of the enclosure or device casing 102 via the weight sensor 202. The foot housing 600 can swivel, actuate radially, or otherwise be freely movable within the foot opening 208. The foot housing 600 can have its motion limited or constrained by the device base 206 bordering the foot opening 208.

Figure 12A:
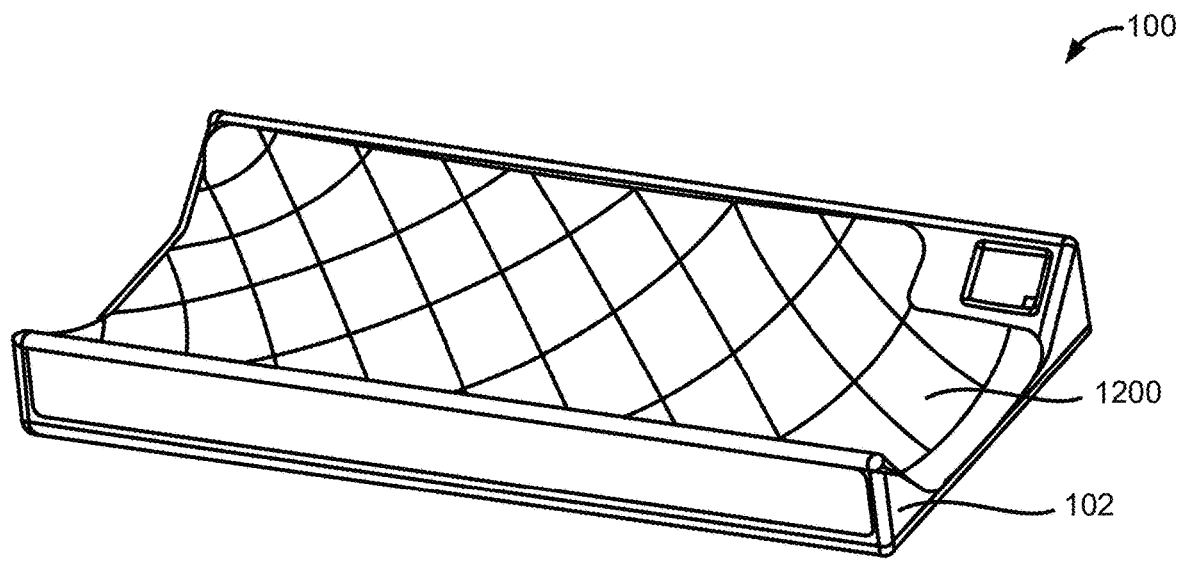
FIG. 12A illustrates a variation of a weighing device with a cushioning layer.

FIG. 12A illustrates that the weighing device 100 can have a cushioning layer 1200. The cushioning layer 1200 can be removably coupled or secured to the placement side 104 of the enclosure or device casing 102. The cushioning layer 1200 can be removably coupled or secured to the placement side 104 via the cushion securement members 118 (see FIG. 1A). The cushion securement members 118 can include hook-and-loop fasteners such as Velcro® fasteners, magnets, clip fasteners, snap fasteners, adhesives, or a combination thereof. For example, when the cushion securement members 118 include magnets, the cushioning layer 1200 can include reciprocating magnetic components integrated within or attached to a surface of the cushioning layer 1200.

Figure 12B:
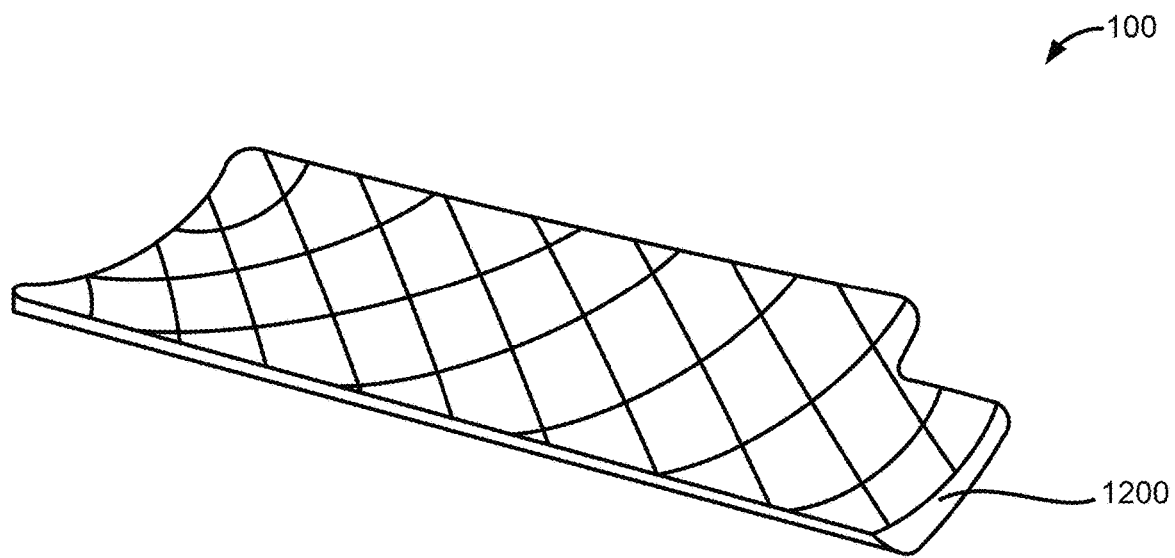
FIG. 12B illustrates a variation of the cushioning layer of FIG. 12A.

FIG. 12B illustrates that the cushioning layer 1200 can include a fabric topper, a rubber topper, a polymer topper, or a combination thereof removably coupled or secured to the placement side 104. For example, the cushioning layer 1200 can include a quilted fabric topper, a synthetic rubber topper, or a combination thereof. The weighing device 100 can weigh the load 300 when the load 300 is placed on the cushioning layer 1200 covering the entirety or a portion of the placement side 104 of the enclosure or device casing 102. In other variations, the cushioning layer 1200 can be integrated with the placement side 104 of the enclosure or device casing 102 and can serve as part of the enclosure or device casing 102.

The cushioning layer 1200 can have a thickness or height dimension of between 5.00 mm and 100.0 mm. For example, the cushioning layer 1200 can have a thickness or height dimension of between 5.00 mm and 10.0 mm. In other variations, the cushioning layer 1200 can have a thickness or height dimension of between 10.0 mm and 100.0 mm.

Figure 13A:
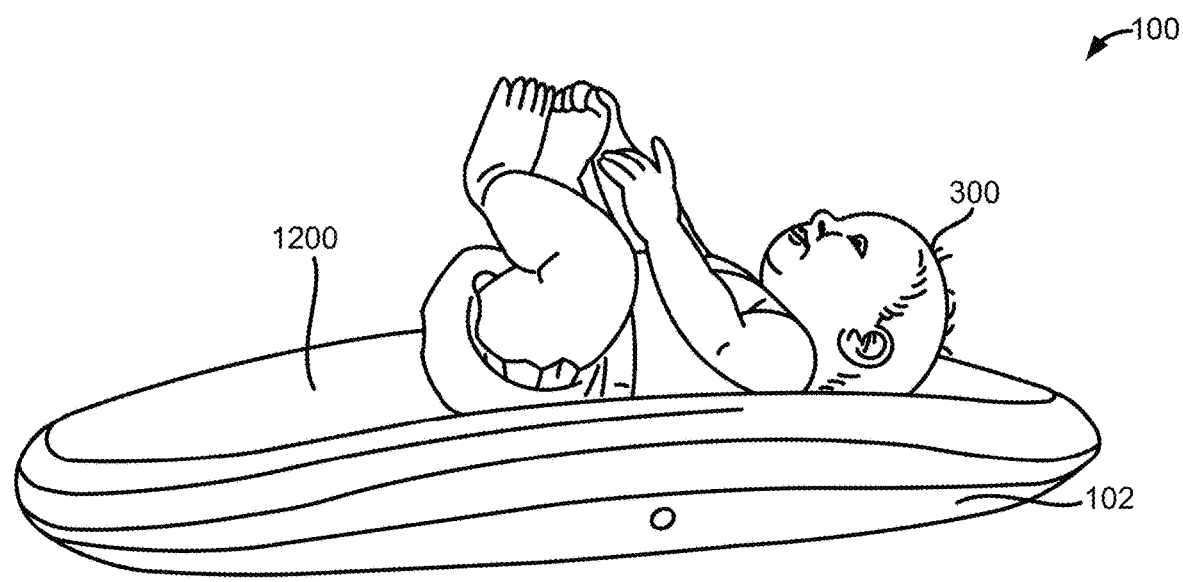
FIG. 13A illustrates a variation of a weighing device with an integrated cushioning layer.

FIG. 13A illustrates that the weighing device 100 can have a cushioning layer 1200 fixedly attached or coupled to the enclosure or device casing 102. In this variation, the cushioning layer 1200 can cover or be fixedly attached to the placement side 104 of the enclosure or device casing 102 including the retaining walls 106 and the receiving surface 108.

The cushioning layer 1200 can include or be composed of fabric, rubber, synthetic rubber, or a combination thereof. When the load 300 is an infant, the infant can be placed directly on the cushioning layer 1200 without an additional fabric cover or topper.

FIG. 13A illustrates that the weighing device 100 can include rounded or curved retaining walls 106. The weighing device 100 can also have retaining walls 106 shaped as half ellipsoids. The placement side 104 or a portion therein can be shaped as an elongate paraboloid, a hyperbolic paraboloid, an elliptical paraboloid, or a combination thereof. The placement side 104 or a portion therein can also have a lingulate receiving surface or a tongue-shaped receiving surface.

Figure 13B:
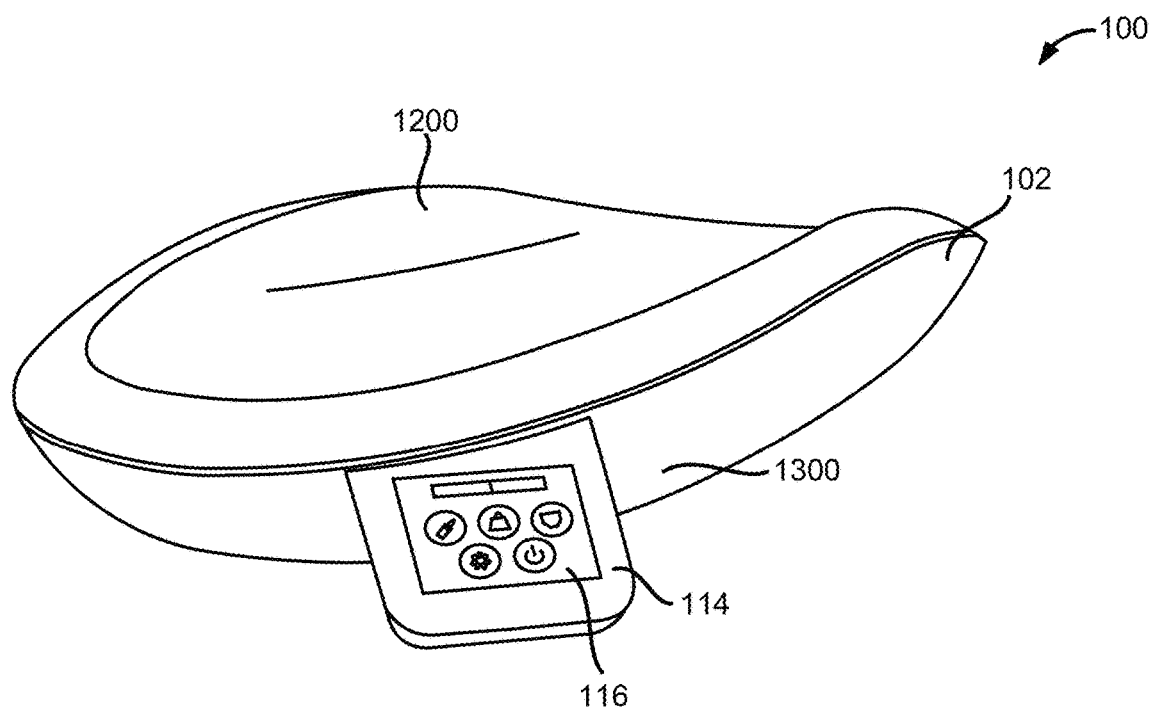
FIG. 13B illustrates a variation of a weighing device with a display coupled to an exterior surface of the weighing device.

FIG. 13B illustrates that the weighing device 100 can include a display component 116 attached to the exterior surface 1300 of the enclosure or device casing 102. The weighing device 100 can include a display component 116 fixedly attached to the exterior surface 1300 of the enclosure or device casing 102. For example, the display component 116 can be fixedly attached to the exterior surface 1300 of the enclosure or casing side wall 110, the enclosure or casing end wall 112, or a combination thereof. In one variation, the display window 114 can extend out of or be contiguous with the exterior surface 1300 of the enclosure or device casing 102.

FIG. 13B illustrates that a portion of the display window 114 can be coupled or fixedly attached to the exterior surface 1300 of the enclosure or device casing 102. For example, only one side of the display window 114 or a frame encompassing the display component 116 can be fixedly attached to the exterior surface 1300 of the enclosure or device casing 102.

In other variations, the display window 114 and the display component 116 can be removably coupled or attached to the enclosure or device casing 102. The display window 114 and the display component 116 can be removably coupled or attached to the enclosure or device casing 102 via adhesives, fasteners, screws, clips, snaps, magnetic components, or a combination thereof.

The weighing device 100 of FIG. 13A or FIG. 13B can include the same weight sensors 202 as those depicted in FIGS. 2A, 6, and 11A-11B. The weighing device 100 of FIG. 13A or FIG. 13B can include the same feet assembly 204, the same sensor mounts 400, or a combination thereof arranged or positioned in substantially the same manner as those depicted in FIGS. 2A, 3A, 3C, 3E, 4, 5A-5B, 6-10, and 11A-11B.

Figure 13C:
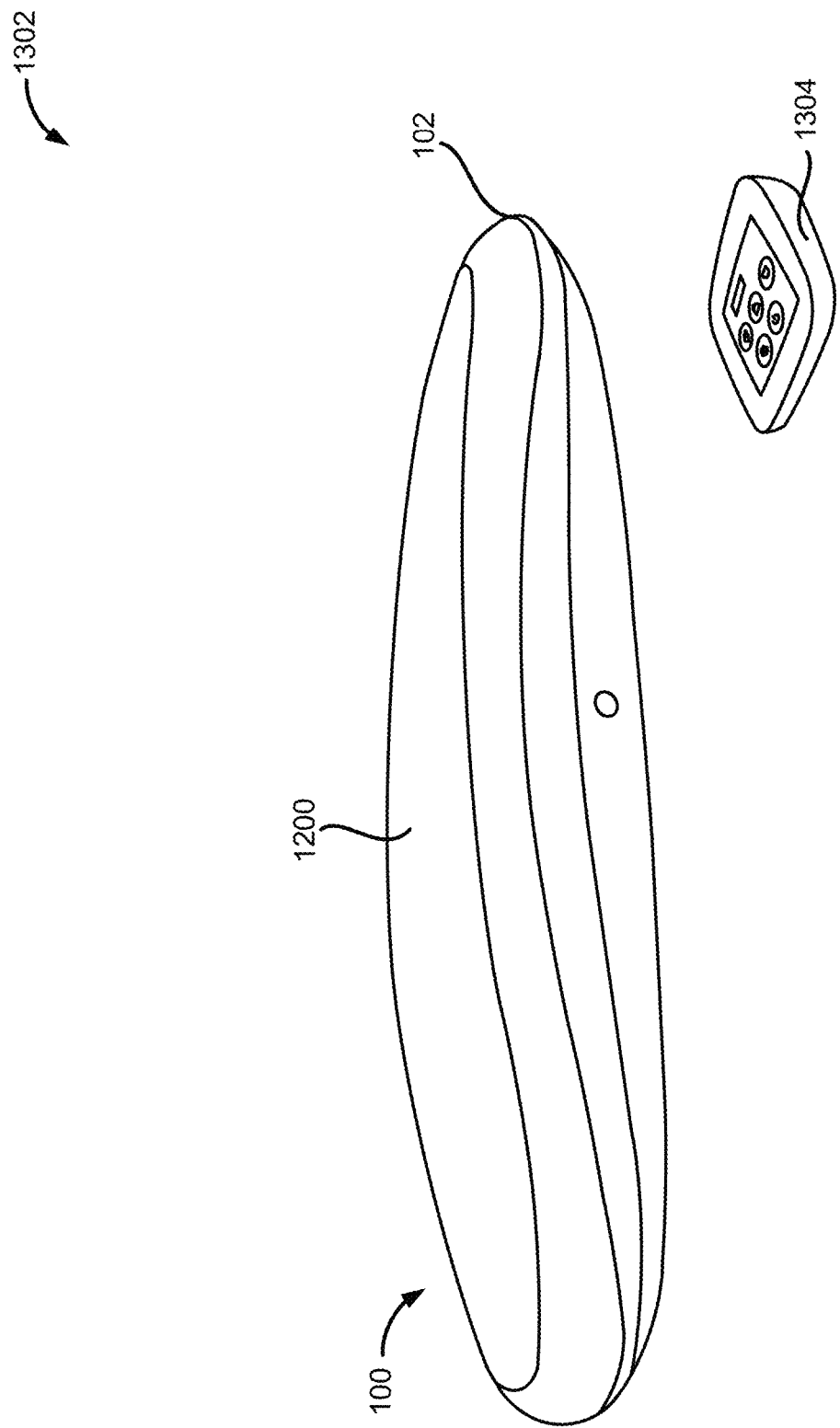
FIG. 13C illustrates a weighing system with a weighing device and a separate console.

FIG. 13C illustrates that a weighing system 1302 can include a weighing device 100 and a console 1304. The weighing system 1302 can include a weighing device 100 without a display component 116 coupled to the device casing 102.

The console 1402 can be a standalone device separate from the weighing device 100. The console 1402 can communicate with the weighing device 100 via Bluetooth®, WiFi, or other wireless communication protocols. In one variation, the console 1402 can be or include the portable device 2012 of FIG. 20B. In this and other variations, the console 1402 can communicate with a server, such as the server 2002 of FIG. 20A, other portable devices 2012, or a combination thereof.

Figure 20B:
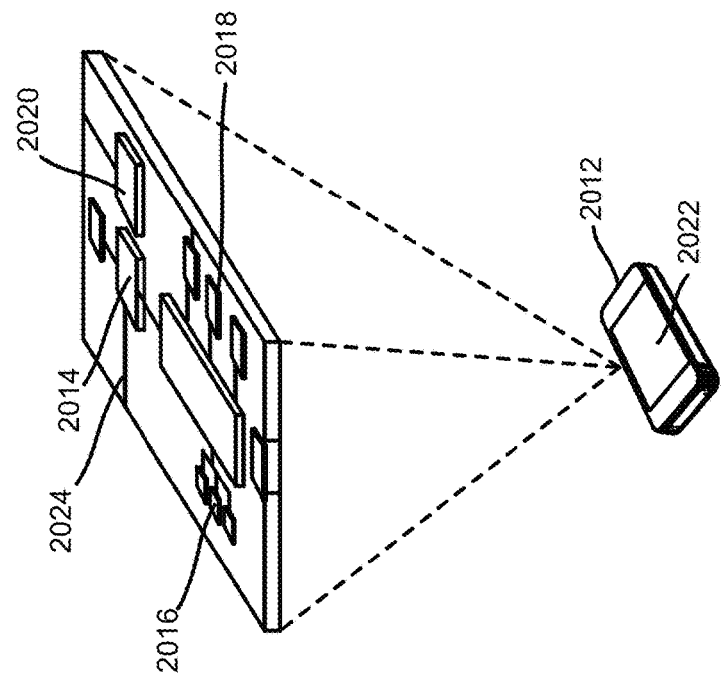
FIG. 20B illustrates a variation of a mobile device of the weighing system.

The console 1402 can include a communication unit such as the communication unit 2018 of FIG. 20B, a processor such as the processor 2014 of FIG. 20B, a memory device such as the memory 2016 of FIG. 20B, a display component such as the display 2022 of FIG. 20B, a power supply, or a combination thereof.

Figure 18:
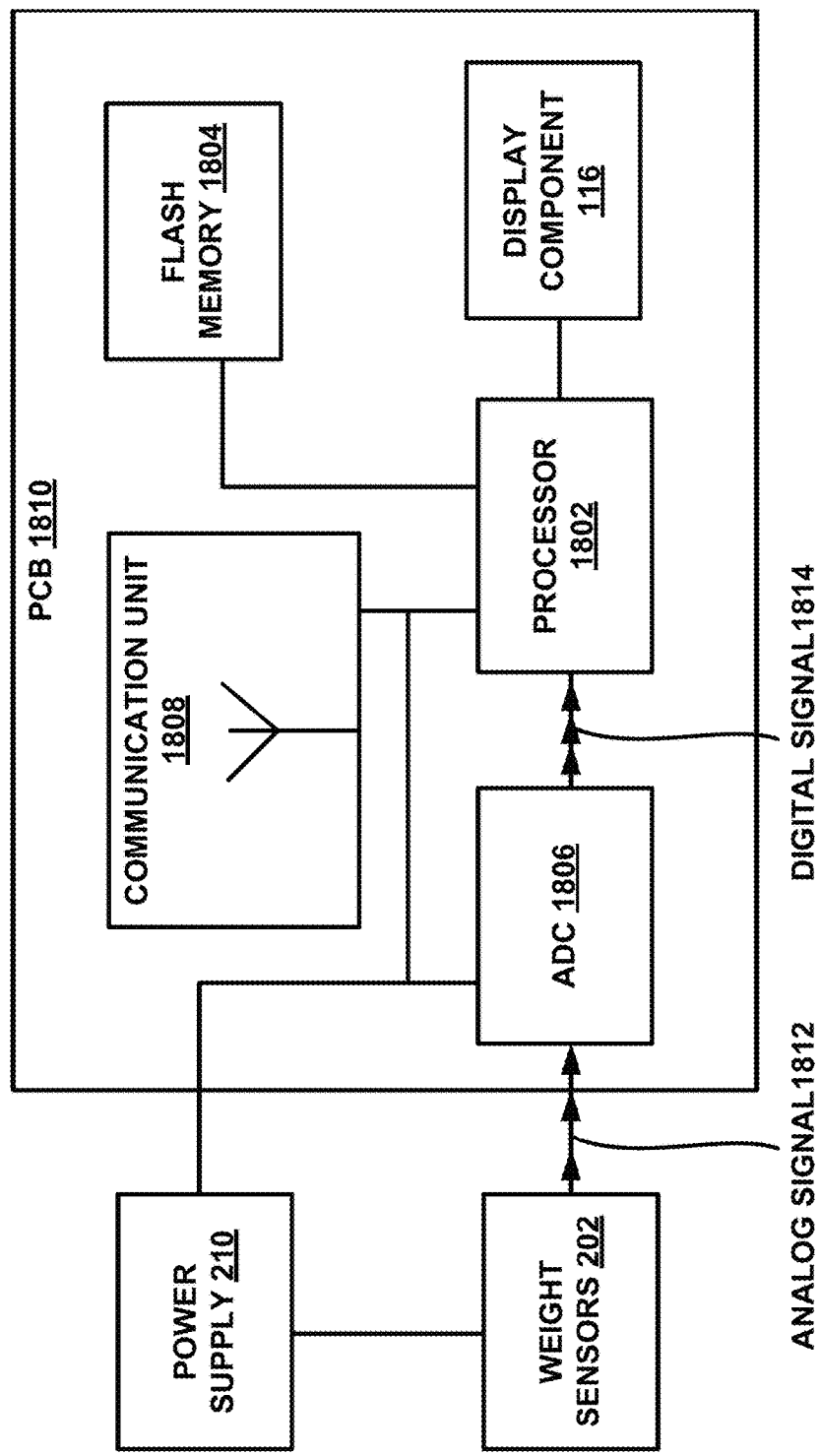
FIG. 18 illustrates a schematic of an electronic component of the weighing device.

In one variation, the weighing device 100 of the weighing system 1302 can include certain of the electronic components depicted in FIG. 18 including the power supply 210, the weight sensors 202, the ADC 1806, the processor 1802, the communication unit 1808, or a combination thereof.

The weighing device 100 of the weighing system 1302 can receive a load 300 on the placement side 104 of the enclosure or device casing 102. In response to the load 300 being placed on the placement side 104, the four weight sensors 202 can generate a number of analog signals, such as the analog signals 1812. The ADC of the weighing device 1302, such as the ADC 1806, can then convert the analog signals 1812 received from the weight sensors 202 to one or more digital signals, such as the digital signals 1814. The weighing device 100 can then wirelessly transmit the one or more digital signals 1814 to the console 1402 using the communication unit 1808. In one variation, the communication unit 1808 can include a Bluetooth® transceiver or Bluetooth® module. In this and other variations, the communication unit 1808 can include a WiFi transceiver or WiFi module.

The communication unit of the console 1402, such as the communication unit 2018, can receive the one or more digital signals 1814 from the weighing device 100. The processor of the console 1402, such as the processor 2014, can calculate a weight of the load 300 using the one or more digital signals 1814 received from the weighing device 100. The display component of the console 1402, such as the display 2022, can then display the calculated weight of the load 300. The communication unit 2018 can include a Bluetooth® transceiver or module, a WiFi transceiver or module, a cellular modem, or a combination thereof.

In one variation, the console 1402 can transmit data concerning the weight of the load 300 to the server 2002. In this and other variations, the console 1402 can also transmit data concerning the weight of the load 300 to another portable device 2012.

Figure 14A:
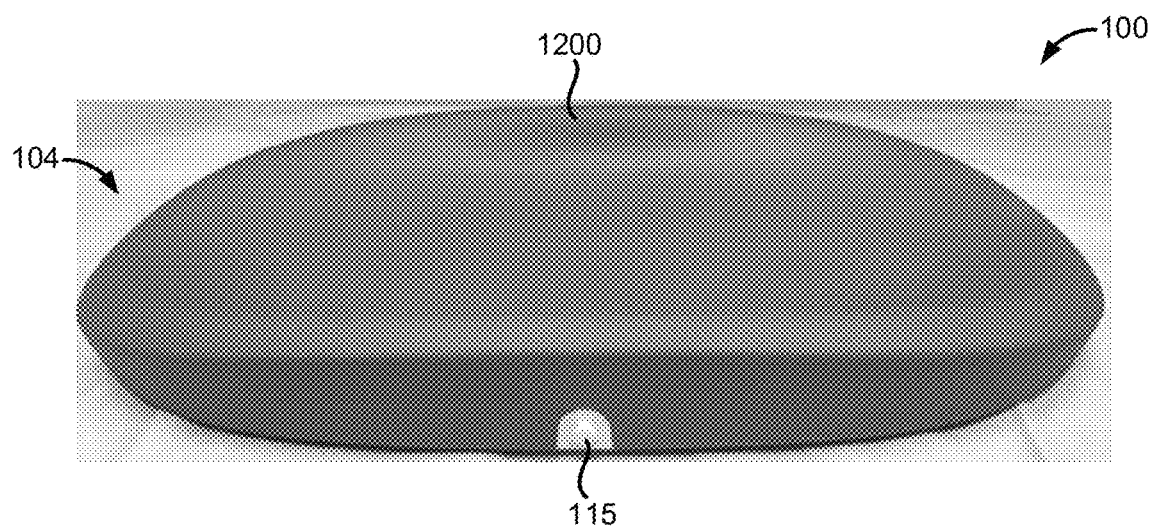
FIG. 14A is a black-and-white image of a variation of a weighing device with an integrated cushioning layer.

FIG. 14A illustrates that a cushioning layer 1200 can encase or cover the entire placement side 104 of a device casing 102. For example, the cushioning layer 1200 can cover the entire placement side 104 of the device casing 102 depicted in FIGS. 1B, 2B, 2C, 3D, and 3F.

As seen in FIG. 14A, the cushioning layer 1200 can cover the two retaining walls 106 and the receiving surface 108. In addition, the cushioning layer 1200 can cover the casing end walls 112 and at least part of the casing side walls 110 such that only the safety strap connectors 115 are exposed.

The cushioning layer 1200 can comprise or be composed of a foam material. For example, the foam material can comprise polyurethane foam or other polymer foams. In other variations, the cushioning layer 1200 can comprise synthetic rubber, natural rubber, or a combination thereof. In some variations, the cushioning layer 1200 can have a thickness between approximately 10.0 mm and 30.0 mm. The cushioning layer 1200 can be secured or otherwise coupled to the device casing 102 by adhesives.

Figure 14B:
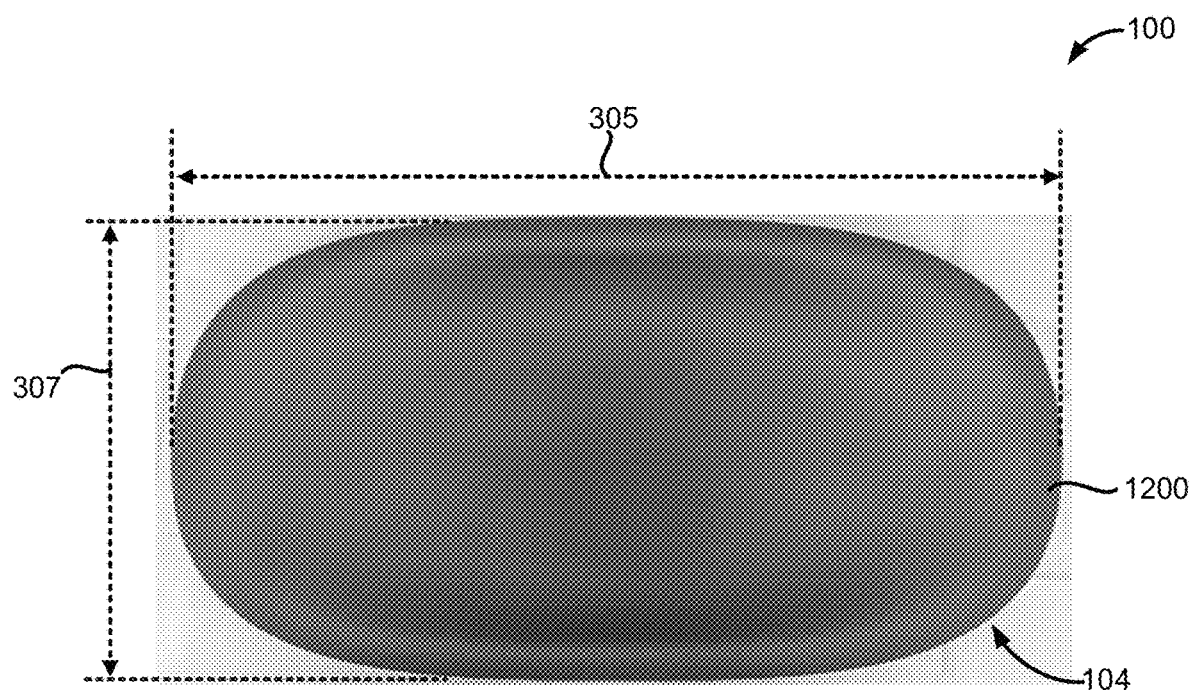
FIG. 14B is a black-and-white image of a top plan view of a weighing device with an integrated cushioning layer.

FIG. 14B illustrates that the weighing device 100 of FIG. 14A can have a length dimension 305 and a width dimension 307. The length dimension 305 can be between approximately 650.0 mm to 800.0 mm. For example, the length dimension 305 can be approximately 740.0 mm. The width dimension 307 can be between approximately 300.0 mm to 450.0 mm. For example, the width dimension 307 can be approximately 390.0 mm. As shown in FIG. 14B, the weighing device 100 can be substantially oval or stadium-shaped when the placement side 104 of the device casing 102 is covered by the cushioning layer 1200.

Figure 14C:
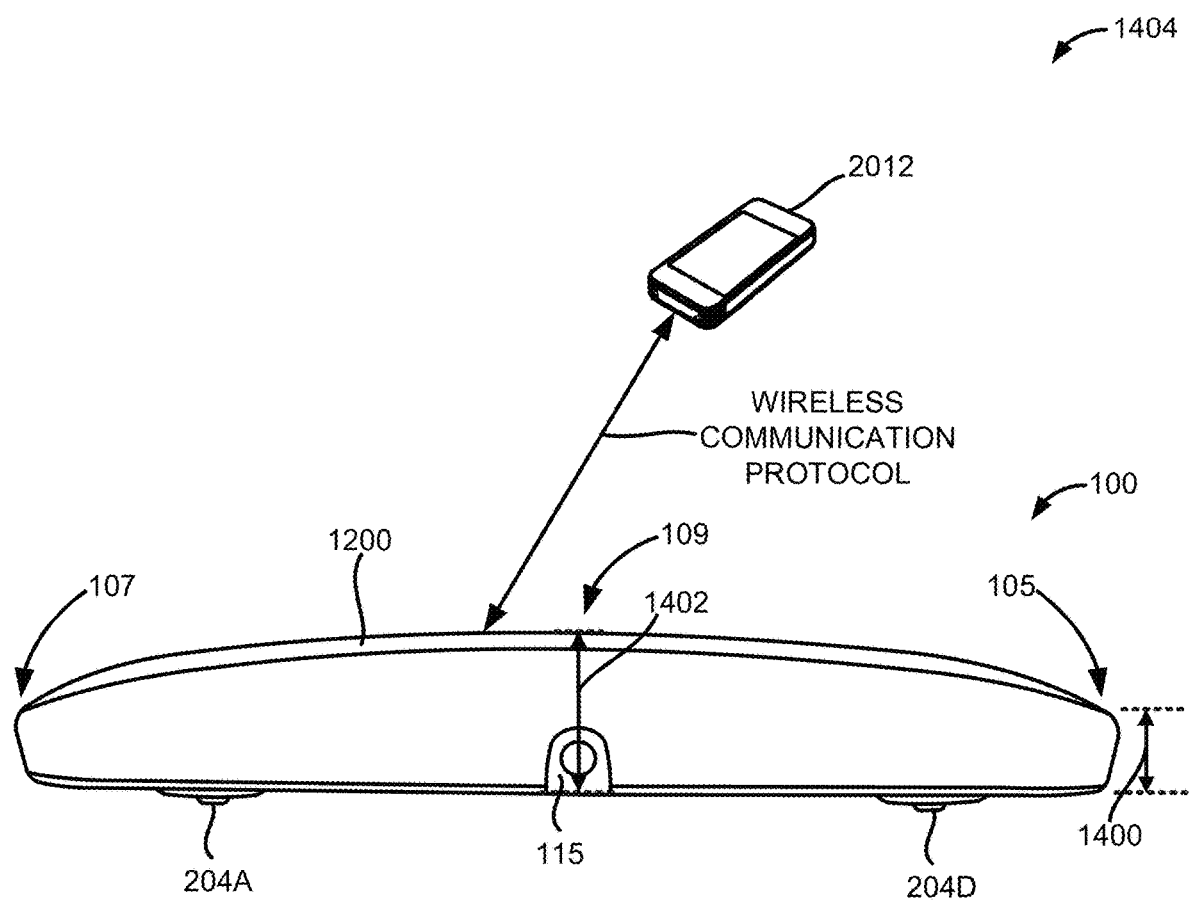
FIG. 14C illustrates a side view of a weighing device with an integrated cushioning layer.

FIG. 14C illustrates that the weighing device 100 of FIGS. 14A and 14B can have a device end height 1400 and a device mid-section height 1402. The device end height 1400 can be a height dimension of the weighing device 100 at the first longitudinal end 105 and the second longitudinal end 107. The device end height 1400 can be between approximately 35.0 mm and 50.0 mm. For example, the device end height 1400 can be approximately 40.0 mm. The device mid-section height 1402 can be a height dimension of the weighing device 100 at a wall mid-portion 109 in between the first longitudinal end 105 and the second longitudinal end 107. The device mid-section height 1402 can be between approximately 80.0 mm and 95.00 mm. For example, the device mid-section height 1402 can be approximately 85.0 mm. As shown in FIG. 14C, the cushioning layer 1200 can conform to the arched shape of the retaining walls 106 such that the height of the weighing device 100 can gradually decrease from the wall mid-portion 109 to the first longitudinal end 105 and the second longitudinal end 107.

FIG. 14C also illustrates that a portion of each of the four feet assembly 204 (the first foot assembly 204A and the fourth foot assembly 204D are depicted in FIG. 14C) can extend beyond or past the device casing 102 and the device base 206. For example, the portion of the foot assembly 204 extending beyond or past the device casing 102 can be a portion of the indenter barrel 605 (see FIGS. 6, 14D, and 14E).

FIG. 14C also illustrates that the weighing device 100 can be part of a weighing system 1404 comprising the weighing device 100 and a portable device 2012 such as a smartphone. In other variations, the portable device 2012 can also be a tablet computer, a smartwatch, a laptop computer, or a combination thereof. The weighing device 100 can communicate with the portable device 2012 via Bluetooth® or other wireless communication protocols. The portable device 2012 can also wirelessly communicate with a server, such as the server 2002 of FIG. 20A, or other portable devices 2012.

In some variations, the weighing device 100 can comprise a communication unit 1808 such as a Bluetooth® module or chip, an analog-to-digital converter (ADC) 1806 coupled to the four weight sensors 202, a memory device 1804 configured to store data concerning weight measurements, and a processor 1802 coupled to the memory device 1804, the ADC 1806, and the communication unit 1808 (as shown in FIG. 18). The processor 1802, the memory device 1804, the communication unit 1808, the ADC 1806, or a combination thereof can be coupled to one or more PCBs 1810 housed within the electronics housing 219 (see FIG. 2B). A portable power supply 210 can also be housed within the electronics housing 219.

The weighing device 100 of the weighing system 1404 can receive a load 300 on the placement side 104 of the weighing device 100. For example, the load 300, such as an infant or baby, can be placed supine on the cushioning layer 1200 of the weighing device 100. In response to the load 300 being placed on the placement side 104, the four weight sensors 202 can generate a number of analog signals, such as the analog signals 1812 (see FIG. 18). The ADC of the weighing device 100, such as the ADC 1806, can then convert the analog signals 1812 received from the weight sensors 202 to one or more digital signals such as the digital signals 1814. The processor of the weighing device 100, such as the processor 1802, can then calculate the weight of the load 300 using the one or more digital signals 1814. The communication unit of the weighing device 100, such as the communication unit 1808, can then wirelessly transmit data corresponding to the weight of the load 300 to the portable device 2012.

In other variations, the communication unit 1808 can also transmit data concerning the weight of the load 300 to a server, such as the server 2002, or another computing device.

Figure 14D:
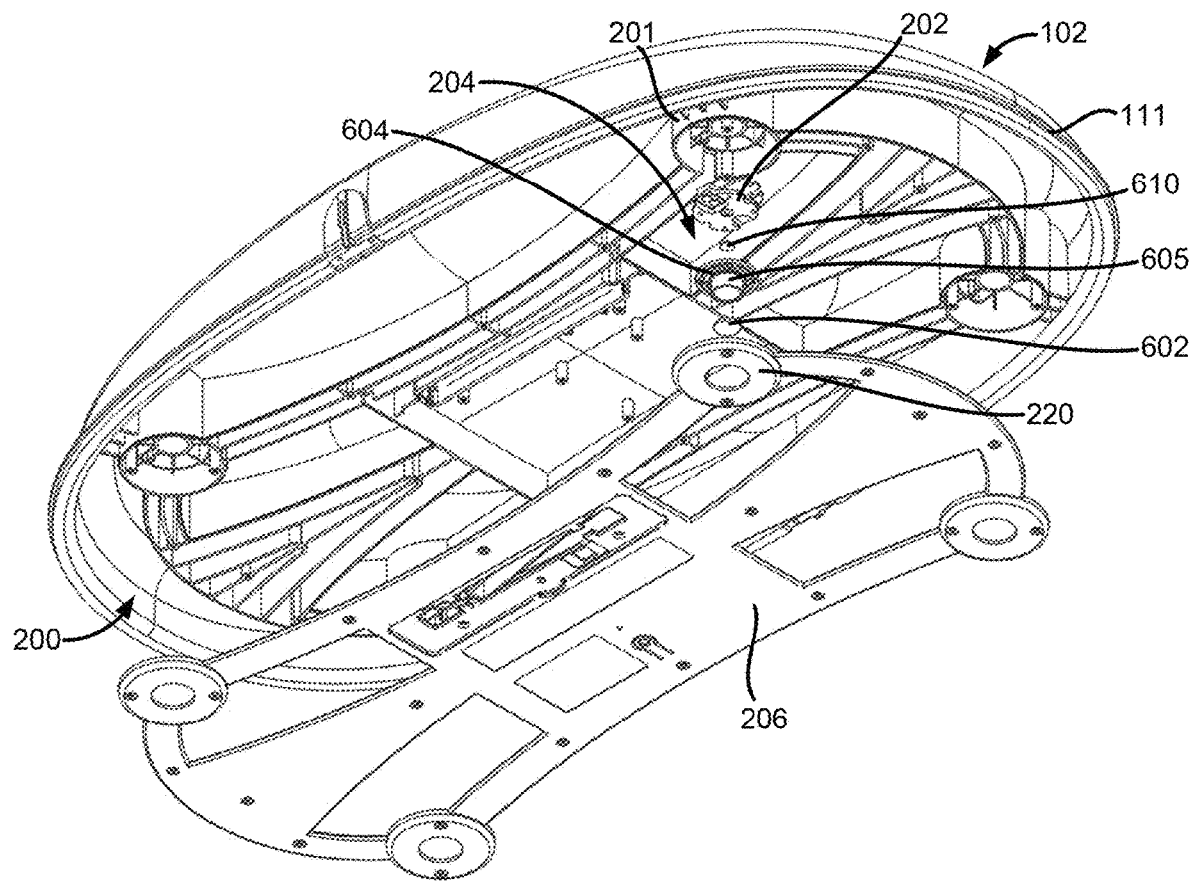
FIG. 14D illustrates an exploded view of a weighing device having a device casing, a weight sensor, a foot assembly, and a device base.
Figure 14E:
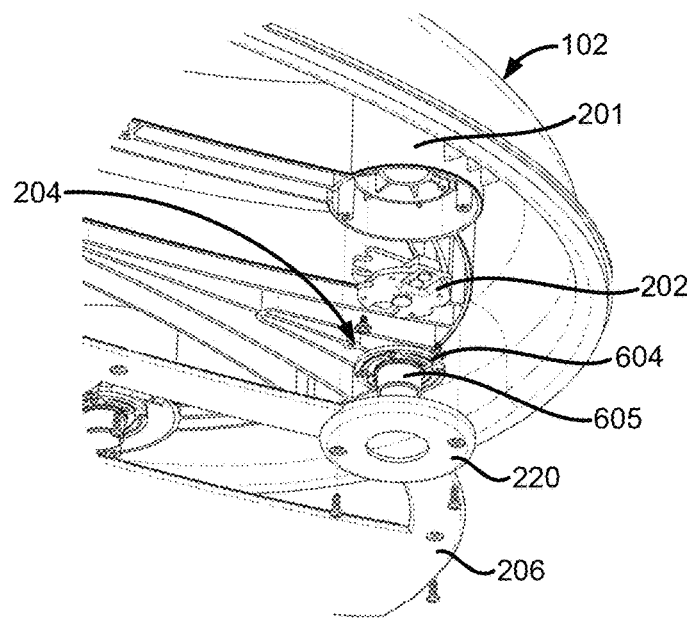
FIG. 14E illustrates a close up of an exploded view of a weighing device having a device casing, a weight sensor, a foot assembly, and a device base.

FIGS. 14D and 14E illustrate that the foot housing structure 201 on the underside 200 of the device casing 102 can house a weight sensor 202 and a foot assembly 204. The device casing 102 depicted in FIGS. 14D and 14E can be the same device casing 102 as those depicted in FIGS. 1B, 2B, 2C, 3D, and 3F. In addition, the device casing 102, the weight sensor 202, and the foot assembly 204 depicted in FIGS. 14D and 14E can make up part of the weighing device shown in FIGS. 14A, 14B, and 14C.

As shown in FIGS. 14D and 14E, the weight sensor 202 and the foot assembly 204 can be mounted or otherwise coupled to the inside of the foot housing structure 201 by screws, adhesives, or interference fittings. The device base 206 can cover part of the underside 200 of the device casing 102 and the annular disks 220 located at the corners of the device base 206 can partially serve as a cap or lid to partially close the opening to the foot housing structure 201. A circular void or opening in the middle of the annular disk 220 can allow a part of the foot assembly 204 to extend beyond the device base 206 and the device casing 102. The annular disk 220 can also limit or restrain a lateral movement of the webbed indenter 604, the weight sensor 202, or a combination thereof relative to the foot housing structure 201.

FIGS. 14D and 14E illustrate that the foot assembly 204 (which can be any of the first foot assembly 204A, the second foot assembly 204B, the third foot assembly 204C, or the fourth foot assembly 204D) can comprise a webbed indenter 604 having an indenter barrel 605, a foot contact disk 610, and a friction pad 602. The foot assembly 204 can also comprise a thread pin (such as the thread pin 606 shown in FIG. 6)

The friction pad 602 can be coupled or affixed to a bottom of the indenter barrel 605. The friction pad 602 can include or be composed of rubber, synthetic rubber, a polymer having a high friction coefficient, or a combination thereof. The friction pad 602 can have a friction inducing pattern such as a waffled pattern, a pock-marked pattern, a grooved pattern, a lined indentation pattern, or a combination thereof. The friction pad 602 can have a thickness or height dimension between 1.00 mm to 2.00 mm. For example, the friction pad 602 can have a thickness or height dimension of approximately 1.50 mm.

The thread pin 606 (not shown in FIGS. 14D and 14E) can be inserted or positioned inside a portion of the webbed indenter 606. The thread pin 606 can be a component of the foot assembly 204 configured to apply a compressive force to a part of the webbed indenter 604, the weight sensor 202, or a combination thereof. The thread pin 606 can be shaped as a cylinder, a prism, a polyhedron, a rectangular cuboid, or a combination thereof. The thread pin 606 can have a hollow core or center.

The foot assembly 204 can also have a foot contact disk 610 positioned or placed in between the webbed indenter 604 and the weight sensor 202. The foot contact disk 610 can dampen or cushion the impact or the force exerted on the weight sensor 202 by the rest of the foot assembly 204 including the webbed indenter 604. The foot contact disk 610 can be shaped as a substantially cylindrical disc. In other variations, the foot contact disk 610 can be shaped as a rectangle or triangle having a height or depth dimension. The foot contact disk 610 can be made of or include a polymer, a fibrous material, a textile such as cotton, or a combination thereof. The foot contact disk 610 can be a cylindrical disc with a diameter between 6.00 mm and 9.00 mm. For example, the foot contact disk 610 can have a diameter of approximately 8.00 mm. The foot contact disk 610 can have a height dimension of between 1.00 mm and 3.00 mm. For example, the foot contact disk 610 can have a height of approximately 2.00 mm.

The weight sensor 202 can comprise or be a half-bridge load cell. In other variations, the weight sensor 202 can comprise or be a quarter-bridge load cell or a full-bridge load cell.

The components of the foot assembly 204 and the manner in which both the weight sensor 202 and the components of the foot assembly 204 are coupled to the device casing 102 via the foot housing structure 201 and the annular disk 220 on the device base 206 allow the weighing device 100 to accurately and precisely measure a non-stationary load 300 that can exhibit motion at both ends of the load 300 (e.g., the head and feet of the infant or toddler).

FIGS. 14A-14E illustrate a variation of the weighing device 100 without an integrated display component 116 or console. When weighing a load, such as an infant or baby, using the weighing device 100 of FIGS. 14A-14E, the interface screens or graphical user interface (GUIs) depicted in FIGS. 22, 23A-23C, 24, 25A-25F, and 26, or variants thereof, can be generated on a screen of a portable device 2012 such as a user's smartphone or tablet computer.

Figure 15:
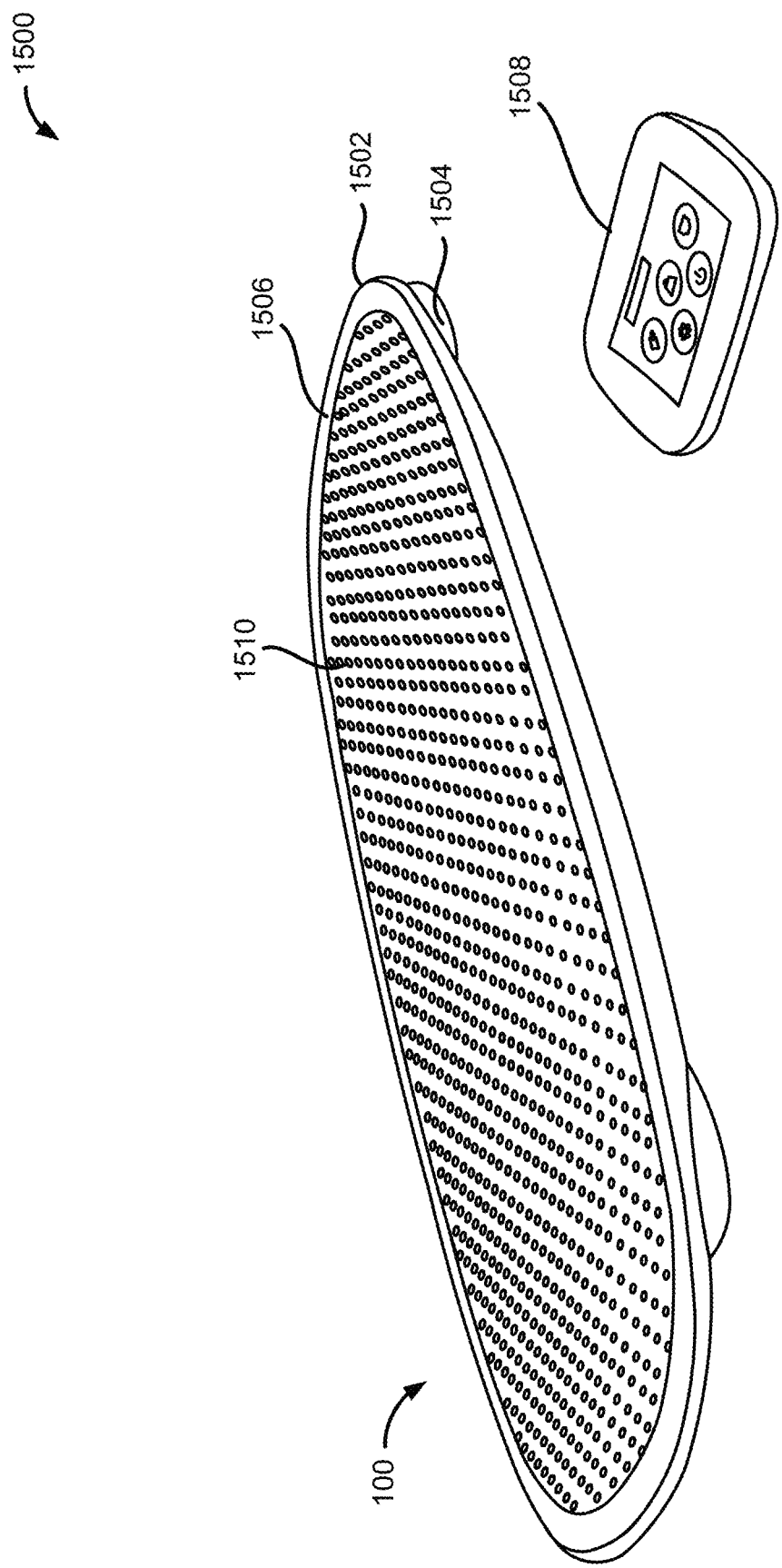
FIG. 15 illustrates a variation of a weighing system with a weighing device and a separate console.

FIG. 15 illustrates that a weighing system 1500 can include another variation of a weighing device 100 with a separate console 1508. The weighing device 100 can include an enclosure or device casing 1502 with a substantially planar placement side 1506. The placement side 1506 of the enclosure or device casing 1502 can include only a planar receiving surface without retaining walls. In other variations, the placement side 1506 can have a concavity or depression and the perimeter of the enclosure or device casing 1502 can serve as retaining walls.

The placement side 1506 can be covered by a gripping surface 1510. The gripping surface 1510 can include coatings, adhesives, or a combination thereof configured to hold or constrict the load 300, a cushioning layer, or a combination thereof. The gripping surface 1510 can also refer to a surface feature of the placement side 1506 such as marks, scores, scratches, bumps, furrows, grooves, or a combination thereof on the placement surface 1506.

The weighing device 100 of the weighing system 1500 can also include one or more feet assembly 1504. For example, the weighing device 100 of FIG. 15 can include four feet assembly 1504. The feet assembly 1504 can be the same feet assembly 204 as those depicted in or described with respect to FIGS. 2, 3A, 3C-3D, 4, 6-10, and 11A-11B. In addition, the weighing device 100 depicted in FIG. 15 can include the same weight sensors 202, the same sensor mounts 400, or a combination thereof depicted in or described with respect to FIGS. 2, 4, 5A-5B, 6, and 11A-11B. For example, the weight sensors 202 can be coupled to the underside of the enclosure or device casing 1502 and each weight sensor 202 can be coupled to a foot assembly 1504. Moreover, each foot assembly 1504 can have a first assembly end proximal to the placement side 1506 and a second assembly end distal to the placement side 1506. The second assembly end of the foot assembly 1504 can extend beyond the enclosure or device casing 1502.

The enclosure or device casing 1502 can be composed of or comprise ABS plastic, PLA, polycarbonate, PP, or a combination thereof. The enclosure or device casing 1502 can be composed of a material with a Shore D hardness of between 90 and 100. The enclosure or device casing 1502 can be manufactured as one molded piece of ABS plastic.

Figure 16A:
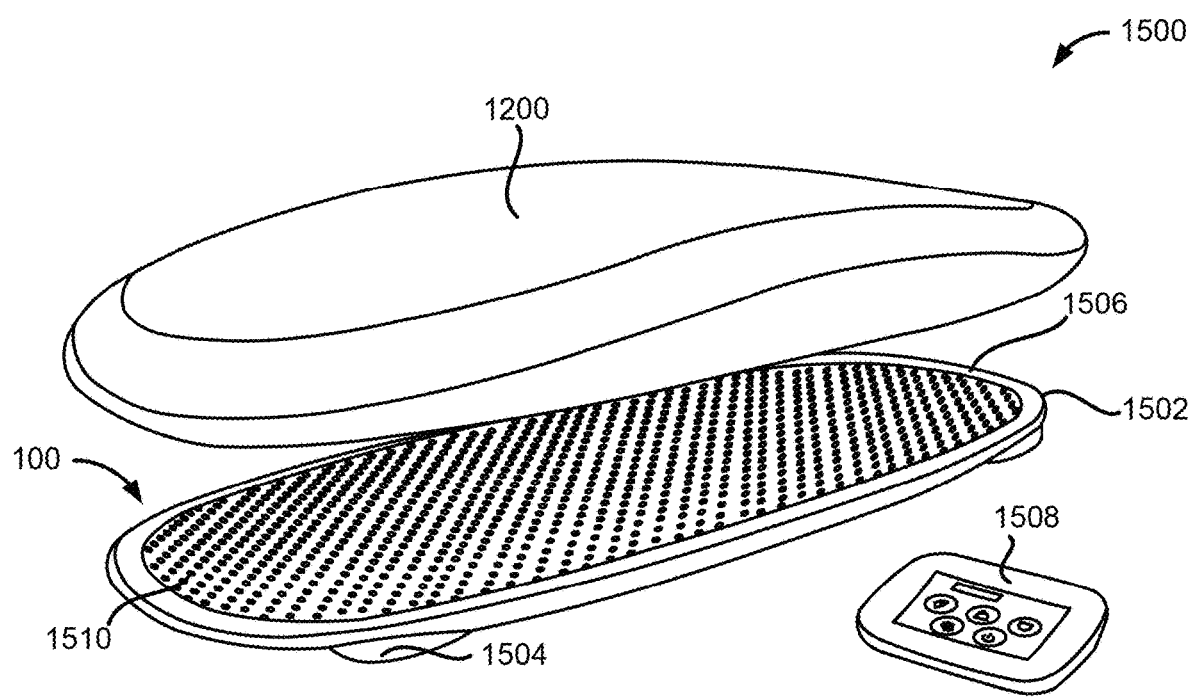
FIG. 16A illustrates a variation of the weighing system of FIG. 15 receiving a separable cushioning layer.
Figure 16B:
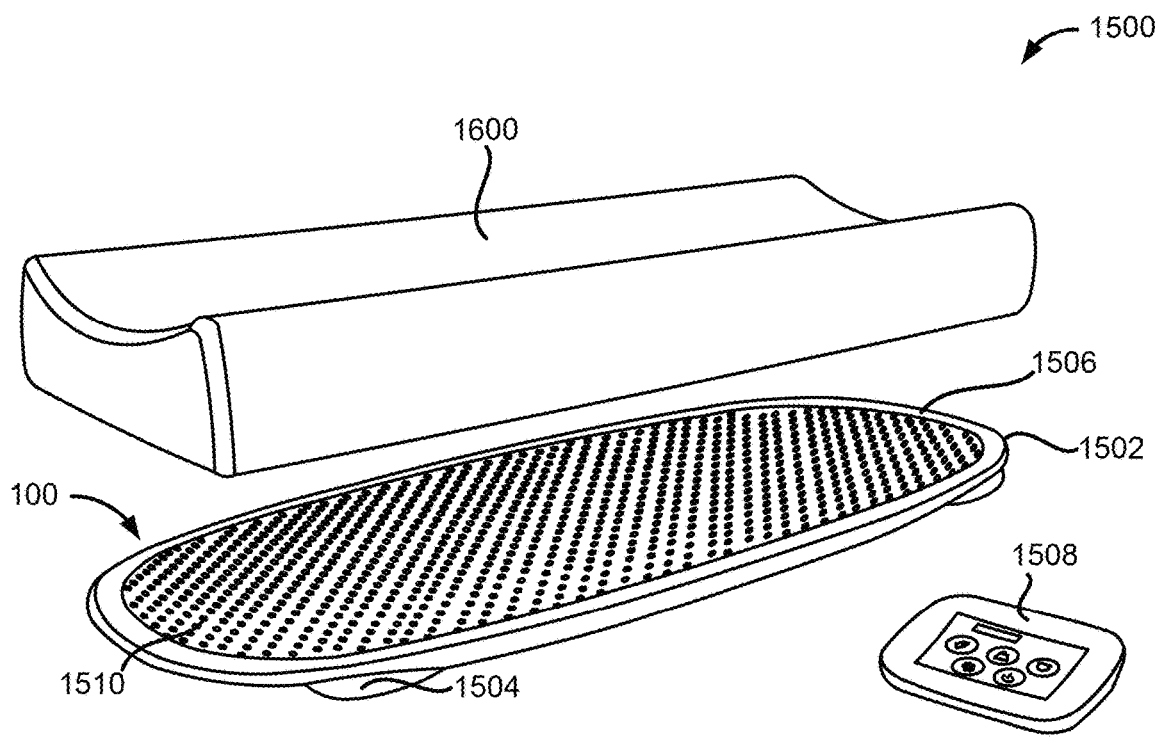
FIG. 16B illustrates a variation of the weighing system of FIG. 15 receiving a changing pad.

The substantially planar placement side 1506 of the weighing device 100 of FIG. 15 can provide the unexpected benefit of making the weighing device 100 compatible with all types of changing pads 1600 (see FIG. 16B) and all dimensions or shapes of cushioning layers 1200 (see FIG. 16A). For example, the substantially planar placement side 1506 of the weighing device 100 of FIG. 15 can support changing pads 1600 or cushioning layers 1200 having a thickness or height dimension of between 5.00 mm and 10.0 mm or in excess of 10.0 mm. Moreover, the arrangement of the four feet assembly 204 of the weighing device 100 of FIG. 15, FIG. 16A, or FIG. 16B can have the same arrangement as that depicted or described with respect to FIG. 3C. The arrangement of the four feet assembly 204 can provide unexpected benefits when the weighing device of FIG. 15, FIG. 16A, or FIG. 16B is used to weigh a load 300 placed on a removable cushioning layer 1200 or changing pad 1600 positioned on the substantially planar placement side 1506.

The console 1508 can be the same console 1402 as depicted in or described with respect to FIG. 13C. The console 1508 can communicate wirelessly with the weighing device 100 via Bluetooth®, WiFi, or other wireless communication protocols.

FIG. 16A illustrates that the placement side 1506 of the weighing device 100 can receive a cushioning layer 1200. The placement side 1506 can be substantially planar. In one variation, the cushioning layer 1200 can be shaped as the cushioning layer 1200 of FIG. 13A. In other variations, the cushioning layer 1200 can be shaped as the cushioning layer 1200 of FIG. 12B. The cushioning layer 1200 can be separable from the weighing device 100.

The cushioning layer 1200 can include or be composed of fabric, rubber, synthetic rubber, or a combination thereof. The cushioning layer 1200 can be shaped as an elongate paraboloid, a hyperbolic paraboloid, an elliptical paraboloid, or a combination thereof. The cushioning layer 1200 can also have a lingulate or a tongue-shaped receiving surface.

The gripping surface 1510 of the weighing device 100 can hold, grip, or secure the cushioning layer 1200 to the placement side 150. The gripping surface 1510 can hold, grip, or secure the cushioning layer 1200 through adhesion, friction, or a combination thereof.

The weighing system 1500 can include the weighing device 100 and the console 1508. The console 1508 can be the same console 1402 as depicted in or described with respect to FIG. 13C. The console 1508 can communicate wirelessly with the weighing device 100 via Bluetooth®, WiFi, or other wireless communication protocols.

A user can place a load 300, such as an infant, on the cushioning layer 1200 positioned on the placement side 1506 to weigh the load 300. The firmware or software of the weighing device 100 can automatically instruct the processor to automatically tare or zero out the weight of the cushioning layer 1200 before weighing the load 300.

FIG. 16B illustrates that the placement side 1506 of the weighing device 100 can receive a changing pad 1600. The placement side 1506 can be substantially planar. In one variation, the changing pad 1600 can have a substantially rectangular base and a furrowed or trough-like receiving surface. The changing pad 1600 can be separable from the weighing device 100. The changing pad 1600 can include or be composed of fabric, memory foam, rubber, synthetic rubber, or a combination thereof.

The gripping surface 1510 of the weighing device 100 can hold, grip, or secure the changing pad 1600 to the placement side 150. The gripping surface 1510 can hold, grip, or secure the bottom of the changing pad 1600 through adhesion, friction, or a combination thereof.

The weighing system 1500 can include the weighing device 100 and the console 1508. The console 1508 can be the same console 1402 as depicted in or described with respect to FIG. 13C. The console 1508 can communicate wirelessly with the weighing device 100 via Bluetooth®, WiFi, or other wireless communication protocols.

A user can place a load 300, such as an infant, on the changing pad 1600 positioned on the placement side 1506 to weigh the load 300. The firmware or software of the weighing device 100 can automatically instruct the processor to automatically tare or zero out the weight of the changing pad 1600 or the user can manually tare or zero out the weight of the changing pad 1600 before placing the load 300 on the changing pad 1600.

Figure 17A:
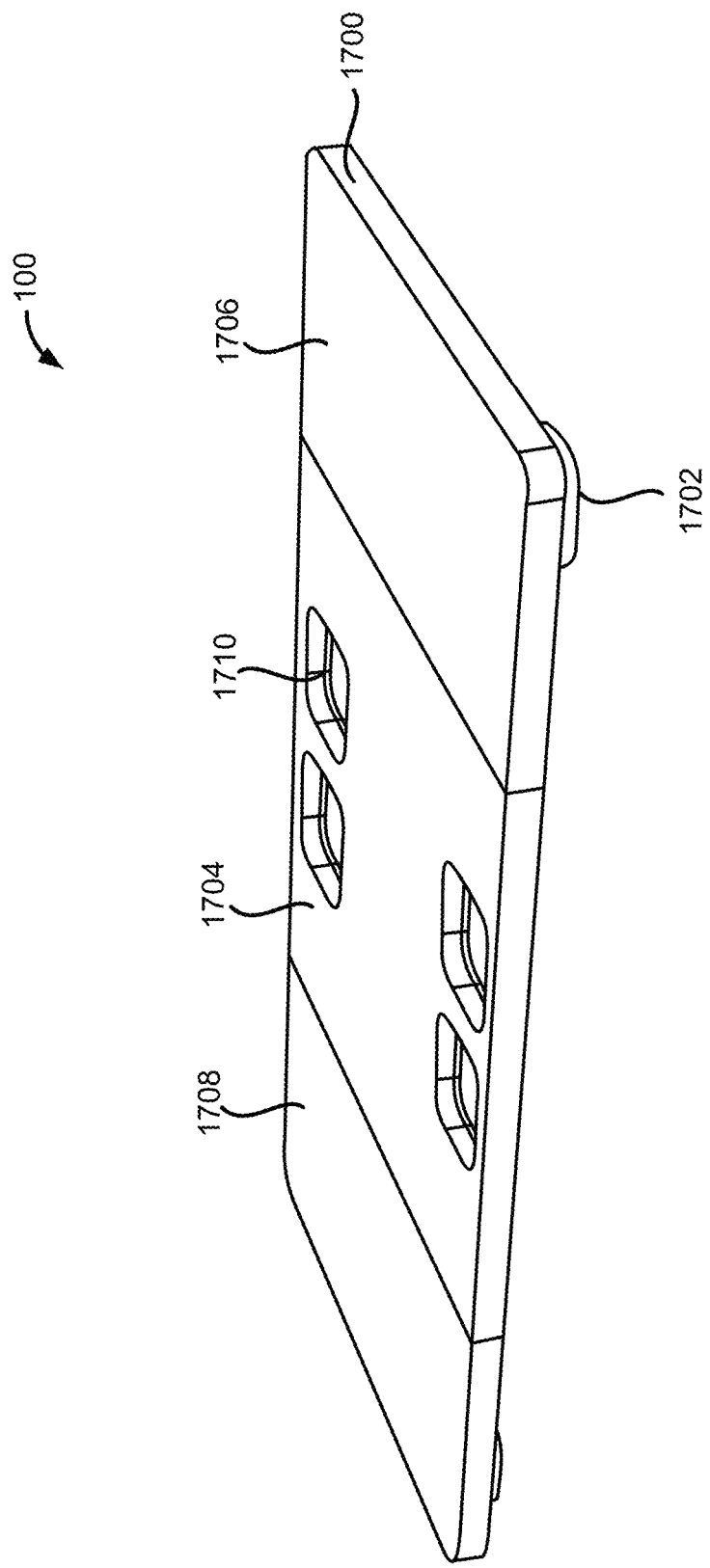
FIG. 17A illustrates a variation of a weighing device with a tri-fold configuration.

FIG. 17A illustrates that the weighing device 100 can include an enclosure or device casing 1700 with a central portion 1704, a first foldable portion 1706, a second foldable portion 1708, or a combination thereof. The first foldable portion 1706 can be coupled to one or more feet assembly 1702. The second foldable portion 1708 can also be coupled to one or more feet assembly 1702. For example, the first foldable portion 1706 can be coupled to two feet assembly 1702 including a first foot assembly and a second foot assembly. In this example, the second foldable portion 1708 can be coupled to two additional feet assembly 1702 including a third foot assembly and a fourth foot assembly.

The feet assembly 1702 can be the same feet assembly 204 as those depicted in or described with respect to FIGS. 2A, 3A, 3C, 3E, 4, 6-10, and 11A-11B. The feet assembly 1702 can be coupled or attached to weight sensors, such as the weight sensors 202. The weight sensors 202 can be coupled or attached to the underside of the enclosure or device casing 1700.

The central portion 1704 can have one or more feet window 1710. The feet window 1710 can be openings, cavities, or depressions sized to house the feet assembly 1702 or allow a portion of the feet assembly 1702 to pass through when the weighing device 100 is in the tri-fold configuration 1714 of FIG. 17C. For example, the central portion 1704 can include four feet window 1710. Each feet window 1710 can house a foot assembly 1702 or allow a portion of a foot assembly 1702 to pass through the feet window 1710 when the weighing device 100 is in the tri-fold configuration 1714.

Figure 17B:
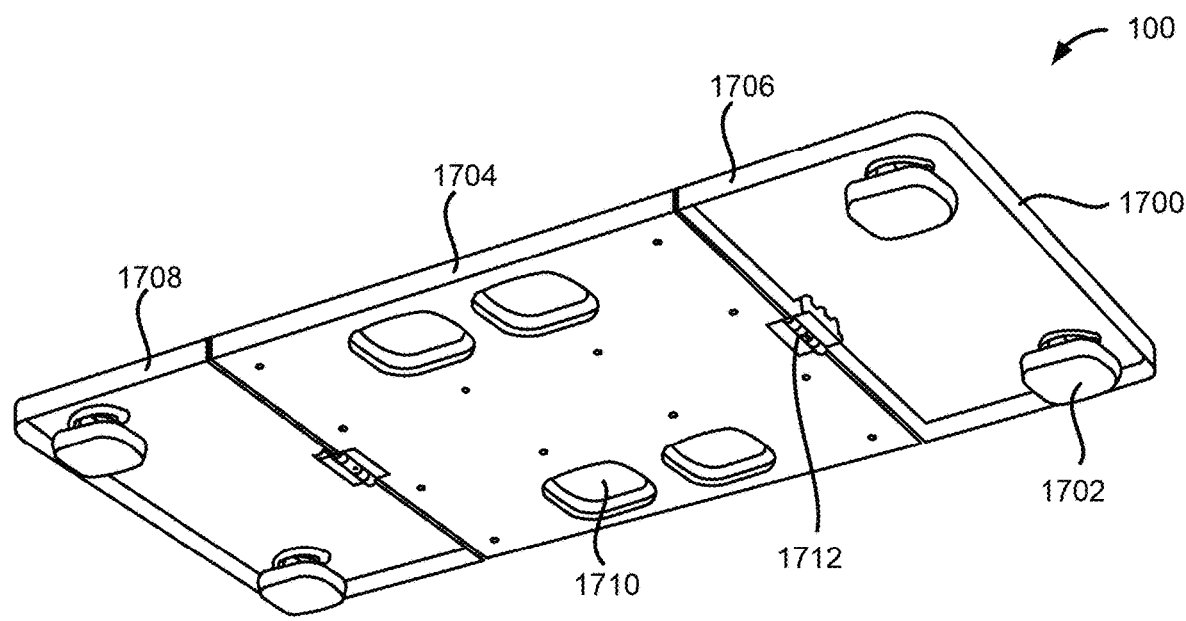
FIG. 17B illustrates a bottom perspective view of the weighing device of FIG. 17A.

FIG. 17B illustrates that the first foldable portion 1706, the second foldable portion 1708, or a combination thereof can be connected to the central portion 1704 of the weighing device 100 by connectors 1712. The connectors 1712 can include hinges, pivots, straps, loops, or a combination thereof. FIG. 17B illustrates that the connectors 1712 can be coupled to the underside of the enclosure or device casing 1700. For example, one hinge serving as the connector 1712 can connect the central portion 1704 with the first foldable portion 1706 and another hinge can connect the central portion 1704 with the second foldable portion 1708.

Figure 17C:
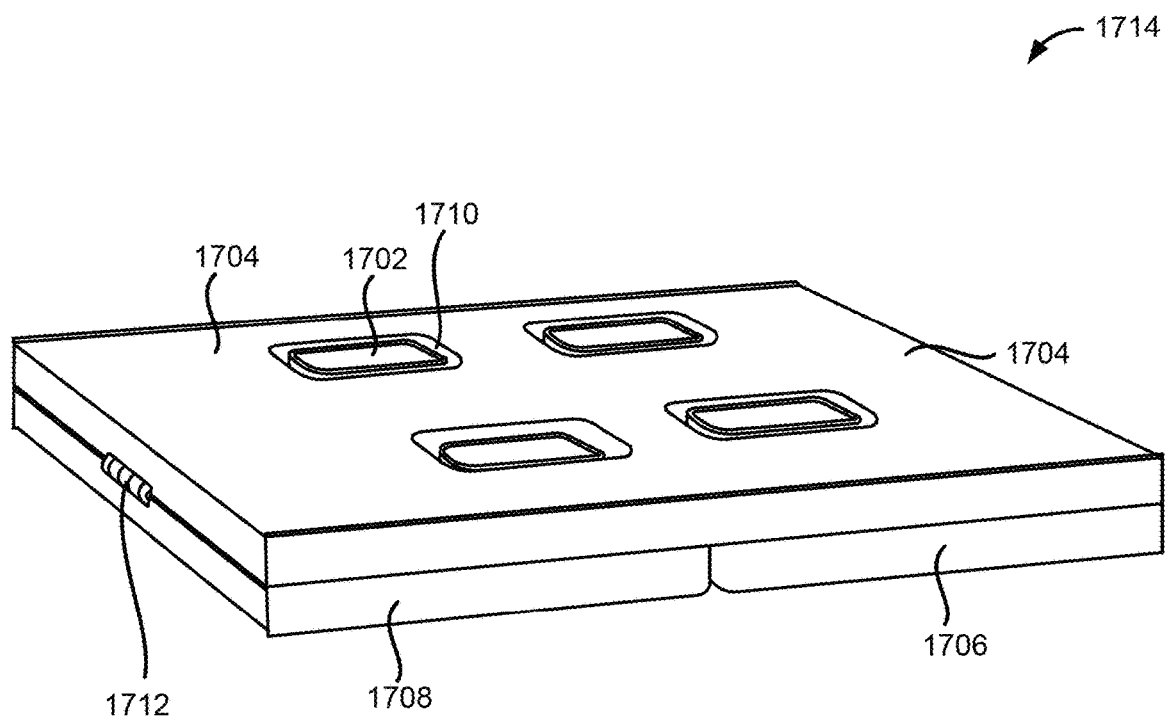
FIG. 17C illustrates the weighing device of FIG. 17A in a folded configuration.

FIG. 17C illustrates that the weighing device 100 can be folded into the tri-fold configuration 1714. The first foldable portion 1706 and the second foldable portion 1708 can be folded under the central portion 1704 when the weighing device 100 is in the tri-fold configuration 1714. The tri-fold configuration 1714 can allow easy transport or storage of the weighing device 100. In other variations, the weighing device 100 can have a bi-fold configuration or a quadri-fold configuration. The enclosure or device casing 1700 of FIGS. 17A-17C can be composed of or comprise ABS, PLA, polycarbonate, PP, or a combination thereof.

The enclosure or device casing 1700 can be composed of a material with a Shore D hardness of between 90 and 100. The enclosure or device casing 1700 can be manufactured as one molded piece or assembled from separate parts or components.

FIG. 18 illustrates that the weighing device 100 can include an electronic system 1800. The electronic system 1800 can include a processor 1802, a memory device 1804, an ADC 1806, a communication unit 1808, the display component 116, the power supply 210, the weight sensors 202, or a combination thereof.

The processor 1802, the memory device 1804, the ADC 1806, the communication unit 1808, and the display component 116 can be coupled or connected to a printed circuit board (PCB) 1810. The PCB 1810 can be coupled to one of the sensor mounts 400. The PCB 1810 can also be coupled to the underside 200 of the enclosure or device casing 102. The processor 1802, the memory device 1804, the ADC 1806, the communication unit 1808, and the display component 116 can be coupled to one another through high-speed buses or interfaces.

The processor 1802 can be a 32-bit reduced instruction set computing (RISC) central processing unit (CPU). The processor 1802 can also be a 64-bit processor or a 128-bit processor. For example, the processor 1802 can be an ARM® Cortex® M4 processor. The memory device 1804 can be a non-volatile computer storage medium such as an electronically erasable programmable read-only memory (EEPROM). The memory device 1804 can include flash memory. The memory device 1804 can include at least 16 MB of memory.

The ADC 1806 can include a 24-bit ADC, a 32-bit ADC, or a 64-bit ADC. The ADC 1806 can include a low-noise amplifier, an onboard oscillator, a delta-sigma modulator, a bridge power switch, or a combination thereof. The low-noise amplifier can have a gain of 128 and can support a differential input of ±19.5 mV. The ADC 1806 can be controlled by dedicated pins and can be connected via one or more serial interfaces to the processor 1802. For example, the ADC 1806 can include a Texas Instruments® ADS 1231 analog-to-digital converter.

The ADC 1806 can be coupled or connected via wire leads to the weight sensors 202. For example, the ADC 1806 can be coupled or connected via wire leads to the four weigh sensors 202 including the first weight sensor 202A, the second weight sensor 202B, the third weight sensor 202C, and the fourth weight sensor 202D.

The ADC 1806 can receive or retrieve one or more analog signals 1812 from the weight sensors 202. The weight sensors 202 can generate one or more analog signals 1812 when a user places a load 300 on the placement side including any of the placement side 104, the placement side 1506, or a combination thereof. The ADC 1806 can convert the one or more analog signals 1812 received from the weight sensors 202 to one or more digital signals 1814. The processor 1802 can read the digital signals 1814 from the ADC 1806 and use the digital signals 1814 to calculate the weight of the load 300. For example, the processor 1802 can read 10 or more signals from the ADC 1806 per second. The processor 1802 can also store the digital signals 1814 in the memory device 1804 for further processing or store the calculated weight measurements in the memory device 1804.

The processor 1802 can be coupled to the communication unit 1808. The communication unit 1808 can include a Bluetooth® module, a Bluetooth® low energy (BLE) module, a WiFi module, or a combination thereof. The communication unit 1808 can be a combined Bluetooth® and WiFi module. In other variations, the communication unit 1808 can include a cellular antenna and can connect wirelessly to a cellular network such as a 3G network, a 4G network, an LTE network, or a combination thereof or a satellite network.

The communication unit 1808 can transmit data or signals corresponding to the weight of the load 300 to a server 2002 (see FIG. 20A), a portable device 2012 (see FIG. 20B), or a combination thereof. For example, the communication unit 1808 can transmit data or signals corresponding to the weight of the load 300 to the console 1402.

The power supply 210 can power the weight sensors 202, the ADC 1806, the communication unit 1808, the processor 1802, the memory device 1804, the display component 116, or a combination thereof. The power supply 210 can be coupled to the enclosure or device casing 102. In other variations, the power supply 210 can be an inductive charge receiver for receiving wireless power.

Figure 19:
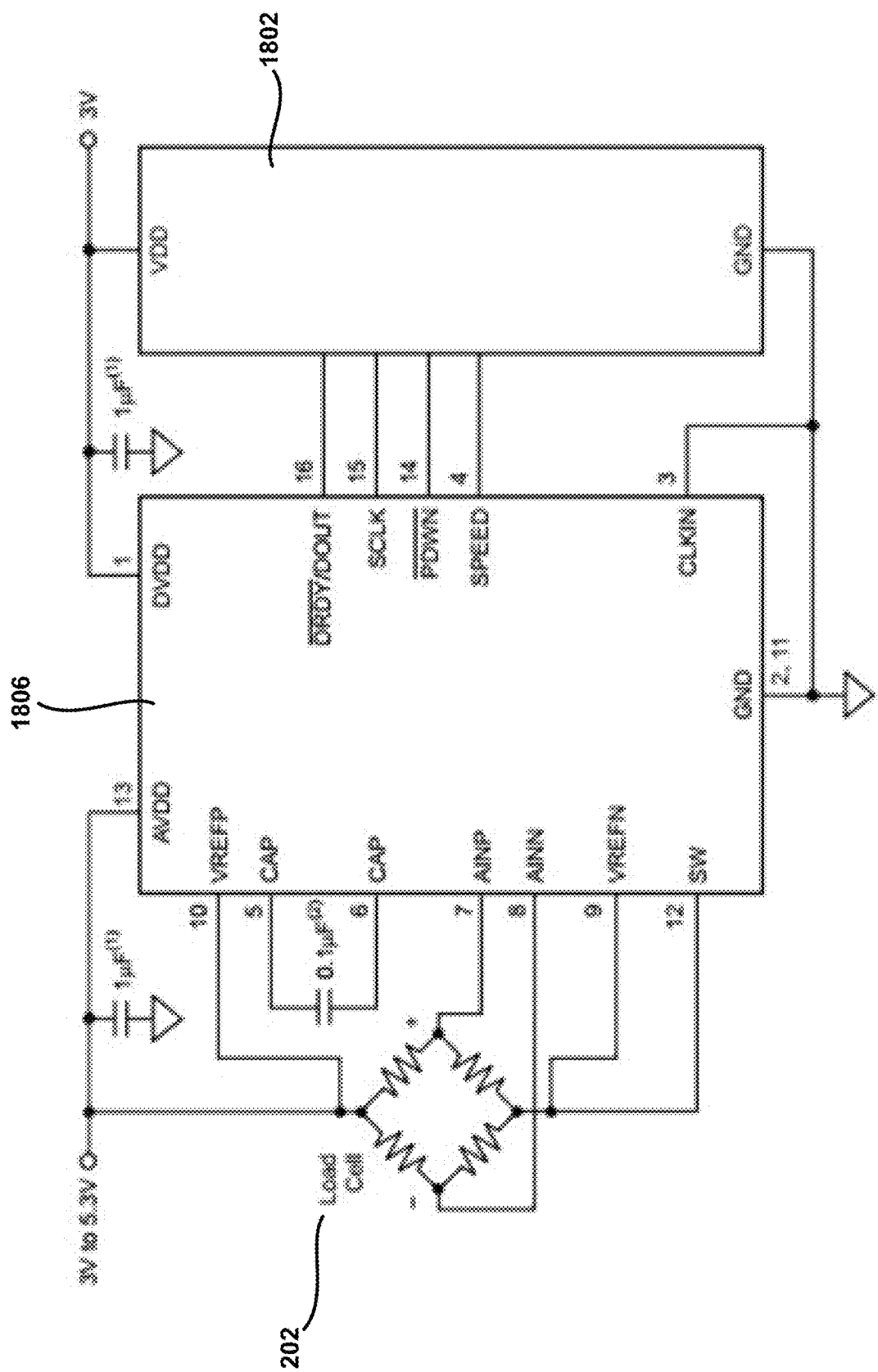
FIG. 19 illustrates a circuit diagram of the weight sensors coupled to an analog-to-digital converter.

FIG. 19 illustrates that the weight sensors 202 can be half-bridge load cells and the load cells can be coupled to the ADC 1806. The ADC 1806 can have a supply voltage of between 3V to 5.3V. The ADC 1806 can be connected to the load cells via input pins and also be connected to the processor 1802 via output pins. The processor 1802 can run the firmware for operating the weighing device 100.

Figure 20A:
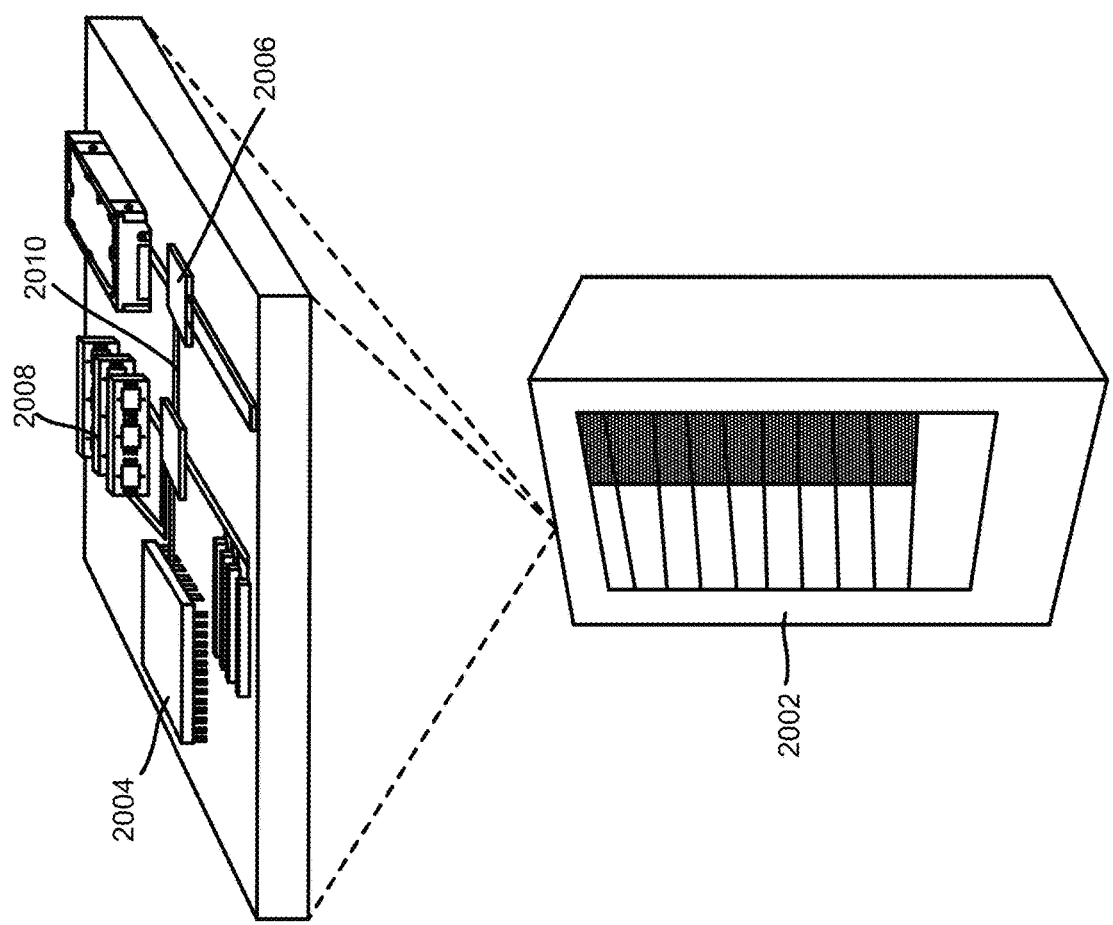
FIG. 20A illustrates a variation of a server of the weighing system.

FIG. 20A illustrates that the weighing system, either the weighing system 1302 or the weighing system 1500, can include a server 2002. The server 2002 can have a processing unit 2004, a memory unit 2006, and a server communication unit 2008. The processing unit 2004 can be coupled to the memory unit 2006 and the server communication unit 2008 through high-speed buses 2010.

The processing unit 2004 can include one or more CPUs, graphical processing units (GPUs), Application-Specific Integrated Circuits (ASICs), field-programmable gate arrays (FPGAs), or a combination thereof. The processing unit 2004 can execute software stored in the memory unit 2006 to execute the methods described herein. The processing unit 2004 can be implemented in a number of different manners. For example, the processing unit 2004 can be an embedded processor, a processor core, a microprocessor, a logic circuit, a hardware finite state machine (FSM), a digital signal processor (DSP), or a combination thereof. As a more specific example, the processing unit 2004 can be a 64-bit processor.

The memory unit 2006 can store software, data, logs, or a combination thereof. The memory unit 2006 can be an internal memory. Alternatively, the memory unit 2006 can be an external memory, such as a memory residing on a storage node, a cloud server, or a storage server. The memory unit 2006 can be a volatile memory or a non-volatile memory. For example, the memory unit 2006 can be a nonvolatile storage such as non-volatile random access memory (NVRAM), Flash memory, disk storage, or a volatile storage such as static random access memory (SRAM). The memory unit 2006 can be the main storage unit for the server 2002.

The server communication unit 2008 can include one or more wired or wireless communication interfaces. For example, the server communication unit 2008 can be a network interface card of the server 2002. The server communication unit 2008 can be a wireless modem or a wired modem. In one variation, the server communication unit 2008 can be a WiFi modem. In other variations, the server communication unit 2008 can be a 3G modem, a 4G modem, an LTE modem, a Bluetooth® component, a Bluetooth® Low Energy (BLE) component, a radio receiver, an antenna, or a combination thereof. The server 2002 can connect to or communicatively couple with a WLAN, a wide area network, or a combination thereof using the server communication unit 2008. The server 2002 can transmit or receive data packets or messages using the server communication unit 2008.

FIG. 20B illustrates that the weighing system, either the weighing system 1302 or the weighing system 1500, can include a portable device 2012. The portable device 2012 can be a portable computing device such as a smartphone, a tablet, a laptop, a smartwatch, a personal entertainment device, or a combination thereof. In other variations not shown in FIG. 20B, the portable device 2012 can be a desktop computer, a workstation, another server, or a combination thereof. The portable device 2012 can have a processor 2014, a memory 2016, a communication unit 2018, a locational unit 2020 having a global navigation satellite system (GNSS) receiver, such as a global positioning system (GPS) receiver, and a display 2022. The processor 2014 can be coupled to the memory 2016, the communication unit 2018, and the locational unit through high-speed buses 2024.

The processor 2014 can include one or more CPUs, GPUs, ASICs, FPGAs, or a combination thereof. The processor 2014 can execute software stored in the memory 2016 to execute the methods described herein. The processor 2014 can be implemented in a number of different manners. For example, the processor 2014 can be an embedded processor, a processor core, a microprocessor, a logic circuit, a hardware FSM, a DSP, or a combination thereof. As a more specific example, the processor 2014 can be a 32-bit processor such as an ARM™ processor.

The memory 2016 can store software, data, logs, or a combination thereof. In one variation, the memory 2016 can be an internal memory. In another variation, the memory 2016 can be an external storage unit. The memory 2016 can be a volatile memory or a non-volatile memory. For example, the memory 2016 can be a nonvolatile storage such as NVRAM, Flash memory, disk storage, or a volatile storage such as SRAM. The memory 2016 can be the main storage unit for the portable device 2012.

The communication unit 2018 can be a wired or wireless communication interface. For example, the communication unit 2018 can be a network interface card of the portable device 2012. The communication unit 2018 can be a wireless modem or a wired modem. In one variation, the communication unit 2018 can be a WiFi modem. In other variations, the communication unit 2018 can be a 3G modem, a 4G modem, an LTE modem, a Bluetooth® component, a radio receiver, an antenna, or a combination thereof. The portable device 2012 can connect to or communicatively couple with a WLAN, a wide area network, or a combination thereof using the communication unit 2018. The portable device 2012 can transmit or receive packets or messages using the communication unit 2018.

The locational unit 2020 can have a GPS component such as the GPS receiver, an inertial unit, a magnetometer, a compass, or any combination thereof. The locational unit 2020 can receive GPS signals from a GPS satellite. The inertial unit can be implemented as a multi-axis accelerometer including a three-axis accelerometer, a multi-axis gyroscope including a three-axis MEMS gyroscope, or a combination thereof.

The display 2022 can be a liquid crystal display (LCD) touchscreen, a lighting-emitting diode (LED) touchscreen, an active-matrix organic light-emitting diode (AMOLED) touchscreen, a super AMOLED touchscreen, or a combination thereof.

In certain variations, the display 2022 can be a retina display, a haptic touchscreen, or a combination thereof. For example, when the portable device 2012 is a smartphone, the display 2022 can be the touchscreen display of the smartphone.

The portable device 2012 can act or serve as the console 1402, the console 1508, or a combination thereof. For purposes of the present disclosure, the processor 2014 can refer to a processor of the console 1402, the console 1508, or a combination thereof. Moreover, the memory 2016 can refer to a memory of the console 1402, the console 1508, or a combination thereof. The communication unit 2018 can refer to a communication unit of the console 1402, the console 1508, or a combination thereof. The locational unit 2020 can refer to a locational unit of the console 1402, the console 1508, or a combination thereof. The display 2022 can refer to a display of the console 1402, the console 1508, or a combination thereof.

FIG. 21 illustrates that the weighing device 100 can be part of a smart nursery ecosystem 2100. The nursery ecosystem 2100 can include the weighing device 100, the portable device 2012, the console 1508, a sleep monitor 2102, a video monitor 2104, a cloud server such as the server 2002, and other smart baby products. The weighing device 100, the sleep monitor 2102, the video monitor 2104, and other smart baby products can communicate over wireless communication protocols such as Bluetooth®, Bluetooth® low energy, WiFi, cellular protocols, or a combination thereof with the console 1508, the portable device 2012, the cloud server 2002, or a combination thereof.

The cloud server 2002 can access data from the sleep monitor 2102, the video monitor 2104, and other smart baby products in the ecosystem 2100 through open or publicly available application programming interfaces (APIs). The cloud server 2002 can also receive direct data feeds 2106 in the form of text files, comma separated values (CSV) files, or a combination thereof.

Figure 22:
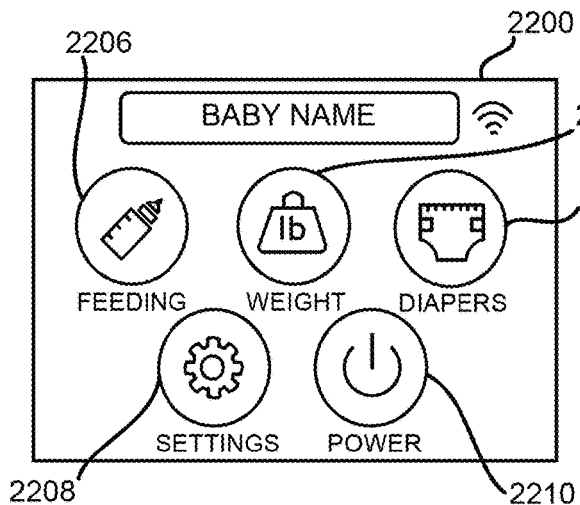
FIG. 22 illustrates a main menu interface displayed by a weighing device.

FIG. 22 illustrates that the display component 116 of the weighing device 100 can display a main menu interface 2200. The main menu interface 2200 can be a user interface (UI) displayed on a touchscreen of the display component 116. The main menu interface 2200 can include a weight button 2202, a diaper button 2204, a feeding button 2206, a settings button 2208, a power button 2210, or a combination thereof. The weighing device 100 can display the main menu interface 2200 when a user presses or makes contact with the touchscreen of the display component 116.

Figure 23A:
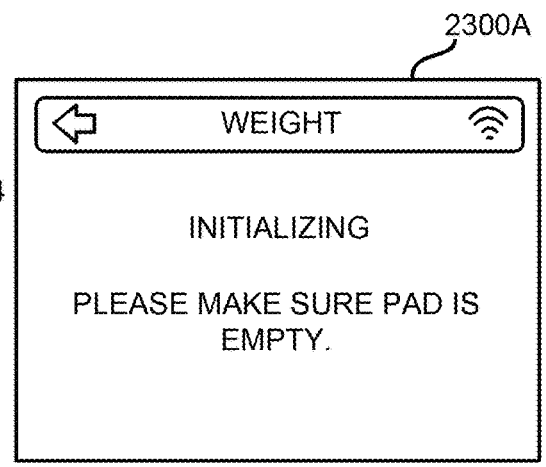
FIG. 23A illustrates a weight operation interface displayed by the weighing device.

FIG. 23A illustrates that the display component 116 can display a first weight operation interface 2300A when a user presses the weight button 2202. The first weight operation interface 2300A can instruct the user to remove any loads or objects from the placement side 104 of the weighing device 100 before the weighing device 100 determines a tare weight or zeroing weight.

Figure 23B:
FIG. 23B illustrates another weight operation interface displayed by the weighing device.

FIG. 23B illustrates that the display component 116 can display a second weight operation interface 2300B after determining a tare weight. The second weight operation interface 2300B can instruct the user to lay a load 300, such as an infant or toddler, on the placement side 104 of the weighing device 100. The user can then press or make contact with a Go button 2302 to prompt the weighing device 100 to weigh the load 300.

For example, the weighing device 100 can weigh the load 300 by converting one or more analog signals 1812 received from the four weight sensors 202 including the first weight sensor 202A, the second weight sensor 202B, the third weight sensor 202C, and the fourth weight sensor 202D to one or more digital signals 1814 at the ADC 1806. The processor 1802 can then calculate the weight of the load 300 using the one or more digital signals 1814.

Figure 23C:
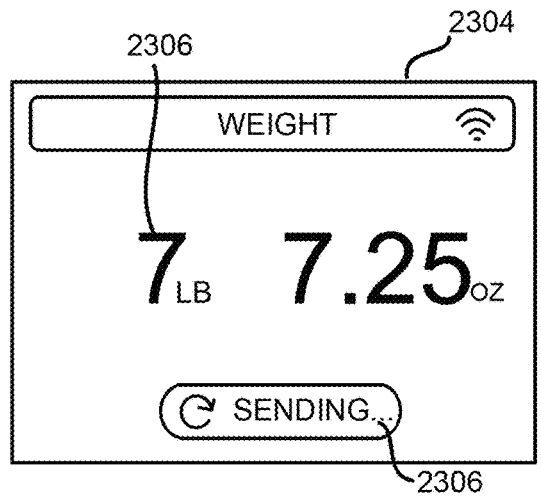
FIG. 23C illustrates a weight measurement interface displayed by the weighing device.

FIG. 23C illustrates that the display component 116 can display a weight measurement 2306 through a weight measurement interface 2304. The weight measurement 2306 can be the weight of the load 300 calculated by the processor 1802. The weight measurement interface 2304 can also display a sending button 2306. The sending button 2306 can inform the user that the weighing device 100 is transmitting or communicating the weight measurement 2306 to the server 2002, a portable device 2012, or a combination thereof.

Figure 24:
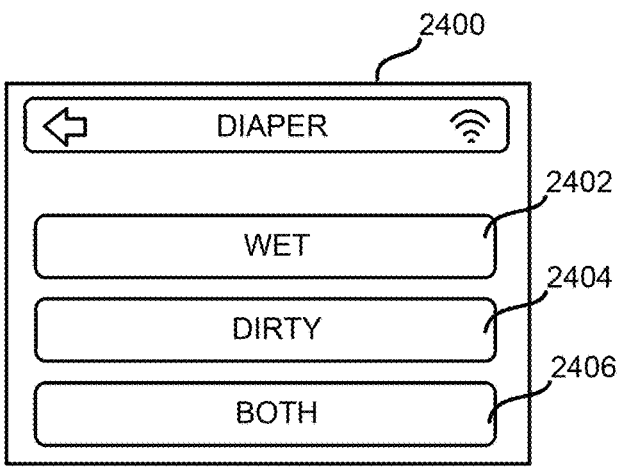
FIG. 24 illustrates a diaper weighing interface displayed by the weighing device.

FIG. 24 illustrates that the display component 116 can display a diaper weighing interface 2400 when a user presses or makes contact with the diaper button 2204 of the main menu interface 220. The diaper weighing interface 2400 can include a wet diaper button 2402, a dirty diaper button 2404, a wet and dirty diaper button 2406, or a combination thereof. The user can press or make contact with the wet diaper button 2402 when the user intends to measure the weight of a diaper which has been soiled by liquid waste such as urine. In addition, the user can press or make contact with the dirty diaper button 2404 when the user intends to measure the weight of a diaper which has been soiled by solid waste such as fecal matter. Moreover, the user can also press the wet and dirty diaper button 2406 when the user intends to measure the weight of a diaper which has been soiled by both liquid and solid waste.

Figure 25A:
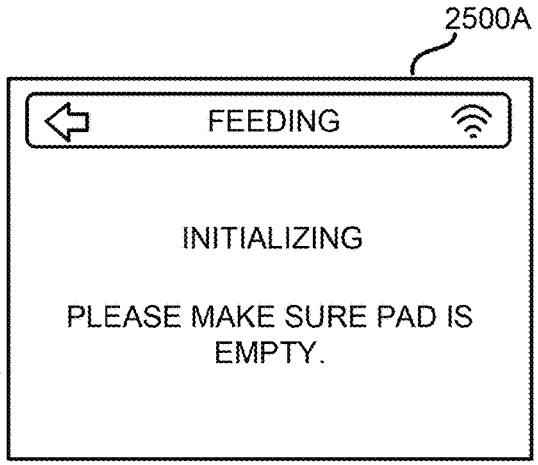
FIG. 25A illustrates a feeding weight interface displayed by the weighing device.

FIG. 25A illustrates that the display component 116 can display a first feeding weight interface 2500A when a user presses or makes contact with the feeding button 2206 of the main menu interface 2200. The first feeding weight interface 2500A can instruct the user to remove any loads or objects from the placement side 104 of the weighing device 100 before the weighing device 100 determines a tare weight or zeroing weight.

Figure 25B:
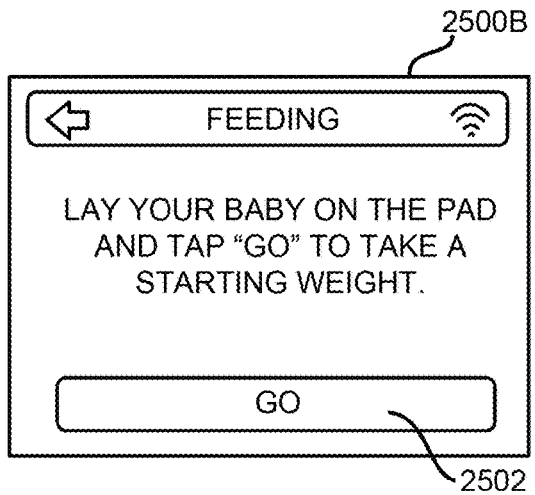
FIG. 25B illustrates another feeding weight interface displayed by the weighing device.

FIG. 25B illustrates that the display component 116 can display a second feeding weight interface 2500B after determining a tare weight. The second feeding weight interface 2500B can instruct the user to lay an infant or toddler on the placement side 104 of the weighing device 100 to determine a starting weight 2506. The user can then press or make contact with a Go button 2502 to prompt the weighing device 100 to weigh the infant or toddler.

Figure 25C:
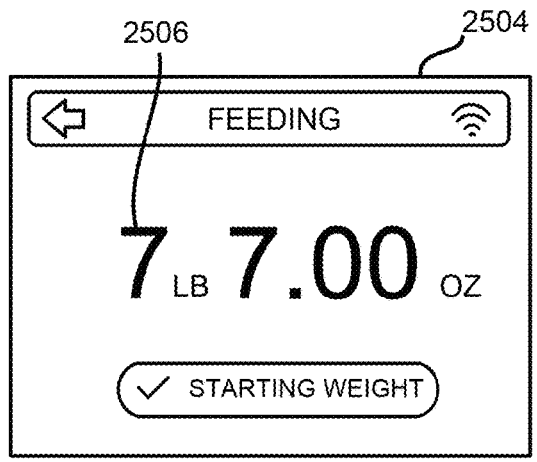
FIG. 25C illustrates a starting weight interface displayed by the weighing device.

FIG. 25C illustrates that the display component 116 can display a starting weight interface 2504. The starting weight interface 2504 can display the starting weight 2506 of the infant or toddler. The starting weight 2506 can be the weight of the infant or toddler before a feeding session.

Figure 25D:
FIG. 25D illustrates another feeding weight interface displayed by the weighing device.

FIG. 25D illustrates that the display component 116 can display a third feeding weight interface 2500C. The third feeding weight interface 2500C can instruct the user to feed the infant or toddler previously weighed by the weighing device 100.

Figure 25E:
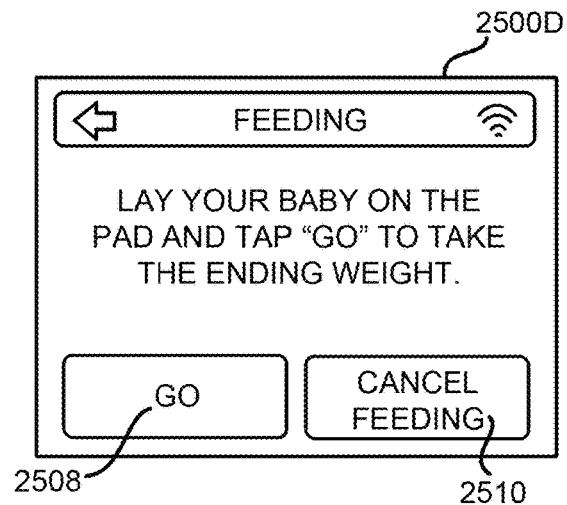
FIG. 25E illustrates yet another feeding weight interface displayed by the weighing device.

FIG. 25E illustrates that the display component 116 can display a fourth feeding weight interface 2500D. The fourth feeding weight interface 2500D can instruct the user to place the infant or toddler on the placement side 104 of the weighing device 100 and press the Go button 2508 to determine an ending weight of the infant or toddler or a feeding amount 2514. The user can also press or make contact with the cancel feeding button 2510 to cancel the present weighing session and default back to the main menu interface 2200.

Figure 25F:
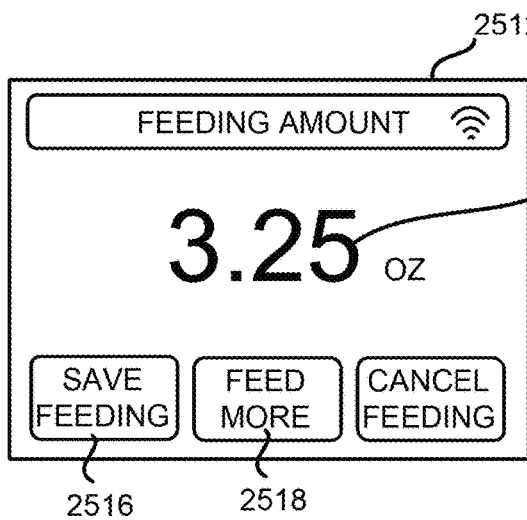
FIG. 25F illustrates a feeding amount interface displayed by the weighing device.

FIG. 25F illustrates that the display component 116 can display a feeding amount interface 2512. The feeding amount interface 2512 can display the feeding amount 2514 calculated by the weighing device 100. For example, the feeding amount 2514 can be calculated by the processor 1802 by subtracting the starting weight 2506 of the infant or toddler from the ending weight of the infant or toddler. The ending weight of the infant or toddler can be the weight determined by the weighing device 100 after the feeding session. In one variation, the ending weight can be calculated and stored by the weighing device 100 but not shown to the user through the display component 116. In other variations, the ending weight can be displayed to the user through the display component 116.

The user can press or make contact with a save feeding button 2516 to save the feeding amount 2514 to the memory 1804 of the weighing device 100. The user can also press or make contact with the feed more button 2518 to instruct the weighing device 100 that the user intends to continue feeding the infant or toddler.

Figure 26:
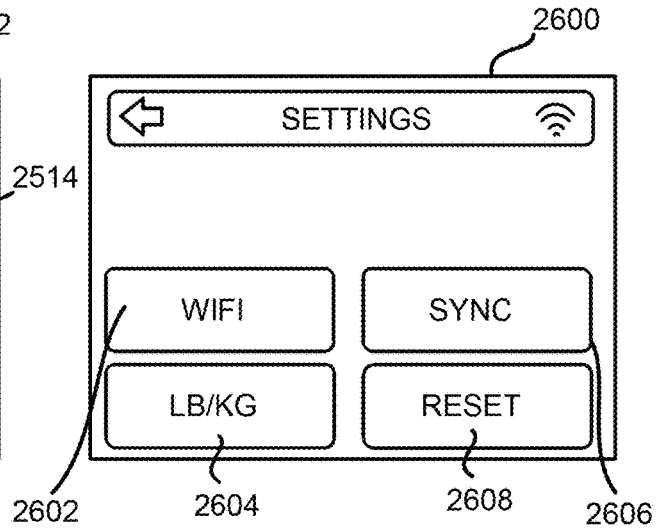
FIG. 26 illustrates a settings interface of the weighing device.

FIG. 26 illustrates that the display component 116 can display a settings interface 2600. The settings interface 2600 can include a WiFi button 2602, a weight unit button 2604, a sync button 2606, a reset button 2608, or a combination thereof. The user can press or make contact with the WiFi button 2602 to configure the WiFi settings of the weighing device 100. The user can press or make contact with the weight unit button 2604 to change the unit of measurement from pounds to kilogram or vice versa. The user can also press or make contact with the sync button 2606 to sync the data stored in the memory of the weighing device 100 with the server 2002, one or more portable device 2012, or a combination thereof. The user can also press the reset button 2608 to reset the settings of the weighing device 100.

It will be understood by one of ordinary skill in the art that various changes and modifications can be made to this disclosure without departing from the spirit and scope of the variations. Elements of systems, devices and methods shown with any variation are exemplary for the specific variation and can be used in any combination or otherwise on other variations within this disclosure. In addition, the flowcharts or logic flows depicted in the figures do not require the particular order shown, or sequential order, to achieve desirable results. In addition, other steps or operations may be provided, or steps or operations may be eliminated, from the described flows, and other components may be added to, or removed from, the described systems. Accordingly, other variations are within the scope of the following claims.

It will be understood by one of ordinary skill in the art that the various methods disclosed herein may be embodied in a non-transitory readable medium, machine-readable medium, and/or a machine accessible medium comprising instructions compatible, readable, and/or executable by a processor or processing unit of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

We claim:

1. A weighing device, comprising:
   a device casing having a placement side and an underside, wherein the placement side comprises at least two retaining walls and a receiving surface configured to retain a load;
   four weight sensors including a first weight sensor, a second weight sensor, a third weight sensor, and a fourth weight sensor coupled to the underside of the device casing, wherein the four weight sensors are configured to generate a signal corresponding to a weight of the load;
   a first foot assembly coupled to the first weight sensor, wherein the first foot assembly comprises a first end of the first foot assembly coupled to the first weight sensor and a second end of the first foot assembly extending beyond the device casing, and wherein the first foot assembly and the first weight sensor are positioned under one of the at least two retaining walls;

a cushioning layer coupled to the device casing, wherein the cushioning layer covers the at least two retaining walls and the receiving surface; and a communication unit configured to wirelessly transmit data corresponding to a weight of the load to another device.

2. The device of claim 1, wherein the device casing comprises a casing side wall and the cushioning layer covers at least part of the casing side wall.

3. The device of claim 1, wherein the device casing comprises a casing brim extending beyond the casing side wall.

4. The device of claim 1, wherein the cushioning layer comprises polyurethane foam.

5. The device of claim 1, wherein the receiving surface is located between the at least two retaining walls and the at least two retaining walls form a U-shaped trough with the receiving surface.

6. The device of claim 1, further comprising a second foot assembly coupled to the device casing via the second weight sensor and a third foot assembly coupled to the device casing via the third weight sensor, wherein the second foot assembly is the furthest foot assembly from the first foot assembly, and wherein the third foot assembly is the closest foot assembly to the first foot assembly, and wherein a ratio between a first distance separating the first foot assembly from the second foot assembly and a second distance separating the first foot assembly from the third foot assembly is between approximately 2.0 and 3.0.

7. The device of claim 1, further comprising a second foot assembly coupled to the device casing via the second weight sensor and a third foot assembly coupled to the device casing via the third weight sensor, wherein the second foot assembly is the furthest foot assembly from the first foot assembly, and wherein the third foot assembly is the closest foot assembly to the first foot assembly, and wherein a ratio between a first distance separating the first foot assembly from the second foot assembly and a second distance separating the first foot assembly from the third foot assembly is between approximately 2.1 and 2.5.

8. The device of claim 1, further comprising a device base coupled to the device casing, wherein at least part of the device base is shaped as an annular disk configured to secure the first foot assembly to the device casing.

9. The device of claim 1, wherein the first foot assembly comprises:
  a webbed indenter coupled to the first weight sensor and partially housed within a foot housing structure on the underside of the device casing;
  a thread pin disposed in a pin channel of the webbed indenter; and
  a foot pad coupled to the webbed indenter.

10. The device of claim 9, wherein the webbed indenter comprises a sigmoid shaped arm connected to an outer rim and an indenter barrel.

11. The device of claim 1, wherein each of the four weight sensors comprise a half-bridge load cell.

12. The device of claim 1, further comprising:
  an analog-to-digital converter (ADC) coupled to the four weight sensors;
  a non-transitory memory device configured to store data concerning the weight of the load; and
  a processor coupled to the non-transitory memory device, the ADC, and the communication unit.

13. The device of claim 1, further comprising a second foot assembly coupled to the device casing via the second weight sensor and a third foot assembly coupled to the device casing via the third weight sensor, wherein the second foot assembly is the furthest foot assembly from the first foot assembly, and wherein the third foot assembly is the closest foot assembly to the first foot assembly, and wherein a ratio between a first distance separating the first foot assembly from the second foot assembly and a second distance separating the first foot assembly from the third foot assembly is between approximately 3.0 and 3.5.

14. The device of claim 1, wherein the cushioning layer is fixedly attached to the device casing.

15. The device of claim 1, wherein the communication unit comprises a WiFi communication unit.

16. The device of claim 1, wherein the ADC is configured to convert analog signals from at least one of the four weight sensors to digital signals.

17. The device of claim 1, wherein at least part of the receiving surface is substantially lingulate-shaped or tongue-shaped.

18. The device of claim 1, wherein the retaining walls are curved.

19. A weighing device, comprising:
  a device casing having a placement side and an underside, wherein the placement side comprises at least two retaining walls and a receiving surface configured to retain a load;
  four weight sensors including a first weight sensor, a second weight sensor, a third weight sensor, and a fourth weight sensor coupled to the underside of the device casing, wherein the four weight sensors are configured to generate a signal corresponding to a weight of the load;
  a first foot assembly coupled to the first weight sensor, wherein the first foot assembly comprises a first end of the first foot assembly coupled to the first weight sensor and a second end of the first foot assembly extending beyond the device casing, wherein the first foot assembly comprises:
    a webbed indenter coupled to the first weight sensor and partially housed within a foot housing structure on the underside of the device casing, wherein the webbed indenter comprises an outer rim coupled to an indenter barrel by one or more arms, and wherein the indenter barrel extends vertically in a direction of the second end of the first foot assembly,
  a cushioning layer coupled to the device casing, wherein the cushioning layer covers the at least two retaining walls and the receiving surface; and
  a communication unit configured to wirelessly transmit data corresponding to a weight of the load to another device.

* * * * *